United States Patent
Koike et al.

[11] Patent Number: 5,574,886
[45] Date of Patent: Nov. 12, 1996

[54] DATA PROCESSING SYSTEM FOR ENCODING AND COMPRESSING A PATTERN DATA AND FOR DECODING THE ENCODED AND COMPRESSED DATA TO AN OUTPUT SYSTEM

[75] Inventors: Hisashi Koike, Sakura; Satoshi Nagata, Tama; Tetsuo Kurita, Kawasaki, all of Japan

[73] Assignee: Canon Kabushiki Kaisha, Tokyo, Japan

[21] Appl. No.: 63,076

[22] Filed: May 18, 1993

[30] Foreign Application Priority Data

May 18, 1992 [JP] Japan ................................. 4-125132
May 10, 1993 [JP] Japan ................................. 5-108232

[51] Int. Cl.⁶ ........................ G06F 3/00; G06F 5/00
[52] U.S. Cl. .................. 395/500; 364/237.6; 364/260.4; 364/260.6; 364/284.2; 364/DIG. 2
[58] Field of Search ........................... 395/375, 500; 358/260.1, 260.2, 260.3

[56] References Cited

U.S. PATENT DOCUMENTS

| | | | |
|---|---|---|---|
| 4,117,517 | 9/1978 | Shintani et al. | 358/260 |
| 4,121,258 | 10/1978 | Nakagome et al. | 358/260 |
| 4,453,227 | 6/1984 | Amann et al. | 395/425 |
| 4,628,534 | 12/1986 | Marshall | 382/41 |
| 4,943,869 | 7/1990 | Horikawa et al. | 358/426 |
| 5,020,121 | 5/1991 | Rosenberg | 382/56 |

FOREIGN PATENT DOCUMENTS

| | | |
|---|---|---|
| 0060101 | 9/1982 | European Pat. Off. . |
| 0183484 | 6/1986 | European Pat. Off. . |
| 0188800 | 7/1986 | European Pat. Off. . |
| 0309655 | 4/1989 | European Pat. Off. . |

Primary Examiner—Kevin J. Teska
Assistant Examiner—Ayni Mohamed
Attorney, Agent, or Firm—Fitzpatrick, Cella, Harper & Scinto

[57] ABSTRACT

An information processing apparatus includes a change point detection unit for obtaining dot change point positions and the number of change points in units of scanning lines by scanning a dot pattern in a predetermined direction, a discrimination unit for discriminating start and end positions of a dot set by scanning the dot pattern in the predetermined direction so as to detect appearance of a noncontinuous dot pattern in a direction substantially perpendicular to a direction of the scanning line, and a generation unit for generating information representing, as a relative value with respect to the immediately preceding scanning line, the change point positions and the number of change points detected by the change point detection unit and the start and end positions of the dot set discriminated by the discrimination unit in accordance with an external instruction.

202 Claims, 29 Drawing Sheets

FIG.4

| CODE NAME | CODE DATA | DEFINITION | VARIABLE CODE |
|---|---|---|---|
| LINEEQ | 0 | THE NUMER OF EDGES IN THE CURRENT SCAN LINE IS THE SAME AS THAT IN THE PREVIOUS SCAN LINE | |
| LINEDIF <i> | i | THE NUMER OF EDGES IN THE CURRENT SCAN LINE DIFFERS FROM THAT IN THE PREVIOUS LINE BY i | i:+2  0010   -2  0011<br>+4  0100   -4  0101<br>+6  0110   -6  0111<br>+8 100000  -8 100000 |

LINE CODE

FIG.5

| | CODE NAME | CODE DATA | DEFINITION | VARIABLE CODE |
|---|---|---|---|---|
| | ADV0 | 0 | THE EDGE IN THE CURRENT LINE STAYS AT THE SAME POSITION AS THAT IN THE PREVIOUS LINE | |
| | ADV1 | 10 | THE EDGE IN THE CURRENT LINE ADVANCES BY 1 IN THE FORWARD DIRECTION FROM THAT IN THE PREVIOUS LINE | |
| | ADV2 | 110 | THE EDGE IN THE CURRENT LINE ADVANCES BY 2 IN THE FORWARD DIRECTION FROM THAT IN THE PREVIOUS LINE | |
| FRAME CODE | SW1 | 1110 | THE EDGE IN THE CURRENT LINE ADVANCES BY 1 IN THE REVERSE DIRECTION FROM THAT IN THE PREVIOUS LINE | |
| | ADV LONG $<j>$ | 111100j | THE EDGE IN THE CURRENT LINE ADVANCES BY j IN THE FORWARD DIRECTION FROM THAT IN THE PREVIOUS LINE | j: 3  0000<br>4  0001<br>5  0010<br>6  0011<br>7  0100<br>8  0101<br>9  0110<br>10 0111 |
| | SWLONG k | 111101k | THE EDGE IN THE CURRENT LINE ADVANCES BY k IN THE REVERSE DIRECTION FROM THAT IN THE PREVIOUS LINE | k: 2  0000<br>3  0001<br>4  0010<br>5  0011<br>6  0100<br>7  0101<br>8  0110<br>9  0111 |
| | OPEN m,n | 111110mn | A NEW FRAME FORMS FROM POSITION m IN WIDTH n | m,n: 0<br>1  0000<br>2  0001<br>3  0010<br>  0011<br>4  0100<br>5  0101<br>6  0110<br>7  0111 |
| | CLOSE | 111111 | THE FRAME CLOSES IN THE PREVIOUS LINE | |

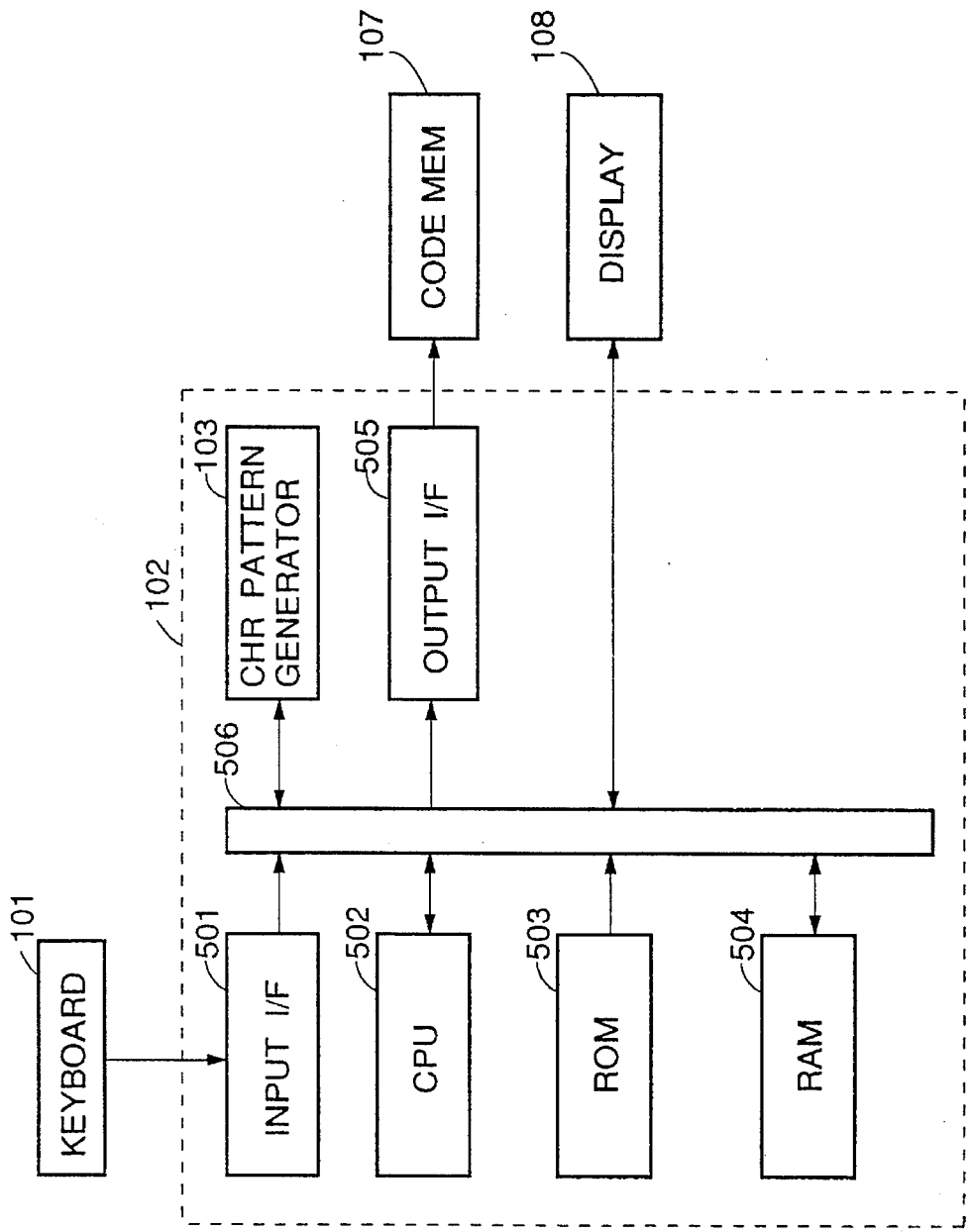

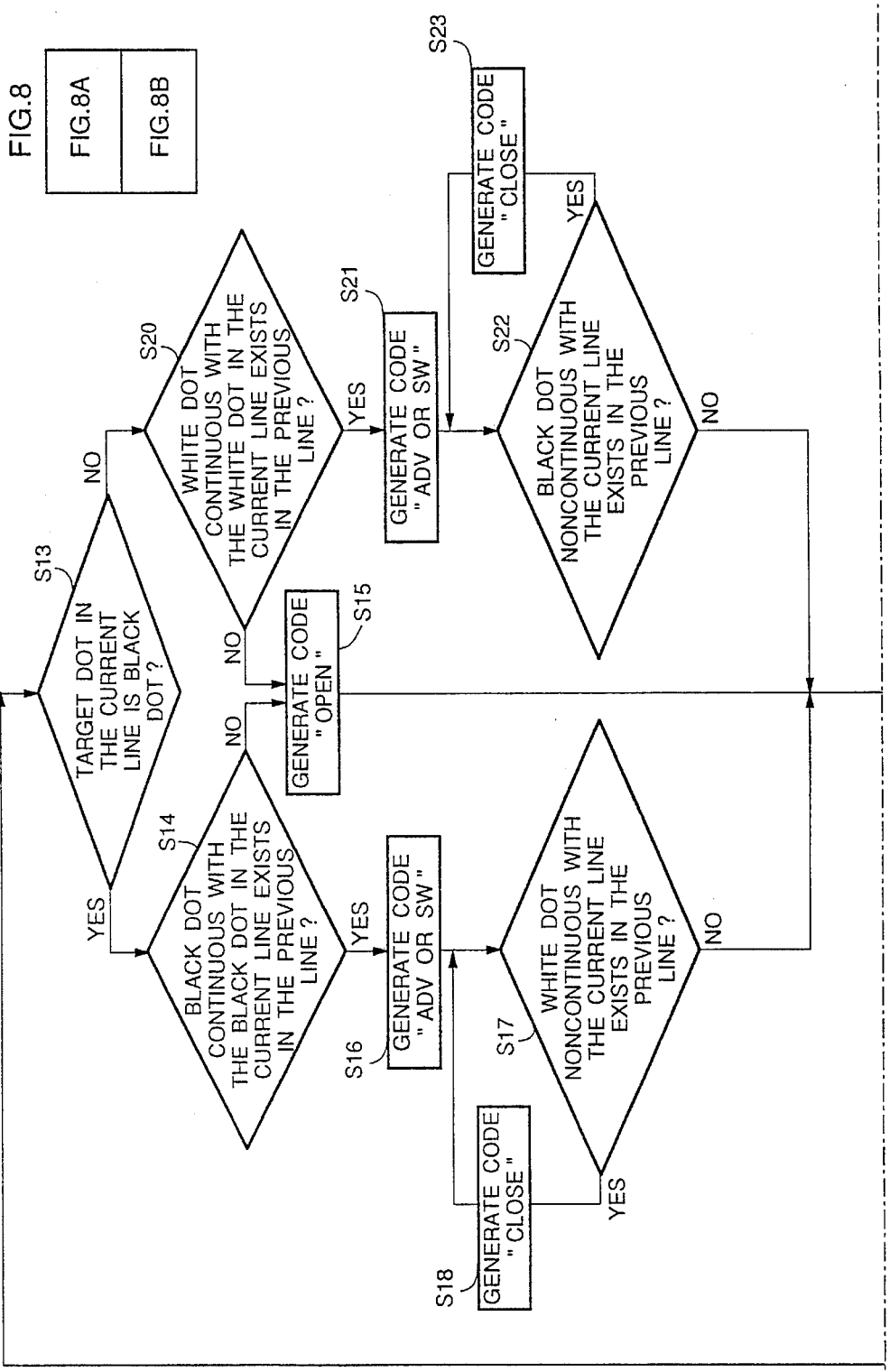

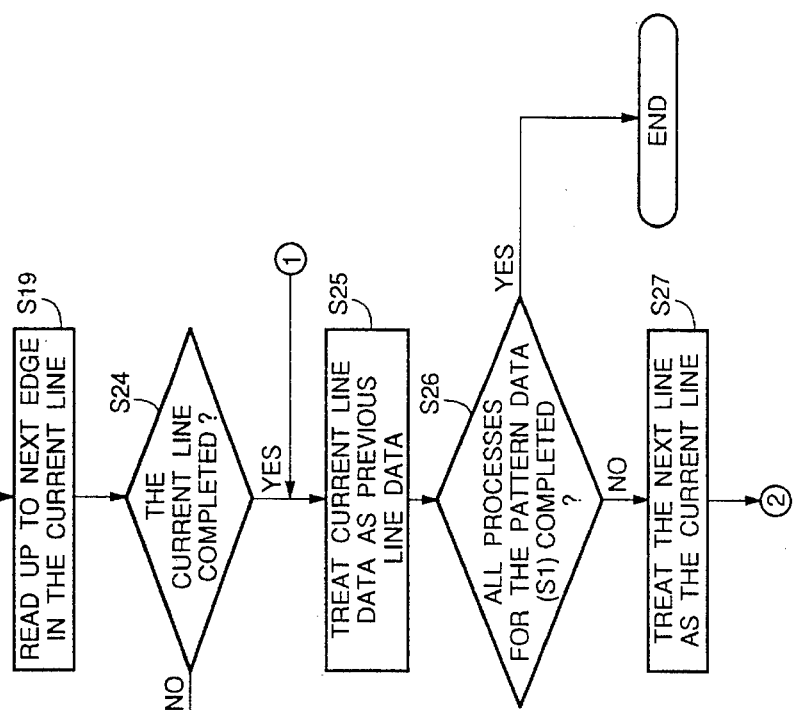

FIG.12

| | EDGE POSITION | | | | | | NO. OF EDGES | EDGE POSITION | | | | | | NO. OF LINES |
|---|---|---|---|---|---|---|---|---|---|---|---|---|---|---|
| LINE1 | - | - | - | - | - | - | 0 | | | | | | | 1 |
| LINE2 | 6 | 9 | - | - | - | - | 2 | ↓ | ↑ | | | | | 2 |
| LINE3 | 6 | 9 | - | - | - | - | 2 | ↓ | ↑ | | | | | 3 |
| LINE4 | 6 | 10 | - | - | - | - | 2 | ↓ | ↑ | | | | | 4 |
| LINE5 | 5 | 9 | 12 | 13 | - | - | 4 | ↓ | ↑ | ↓ | ↑ | | | 5 |
| LINE6 | 3 | 6 | 8 | 9 | 12 | 13 | 6 | ↓ | ↓ | ↓ | ↑ | ↓ | ↑ | 6 |
| LINE7 | 5 | 6 | 8 | 9 | 12 | 13 | 6 | ↓ | ↓ | ↓ | ↑ | ↓ | ↑ | 7 |
| LINE8 | 4 | 6 | 8 | 10 | 12 | 13 | 6 | ↓ | ↓ | ↓ | ↑ | ↓ | ↑ | 8 |
| LINE9 | 4 | 13 | - | - | - | - | 2 | ↓ | ↑ | | | | | 9 |
| LINE10 | - | - | - | - | - | - | 0 | | | | | | | 10 |

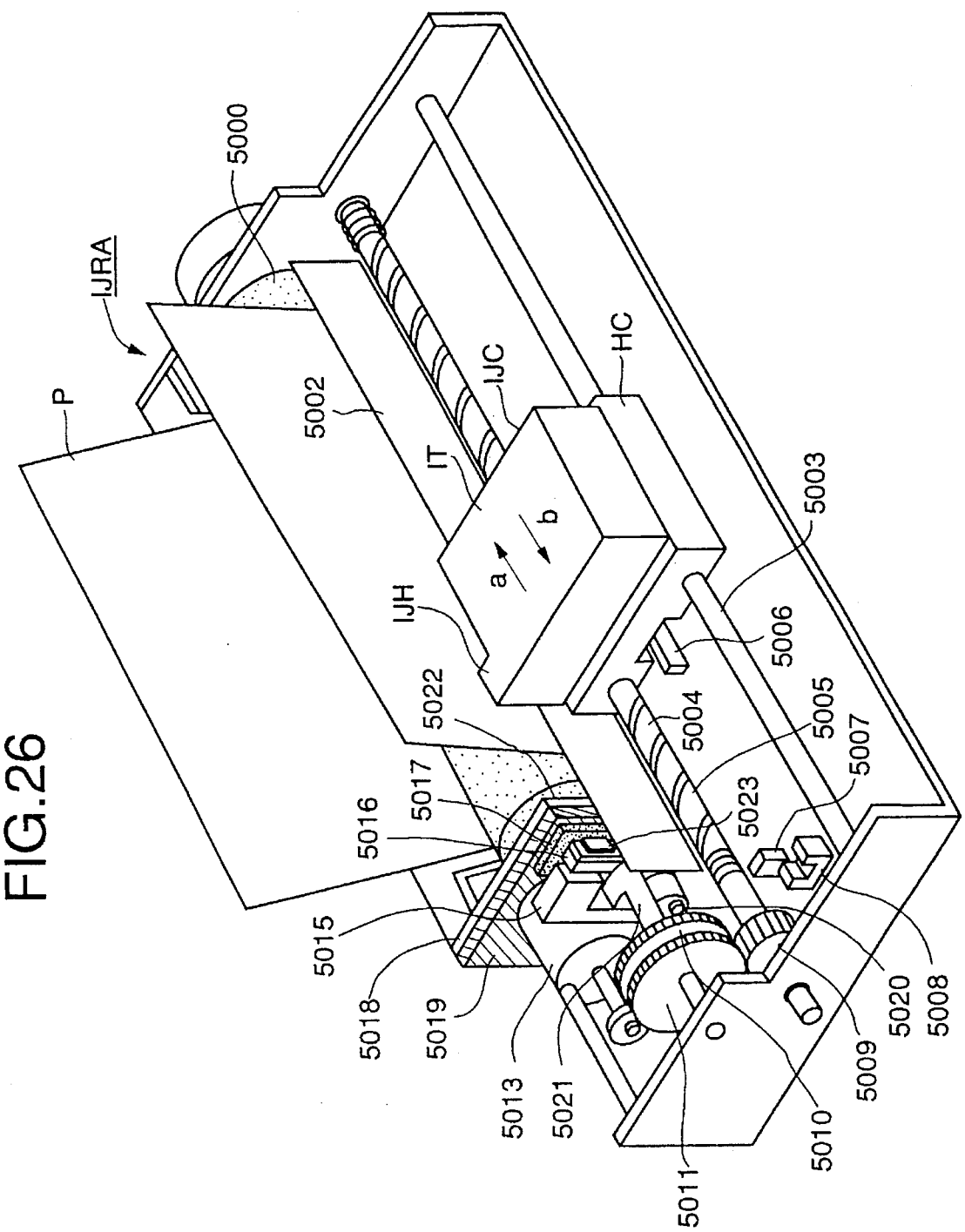

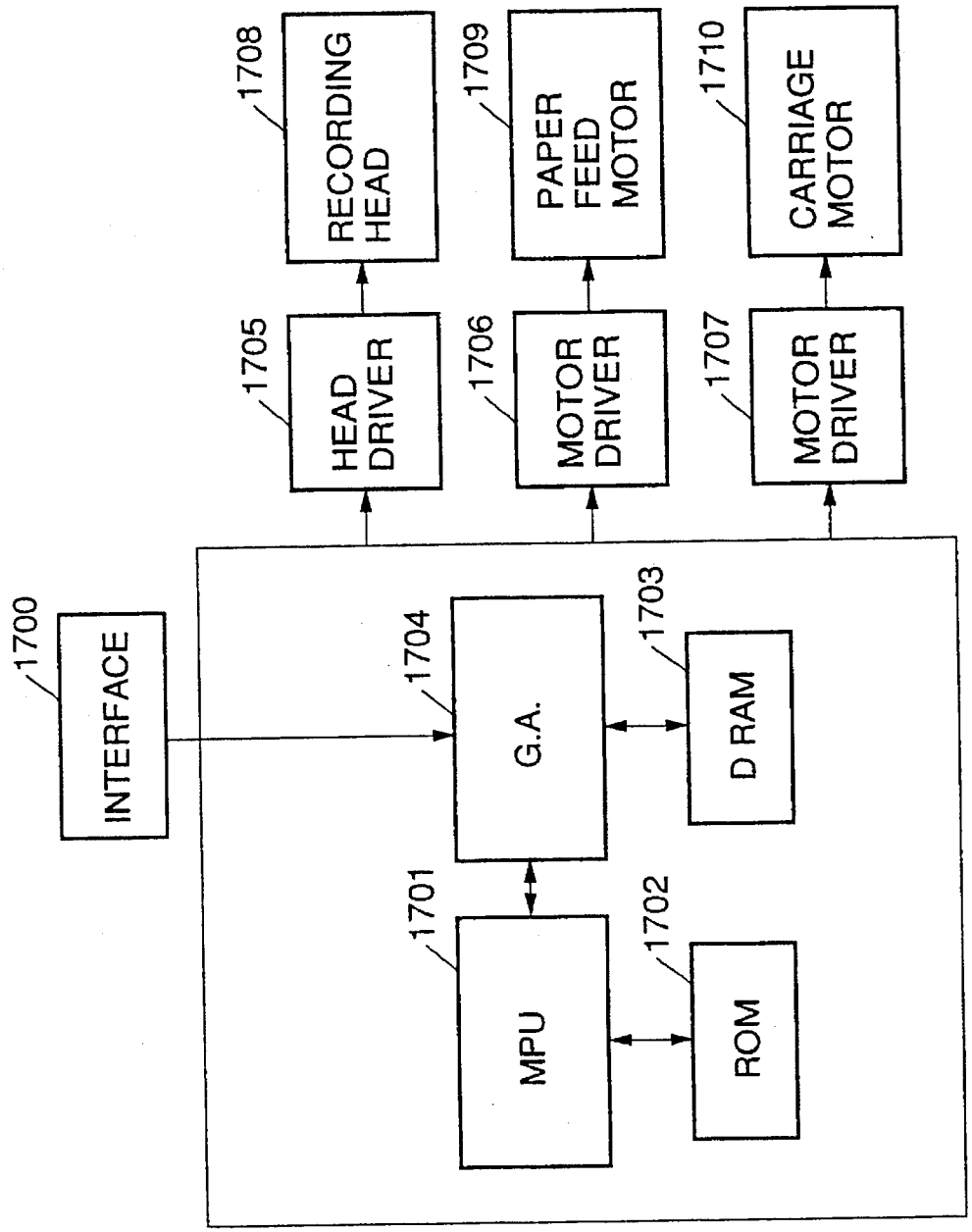

DATA PROCESSING SYSTEM FOR ENCODING AND COMPRESSING A PATTERN DATA AND FOR DECODING THE ENCODED AND COMPRESSED DATA TO AN OUTPUT SYSTEM

BACKGROUND OF THE INVENTION

1. Field of the Invention

The present invention relates to an information processing apparatus for encoding and compressing pattern data such as characters, an output apparatus for decoding encoded pattern data, and an output apparatus for encoding and compressing pattern data such as characters, and decoding encoded pattern data.

2. Related Background Art

An image forming apparatus, which stores pattern data in correspondence with character codes, normally stores character pattern data in the form of developed character patterns. However, when developed character patterns are stored in this manner, a large memory capacity is required for storing these patterns, resulting in high cost. In particular, since the resolution of recent printers is increased, and the number of dots of each character pattern to be printed is increased, the memory capacity for storing the patterns becomes considerably large. Thus, an image forming apparatus, which stores such character patterns in the form of compressed codes obtained by encoding the character patterns by an encoding method such as a run length method, has been developed.

However, since the above-mentioned conventional encoding method is a compression method for general pattern data, the compression ratio cannot be increased very much depending on the dot formats of character patterns. Some encoding methods require a long expansion time, and even when a character code is input, development of the corresponding pattern takes much time, resulting in an increase in print time for a printer.

SUMMARY OF THE INVENTION

The present invention has been made in consideration of the conventional problems, and has as its object to provide an information processing apparatus, which performs encoding suitable for dot patterns such as characters, symbols, and the like so as to shorten a time required for decoding, and to obtain a high compression ratio.

In order to achieve the above object, according to the present invention, there is provided an information processing apparatus comprising:

change point detection means for obtaining dot change point positions and the number of change points in units of scanning lines by scanning a dot pattern in a predetermined direction;

discrimination means for discriminating start and end positions of a dot set by scanning the dot pattern in the predetermined direction so as to detect appearance of a noncontinuous dot pattern in a direction substantially perpendicular to a direction of the scanning line; and generation means for generating information representing, as a relative value with respect to an immediately preceding scanning line, the change point positions and the number of change points detected by the change point detection means and the start and end positions of the dot set discriminated by the discrimination means in accordance with an external instruction.

The present invention has been made in consideration of the conventional problems, and has as its another object to provide an output apparatus, which performs encoding suitable for externally input dot patterns such as characters, symbols, and the like so as to shorten a time required for decoding, and to obtain a high compression ratio.

In order to achieve the above object, according to the present invention, there is provided an output apparatus comprising:

change point detection means for obtaining dot change point positions and the number of change points in units of scanning lines by scanning a dot pattern input from an external apparatus in a predetermined direction;

discrimination means for discriminating start and end positions of a dot set by scanning the dot pattern input from the external apparatus in the predetermined direction so as to detect appearance of a noncontinuous dot pattern in a direction substantially perpendicular to a direction of the scanning line; and generation means for generating information representing, as a relative value with respect to an immediately preceding scanning line, the change point positions and the number of change points detected by the change point detection means and the start and end positions of the dot set discriminated by the discrimination means in accordance with the dot pattern input from the external apparatus.

The present invention has been made in consideration of the conventional problems, and has as its still another object to provide an output apparatus, which performs decoding on the basis of information obtained by encoding dot patterns such as characters, symbols, and the like.

In order to achieve the above object, according to the present invention, there is provided an output apparatus comprising:

storage means for obtaining dot change point positions and the number of change points in units of scanning lines by scanning a dot pattern in a predetermined direction, for discriminating start and end positions of a dot set by scanning the dot pattern in the predetermined direction so as to detect appearance of a noncontinuous dot pattern in a direction substantially perpendicular to a direction of the scanning line, and for storing information representing, as a relative value with respect to an immediately preceding scanning line, the obtained change point positions and the obtained number of change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from the storage means in accordance with the code information which is externally input and identifies a dot pattern.

The present invention has been made in consideration of the conventional problems, and has as its still another object to provide an output apparatus, which performs decoding on the basis of information obtained by encoding dot patterns such as characters, symbols, and the like.

In order to achieve the above object, according to the present invention, there is provided an output apparatus comprising:

connection means for connecting storage means for obtaining dot change point positions and the number of change points in units of scanning lines by scanning a dot pattern in a predetermined direction, for discriminating start and end positions of a dot set by scanning the dot pattern in the predetermined direction so as to detect appearance of a noncontinuous dot pattern in a direction substantially perpendicular to a direction of the scanning line, and for storing information representing, as a relative value with respect to an immediately preceding scanning line, the obtained change point positions and the obtained number of change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from the storage means via the connection means in accordance with the code information which is externally input and identifies a dot pattern.

The present invention has been made in consideration of the conventional problems, and has as its still another object to provide an output apparatus, which performs encoding suitable for dot patterns such as characters, symbols, and the like so as to shorten a time required for decoding, and to obtain a high compression ratio, and decodes encoded dot patterns.

In order to achieve the above object, according to the present invention, there is provided an output apparatus comprising:

change point detection means for obtaining dot change point positions and the number of change points in units of scanning lines by scanning a dot pattern in a predetermined direction;

discrimination means for discriminating start and end positions of a dot set by detecting appearance of a noncontinuous dot pattern in a direction substantially perpendicular to a direction of the scanning line;

generation means for generating information representing, as a relative value with respect to an immediately preceding scanning line, the change point positions and the number of change points detected by the change point detection means and the start and end positions of the dot set discriminated by the discrimination means;

storage means for storing the information generated by the generation means in correspondence with identification information for identifying the dot pattern; and output means for outputting the number of dot change points and dot change point positions of each line in a dot pattern corresponding to code information on the basis of the information read out from the storage means in accordance with the code information which is externally input and identifies a dot pattern.

BRIEF DESCRIPTION OF THE DRAWINGS

FIG. 4 is a table for explaining encoding code names and their meanings in the encoding process according to the first embodiment;

FIG. 5 is a table for explaining encoding code names and their meanings in the encoding process according to the first embodiment;

FIG. 6 is a block diagram showing a detailed arrangement of the information processing apparatus for performing the encoding process according to the first embodiment;

FIG. 8 is comprised of FIG. 8A and FIG. 8B showing flow chart showing the encoding process according to the first embodiment;

FIG. 12 shows a configuration of a line table temporarily generated in the encoding process and a decoding process according to the first embodiment;

FIG. 26 is a sectional view showing the internal structure of an ink-jet printer for performing the encoding and decoding processes according to the present invention; and FIG. 27 is a block diagram showing a control circuit of the ink-jet printer shown in FIG. 26.

DETAILED DESCRIPTION OF THE PREFERRED EMBODIMENTS

The preferred embodiment of the present invention will be described in detail hereinafter with reference to the accompanying drawings.

Prior to a description of the arrangement according to an embodiment of the present invention, the arrangement of a laser beam printer to which the embodiment of the present invention is applied will be described below with reference to FIG. 25.

Figure 25:
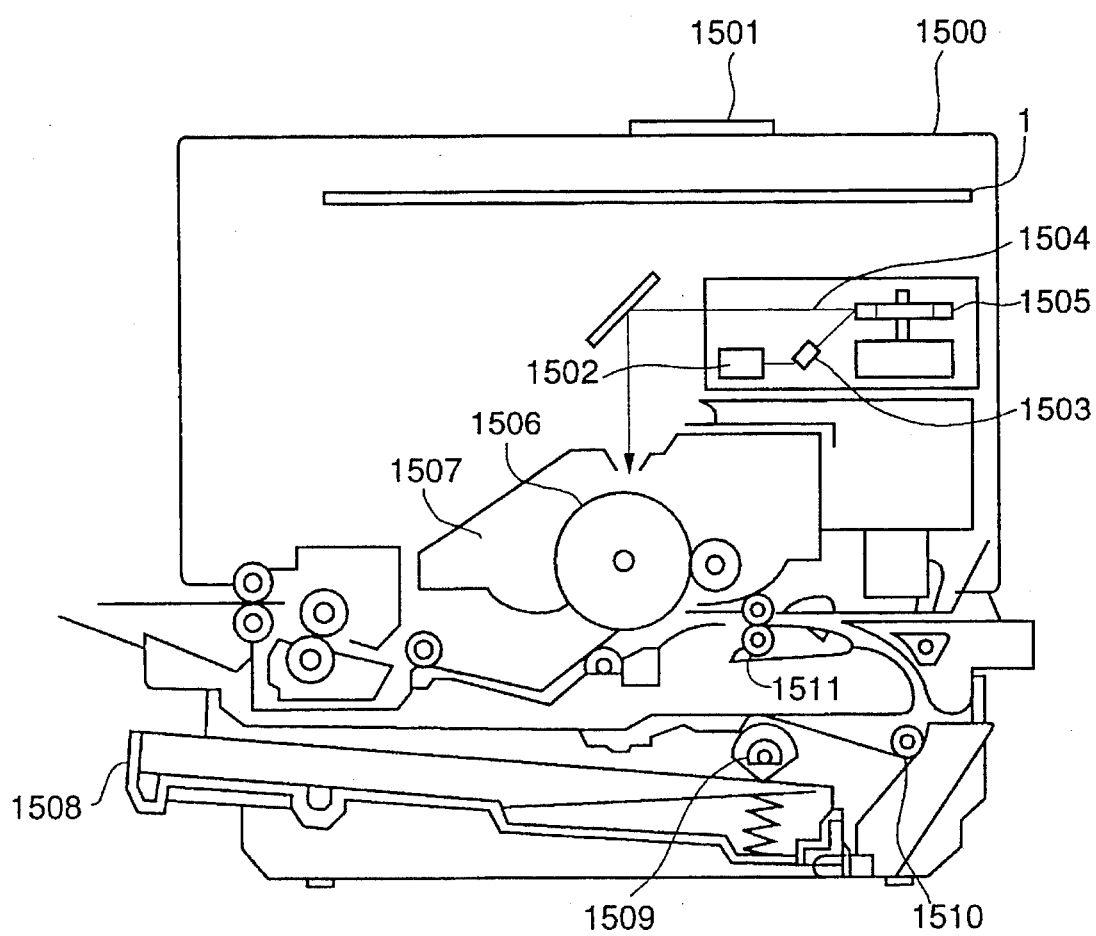
FIG. 25 is a sectional view showing the internal structure of a laser beam printer for performing the encoding and decoding processes according to the present invention.

In FIG. 25, a laser beam printer (LBP) main body 1500 receives and stores character information (character codes, and the like), form information, macro commands, and the like, which are supplied from an external apparatus such as an externally connected host computer, generates corresponding character patterns, form patterns, and the like in accordance with the received information, and forms images on recording paper as a recording material. An operation panel 1501 is arranged on the upper surface of the LBP main body 1500, and is provided with various switches, LED displays, and the like used in operations of the LBP. A printer control unit 1 controls the overall LBP 1500, and analyzes character information, and the like supplied from the host computer. The printer control unit 1 mainly converts character information into a video signal of a character pattern, and outputs the video signal to a laser driver 1502.

The laser driver 1502 is a circuit for driving a semiconductor laser 1503, and drives the semiconductor laser in accordance with the input video signal to turn on/off a laser beam 1504. The laser beam 1504 is scanned in the right-and-left direction by a rotary polygonal mirror 1505 so as to exposure-scan the surface of an electrostatic drum 1506. Thus, an electrostatic latent image of a character pattern is formed on the electrostatic drum 1506. The latent image is developed by a developing unit 1507 arranged around the electrostatic drum 1506, and is then transferred onto recording paper. As the recording paper, a cut sheet is used, and cut recording sheets are stored in a paper cassette 1508 loaded in the LBP 1500. The recording sheet is picked up into the LBP by a paper feed roller 1509 and convey rollers 1510 and 1511, and is fed to the electrostatic drum 1506.

Encoding Apparatus

Figure 1:
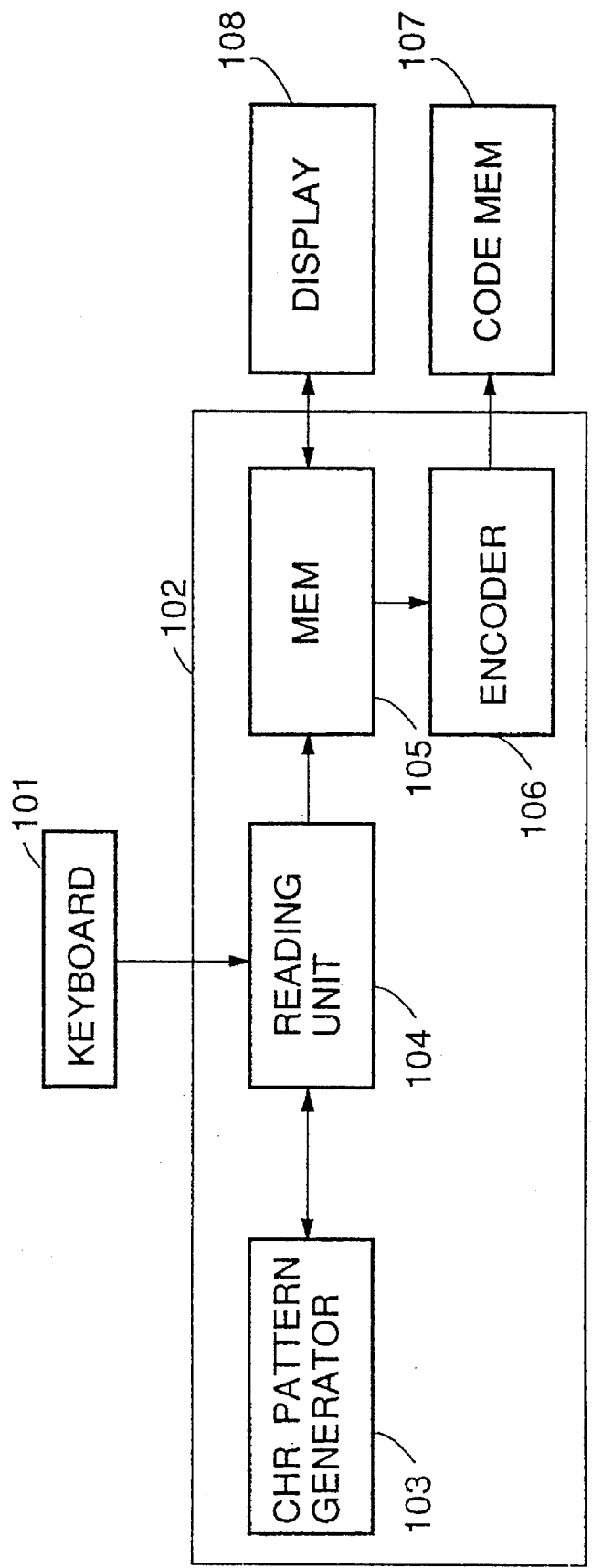
FIG. 1 is a block diagram showing a schematic arrangement of an information processing apparatus for performing an encoding process according to the first embodiment of the present invention.

FIG. 1 is a block diagram showing a schematic arrangement of an encoding apparatus according to the first embodiment of the present invention. Note that the encoding apparatus shown in FIG. 1 is an information processing apparatus such as a host computer.

In FIG. 1, the encoding apparatus includes an input device 101 such as a keyboard for designating a character code to be encoded, and instructing an encoding process of the required character code, an external apparatus 102 such as a host computer serving as an encoding processing apparatus, and a character pattern generator 103 for storing character pattern data and a total number of lines of the character pattern in correspondence with a character code designated by the keyboard 101. The character pattern generator 103 is not limited to an internal one of the external apparatus 102, but may be an external storage medium detachable from the external apparatus 102, or another external apparatus such as a host computer for generating a character pattern. The encoding apparatus also includes a reading unit 104 for outputting a character code designated by the keyboard 101 to the character pattern generator 103, and reading character pattern data and the total number of lines of the character pattern corresponding to the output character code, and a memory 105 for storing the character pattern data and the total number of lines of the character pattern read out by the reading unit 104. The memory 105 comprises, e.g., a RAM.

The encoding apparatus further includes an encoder 106 for encoding the character pattern data stored in the memory 105 on the basis of an instruction from the keyboard 101, a code memory 107 for storing a compressed code and the total number of lines of the required pattern which is encoded by the encoder 106, and a display 108 for displaying the character pattern stored in the memory 105, various messages to an operator, and the like. The code memory 107 may be incorporated in the external apparatus 102, or an external storage medium detachable from the external apparatus 102, or an external storage device such as a hard disk.

Character pattern data and a total number of lines of the character pattern corresponding to a character code designated by the keyboard 101 are temporarily stored in the memory 105. The character pattern data and the total number of lines of the character pattern stored in the memory 105 are read out to the encoder 106 on the basis of an encoding instruction from the keyboard 101 in units of characters, and are sequentially encoded.

An encoding process in the encoder 106 of this embodiment will be described below.

Figure 2:
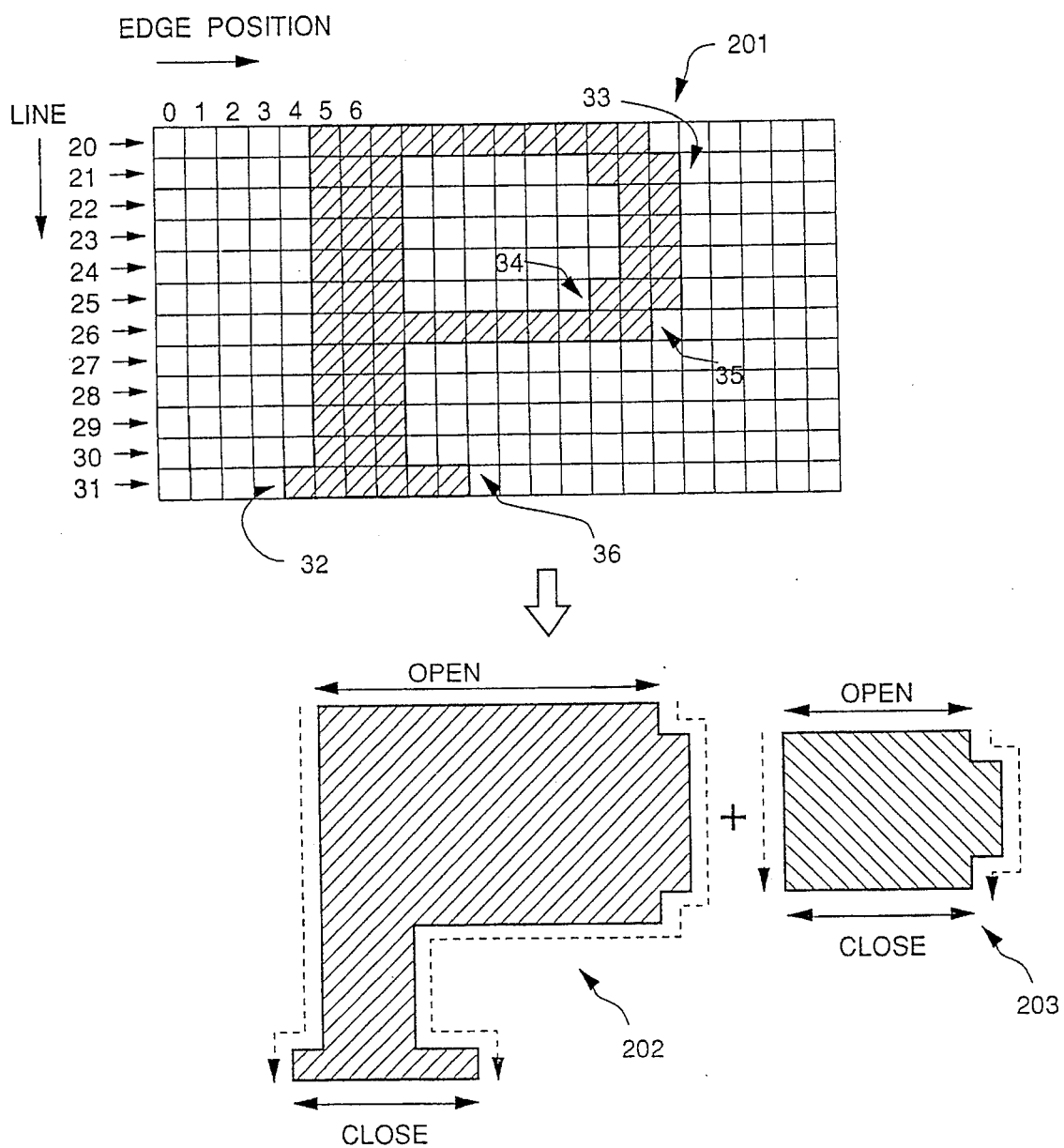
FIG. 2 is a view for explaining the principle of encoding in the encoding process according to the first embodiment.

The encoding process of the first embodiment will be briefly described below prior to a description of the encoding process in the encoder 106. FIG. 2 shows a bit map pattern 201 of a letter "P". Such a bit map pattern is processed as an overlapping pattern of a plurality of frames. The frame is a set of continuous dots in the same color, and is assumed to be surrounded by a single continuous boundary line. Therefore, the pattern 201 of the letter "P" is interpreted as an overlapping pattern of a black-dot frame 202 and a white-dot frame 203 on a bit map consisting of white dots.

The boundary line of each of these frames is expressed by an uppermost horizontal portion "OPEN", a lowermost horizontal portion "CLOSE", and edge portions of dots obtained when the pattern is horizontally scanned from the left to the right.

Figure 3:
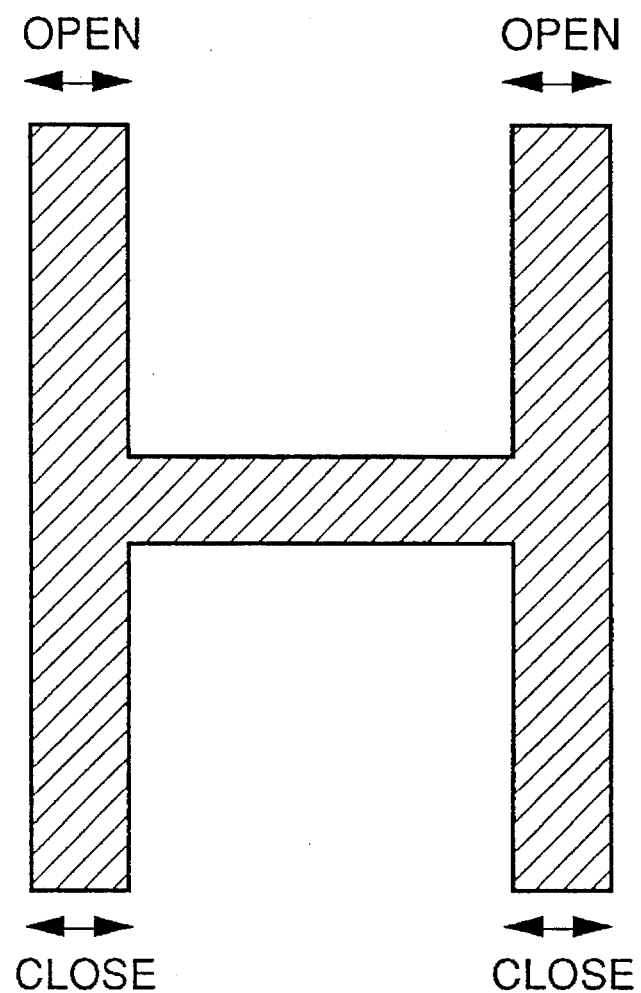
FIG. 3 is a view for explaining the principle of encoding in the encoding process according to the first embodiment.

The number of such portions "OPEN" or "CLOSE" is not limited to one per frame. For example, a boundary line of pattern data of a letter "H" shown in FIG. 3 includes two uppermost portions "OPEN".

FIGS. 4 and 5 show types of encoding codes in the encoder 106 of this embodiment. Code names will be explained below. In pattern data, e.g., in the case of the pattern shown in FIG. 2, the scanning line is set in the horizontal direction, and edge portions of dots, a relationship with a previous line, and the like are checked while scanning pattern data for all the lines (the number of lines=12) from the left end of the scanning line to the right. In the first scan, the following line codes are generated, and in the next scan, frame codes are generated.

(a) LINEEQ (Line Equal)

This code indicates that the number of edges of a pattern in a current scanning line of interest (current line) is equal to that of the immediately preceding scanning line. For example, since each of lines 22 to 25 and lines 27 to 31 has the same number of edges as that of the immediately preceding line in the pattern shown in FIG. 2, the LINEEQ code (code data "0") as a line code is generated at the beginning of each of these lines.

(b) LINEDIF (Line Difference) <i>

This code indicates a difference (variable i) between the number of edges of a pattern in the current line and the number of edges in the immediately preceding scanning line (previous line). Since the variable i can assume only an even-number value, codes are assigned to only positive and negative even-number values, as shown in FIG. 4. For example, in FIG. 2, since the number of edges in line 20 is "2", "LINEDIF<+2>" (code data "10010") is set in line 20. On the other hand, since the number of edges in line 21 is increased by "2" as compared to that of the previous line 20, a code "LINEDIF<+2>" (code data "10010") is generated in line 21 as well. Furthermore, since the number of edges in line 26 is decreased by "2" as compared to the previous line 25, a line code "LINEDIF<–2>" (code data "0011") is generated at the beginning of line 26.

(c) ADV0 (Advance 0)

This frame code ADV0 (code data "0") indicates that the edge position of the current line is the same as that of the previous line. For example, in FIG. 2, left edges in lines 21 to 30 correspond to this code.

(d) ADV1 (Advance 1)

This frame code ADV1 (code data "10") indicates that the edge position in the current line advances by one in a forward direction as compared to that in the previous line. As the moving direction of an edge, a left edge of a frame has a left direction as a default direction, and a right edge of a frame has a right direction as a default direction. In addition, when the shift direction of the edge position in the current line is the same as that of the edge position in the previous line, this shift direction is determined as a forward direction. This forward direction is maintained when the edge position is left unchanged. The same applies to connection codes. For example, in FIG. 2, an edge 33 in line 21 and a leftmost edge 32 in line 31 correspond to this code.

(e) ADV2 (Advance 2)

This frame code ADV2 (code data "110") indicates that the edge position in the current line advances by two in the forward direction as compared to that in the previous line.

(f) SW1 (Switch 1)

This frame code SW1 (code data "1110") indicates that the edge position in the current line advances by one in a direction (reverse direction) opposite to the forward direction as compared to that in the previous line. For example, in FIG. 2, an edge 34 in line 25 and an edge 35 in line 26 correspond to this code.

(g) ADVLONG<j> (Advance Long <j>)

This frame code ADVLONG<j> indicates that the edge position in the current line advances by 3 in the forward direction as compared to the edge position in the previous line. Since the value j is "3" or more, "0000" is assigned to "3", and the subsequent numerical values are set, as shown in FIG. 5. Line 27 in FIG. 2 corresponds to this code, and this line is encoded as "ADVLONG<7>" (code data "1111000100").

(h) SWLONG<k> (Switch Long <k>)

This frame code SWLONG<k> indicates that the edge position in the current line advances by k in the direction opposite to the forward direction as compared to the edge position in the previous line. Since the value k is "2" or more, "0000" is assigned to "2", and the subsequent numerical values are set, as shown in FIG. 5. An edge 36 in line 31 in FIG. 2 corresponds to this code, and this line is encoded as "SWLONG<2>" (code data "1111010000").

(i) OPEN<m,n>

This frame code OPEN<m,n> indicates that a new frame having a width n is generated from a relative position m in the current line. If a left edge is present in the current line, the relative position m is expressed by a value obtained by subtracting 1 from the distance from the edge. For example, in the line 21 in FIG. 2, a code "OPEN<2,5>" (code data "11111000100101") is generated. On the other hand, if no left edge is present in the current line, the relative position m is expressed with reference to an edge position 0. For example, a code "OPEN<5,10>" (code data "11111001011010") is generated in line 20 in FIG. 2. In this manner, since lines are selectively encoded depending on cases, they can be compressed to a small data amount.

(j) CLOSE

This frame code (code data "111111") indicates that a frame is closed in the immediately preceding line (a pair of edges disappear in the current line). For example, in FIG. 2, this code is generated at the end of the white-dot frame 203 in line 26 or in the last line of the black-dot frame in line 31. As in the character pattern shown in FIG. 2, when black dots are present in the last line of an extracted pattern, the code "CLOSE" may be omitted.

Therefore, the pattern of the letter "P" shown in FIG. 2 is encoded as follows:

Line 20: LINEDIF<+2>, OPEN<5,10>
Line 21: LINEDIF<+2>, ADV0, OPEN(2,5>, ADV1
Line 22: LINEEQ, ADV0, ADV0, ADV1, ADV0
Line 23: LINEEQ, ADV0, ADV0, ADV0, ADV0
Line 24: LINEEQ, ADV0, ADV0, ADV0, ADV0
Line 25: LINEEQ, ADV0, ADV0, SW1, ADV0
Line 26: LINEDIF<–2>, ADV0, CLOSE, SW1
Line 27: LINEEQ, ADV0, ADVLONG<7>
Line 28: LINEEQ, ADV0, ADV0
Line 29: LINEEQ, ADV0, ADV0
Line 30: LINEEQ, ADV0, ADV0
Line 31: LINEEQ, ADV1, SWLONG<2>

These encoded codes are actually expressed by code data shown in FIGS. 4 and 5, and the code data are stored as codes compressed in the scanning order (e.g., from the left to the right of the scanning line) of required pattern data in the code memory 107 together with the total number of lines. In these codes, the above-mentioned variables i, j, k, m, n, and the like are expressed by Huffman codes. Thus, the above-mentioned lines 20 to 31 are encoded as follows:

Line 20: 10010111111001011010
Line 21: 100100111110001001010
Line 22: 000100
Line 23: 00000
Line 24: 00000
Line 25: 00011100
Line 26: 001101111111110
Line 27: 001111000100
Line 28: 000
Line 29: 000
Line 30: 000
Line 31: 0101111010000

FIG. 6 shows the detailed arrangement of the encoding apparatus of the first embodiment. In FIG. 6, the encoding apparatus includes an input interface 501 for receiving instruction information from the keyboard 101, and a CPU 502 such as a microprocessor for controlling, according to a control program (shown in, e.g., the flow charts of FIGS. 7, 8A and 8B) and various data stored in a ROM 503 (to be described later), the entire encoder 106, a read operation of a character pattern and the total number of lines from the character pattern generator 103, a display operation on the display 108, a write operation of code data and the total number of lines in the code memory 107, and the like. The encoding apparatus also includes the ROM 503 for storing a program of the CPU 502 itself, the control program shown in, e.g., the flow charts of FIGS. 7, 8A and 8B to be executed by the CPU 502, various data, and the like, and a RAM 504, used as a work area of the CPU 502, for temporarily storing various data. More specifically, the RAM 504 stores the total number of lines, previous line data, current line data, the numbers of edges of the current and previous lines, the moving directions of edges, and the like, as will be described later. The RAM 504 is used as a table, as shown in FIG. 12, and is also used as the memory 105 for storing readout character pattern data and the total number of lines of the character pattern. Note that these data are temporarily generated in the encoding process. The encoding apparatus further includes an output interface 505 for outputting encoded code data and the total number of lines to the code memory 107. These components are connected to a system bus 506. Note that this encoding process is executed in a software manner in this embodiment. However, the present invention is not limited to this. For example, the encoding process may be realized by an encoding circuit comprising a special-purpose hardware arrangement.

Figure 7:
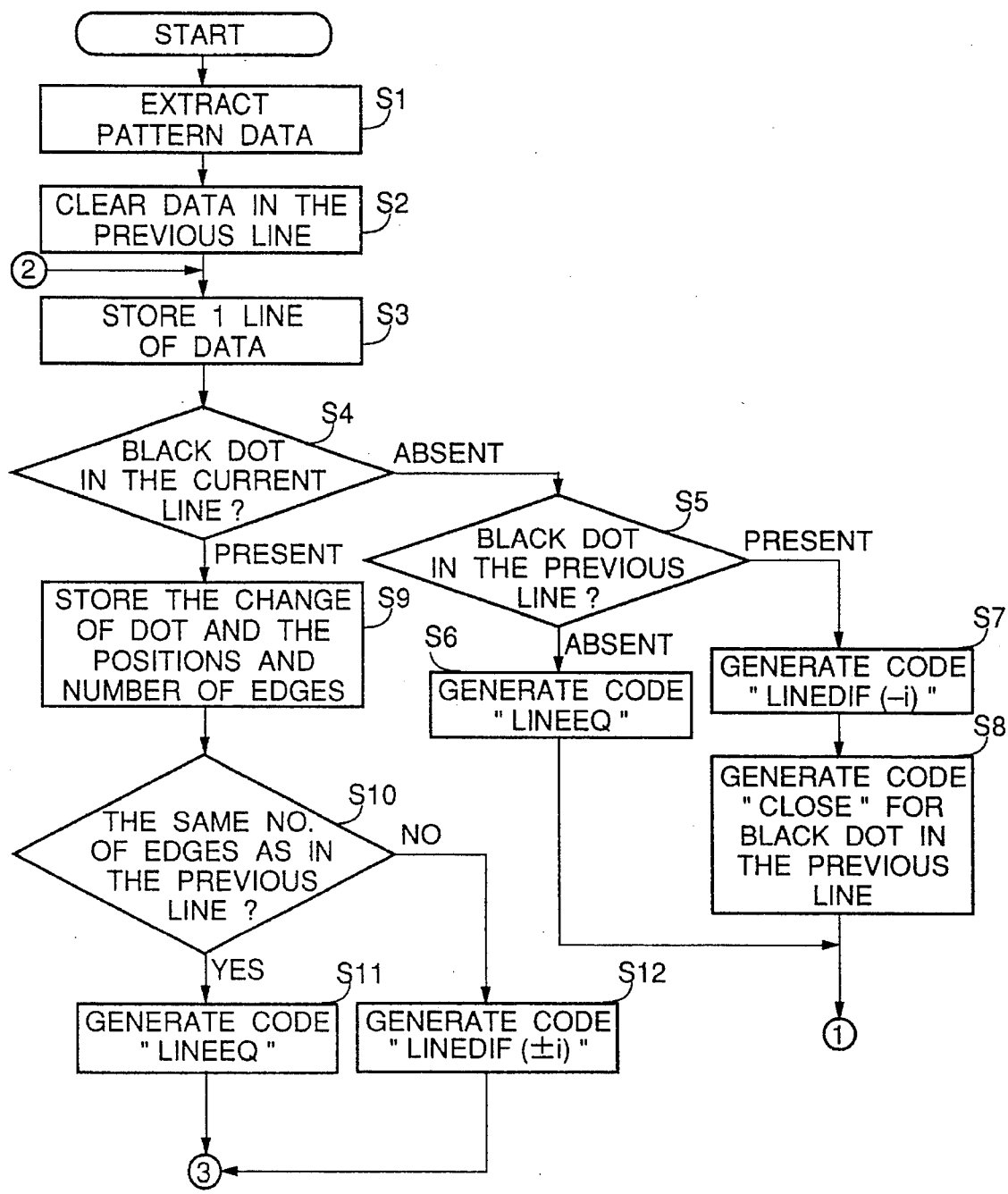
FIG. 7 is a flow chart showing the encoding process according to the first embodiment.

The encoding process of the first embodiment in the encoder 106 by the CPU 502 will be described below with reference to the flow charts of FIGS. 7, 8A and 8B. This process is started from a state wherein the reading unit 104 reads out a character pattern and its total number of lines corresponding to a required character code from the character pattern generator 103 on the basis of an instruction from the keyboard 101, and develops the readout character pattern on the memory 105.

In step S1, a region to be compressed of pattern data (e.g., the character pattern 201 in FIG. 2) is read out. The flow advances to step S2, a table in the RAM 504 for storing previous line data is cleared to "0". The flow advances to step S3, and 1-line data to be encoded (initially, dot data of the first line) is read out from the memory 105 (a predetermined area of the RAM 504) and is stored in the work area of the RAM 504. In step S4, dot data in the current line are checked to determine if a black dot is present in the current line. If no black dot is present, the flow advances to step S5 to check if a black dot is present in the previous line. If no black dot is present in the previous line, either, since the current line is the same as the previous line, a code "LINEEQ" is generated in step S6. The flow then jumps to step S25 to transfer and store the current line data in the storage area of the previous line data.

If it is determined in step S5 that a black dot is present in the previous line, the flow advances to step S7 to calculate the number of decreased edges, and to generate a code "LINEDIF<−i>". The flow advances to step S8 to generate a code "CLOSE" according to the black dot position in the previous line.

If it is determined in step S4 that a black dot is present in the current line, the flow advances to step S9 to store the change positions of dots in this dot pattern, i.e., the edge positions and the number of edges in the table in the RAM 504. The flow advances to step S10 to check if the number of edges in the previous line is equal to that in the current line. If YES in step S10, the flow advances to step S11 to generate a code "LINEEQ", and the flow then advances to step S13.

If it is determined in step S10 that the number of edges in the previous line is not equal to that in the current line, the flow advances to step S12 to generate a code "LINEDIF<±i>", and the flow advances to step S13. In step S13, dot data in the current line are sequentially scanned until the first edge is found, and it is checked if a dot of interest including the first edge is a white or black dot. If the dot of interest is a black dot, the flow advances to step S14 to check if the previous line includes a black dot continuous with the black dot in the current line.

On the other hand, if the dot of interest is a white dot, the flow advances to step S20 to check if the previous line includes a white dot continuous with the white dot in the current line. If it is determined in step S14 that the previous line does not include any black dot continuous with the black dot in the current line, or if it is determined in step S20 that the previous line does not include any white dot continuous with the white dot in the current line, the flow advances to step S15 to generate a code "OPEN" for the black or white dot of interest in the current line. In step S19, dot data in the current line are scanned until the next edge is found. It is checked in step S24 if scanning of the current line is completed. If NO in step S24, the above-mentioned processes are repeated from step S13.

On the other hand, if YES in step S24, the flow advances to step S25. In step S25, the current line data is stored as the previous line data, and in step S26, it is checked with reference to the total number of lines if processes for the entire pattern data read out in step S1 are completed. If NO in step S26, the flow advances to step S27 to read out the next line data, and the readout line data is set as a current line. The flow then returns to step S3 to repeat the processes from step S3.

If it is determined in step S14 that the previous line includes a black dot continuous with the black dot in the current line, a code "ADV" or "SW" is generated in step S16, and the flow advances to step S17. In step S17, it is checked if the previous line includes a white dot noncontinuous with the current line. If YES in step S17, the flow advances to step S18 to generate a code "CLOSE" for the white dot, and the flow returns to step S17.

On the other hand, if NO in step S17, the flow advances to step S19, and the above-mentioned processes in step S19 and subsequent steps are executed.

If it is determined in step S20 that the previous line includes a white dot continuous with the white dot in the current line, a code "ADV" or "SW" is generated in step S21, and the flow advances to step S22. If it is determined in step S22 that the previous line includes a black dot noncontinuous with the current line, the flow advances to step S23 to generate a code "CLOSE" for the black dot, and the flow then returns to step S22.

On the other hand, if it is determined in step S22 that the previous line does not include any black dot noncontinuous with the current line, the flow advances to step S19, and the above-mentioned processes in step S19 and subsequent steps are executed.

A condition for discriminating whether or not a dot in the current line is continuous with a dot in the previous line will be described below with reference to the flow charts shown in FIGS. 7, 8A and 8B, and dot patterns shown in FIGS. 9 and 10.

Figure 9:
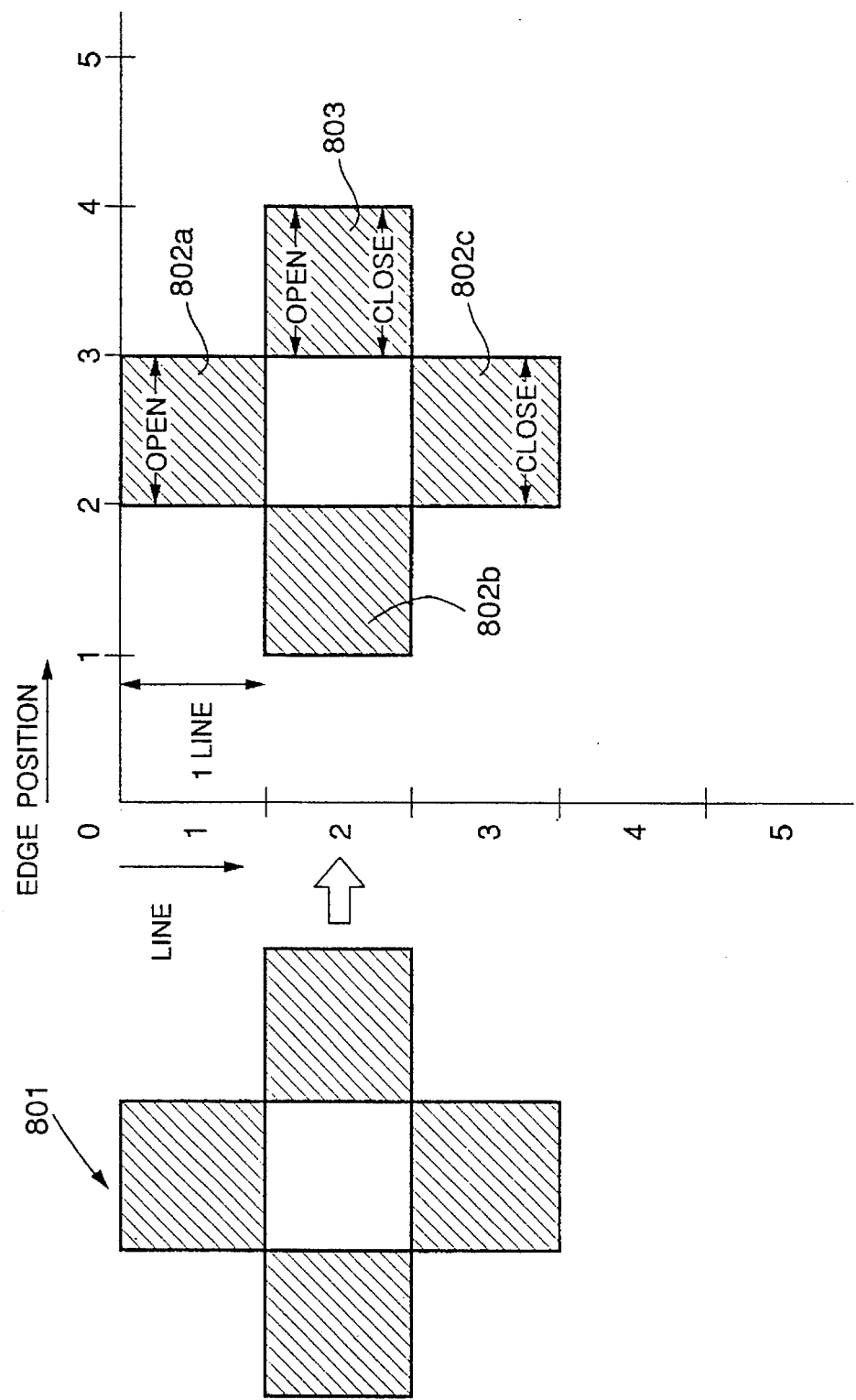
FIG. 9 is a view for explaining continuity of a dot frame in the encoding process according to the first embodiment.

In FIG. 9, if the size of each black dot is defined as one dot, black dots 802a to 802c in a dot pattern 801 are processed as continuous dots, and a black dot 803 is processed as an independent dot. More specifically, it is checked in step S14 if the previous line includes a black dot continuous with a black dot in the current line. If such a black dot is not present in the immediately preceding line, the flow advances to step S15, and the uppermost portion of the black dot 802a is encoded as a code "OPEN". Therefore, the first line is encoded as "LINEDIF<+2>, OPEN<2,1>". A black dot 802b portion in the second line is recognized as a black dot continuous with the black dot 802a in the previous line, and is encoded as "ADV1" in step S16 and as "SW1" in step S21. The black dot 803 is encoded as "OPEN<0,1>" in step S15. Therefore, the second line is encoded as "LINEDIF<+

2>, ADV1, SW1, OPEN<0,1>". Similarly, the black dot 802c is regarded as a black dot continuous with the black dot 802b, and is encoded as "SW1" in step S16 and as "SW1" in step S21. In step S23, the black dot 803 in the second line is encoded as "CLOSE". In this manner, the third line in the pattern 801 shown in FIG. 9 is encoded as "LINEDIF<−2>, SW1, SW1, CLOSE". In step S8, a code "CLOSE" is generated for the black dot 802c in the third line, and therefore, the fourth line is encoded as "LINEDIF<−2>, CLOSE".

The above-mentioned encoding result is as follows:

Line 1: LINEDIF<+2>, OPEN<2,1>

Line 2: LINEDIF<+2>, ADV1, SW1, OPEN<0,1>

Line 3: LINEDIF<−2>, SW1, SW1, CLOSE

Line 4: LINEDIF<−2>, CLOSE

The encoded codes described above are actually expressed by code data shown in FIGS. 4 and 5, as follows, and are stored in the code memory 107 together with the total number of lines (the number of lines=4) in correspondence with identification information (e.g., a character code) for identifying the required pattern:

Line 1: 1001011111000100001

Line 2: 100101011101111000000001

Line 3: 1001111101110111111

Line 4: 10011111111

Figure 10:
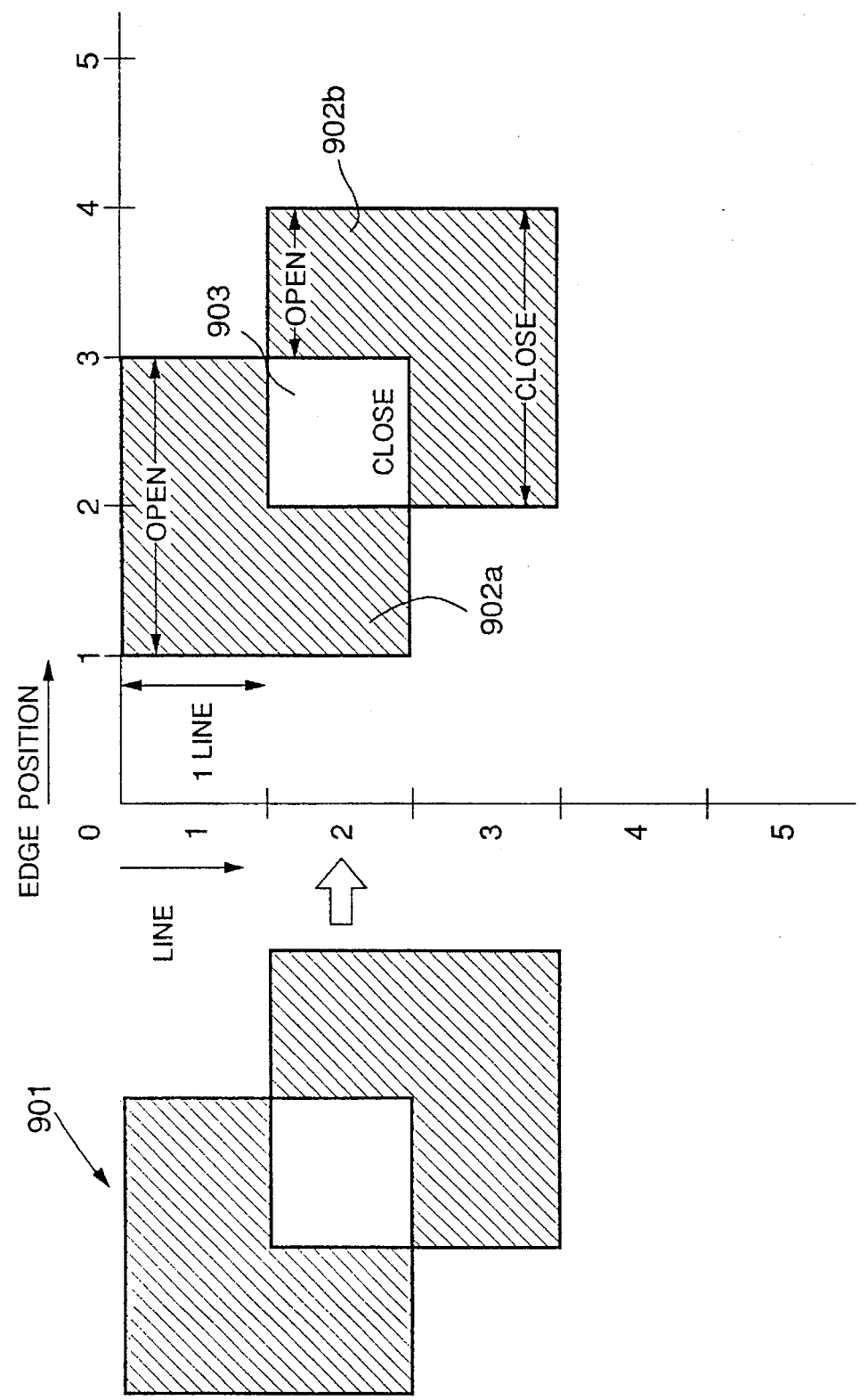
FIG. 10 is a view for explaining continuity of a dot frame in the encoding process according to the first embodiment.

Similarly, in the case of a dot pattern shown in FIG. 10, black dots 902a and 902b are processed as continuous dots. More specifically, it is checked in step S14 if the previous line includes a black dot continuous with a black dot in the current line. If such a black dot is not present in the immediately preceding line, the flow advances to step S15, and the uppermost portion of the black dot 902a is encoded as a code "OPEN". Therefore, the first line is encoded as "LINEDIF<+2>, OPEN<1,2>". A black dot 902a portion in the second line is recognized as a black dot continuous with the black dot 902a in the previous line, and is encoded as "ADV0" in step S16 and as "SW1" in step S21. A black dot 902b portion is encoded as "OPEN<0,1>" in step S15. Therefore, the second line is encoded as "LINEDIF<+2>, ADV0, SW1, OPEN<0,1>". In the next line, the black dot 902b is recognized as a black dot continuous with the black dot 902a, and is encoded as "SW1" in step S16. In step S18, a code "CLOSE" is generated for a white dot 903 in the second line.

Finally, in step S21, the black dot 902b is encoded as "ADV0". In this manner, the third line in the pattern shown in FIG. 10 is encoded as "LINEDIF<−2>, SW1, CLOSE, ADV0". In step S8, a code "CLOSE" is generated for the black dots 902b in the third line, and the fourth line is encoded as "LINEDIF<−2>, CLOSE".

The encoded codes described above are actually expressed by code data shown in FIGS. 4 and 5, and are stored in the code memory 107 together with the total number of lines of the required pattern in correspondence with identification information (e.g., a character code) for identifying the required pattern.

An encoding process of a dot pattern shown in FIG. 11 will be described below on the basis of the process sequence shown in the flow charts of FIGS. 7, 8A and 8B.

Figure 11:
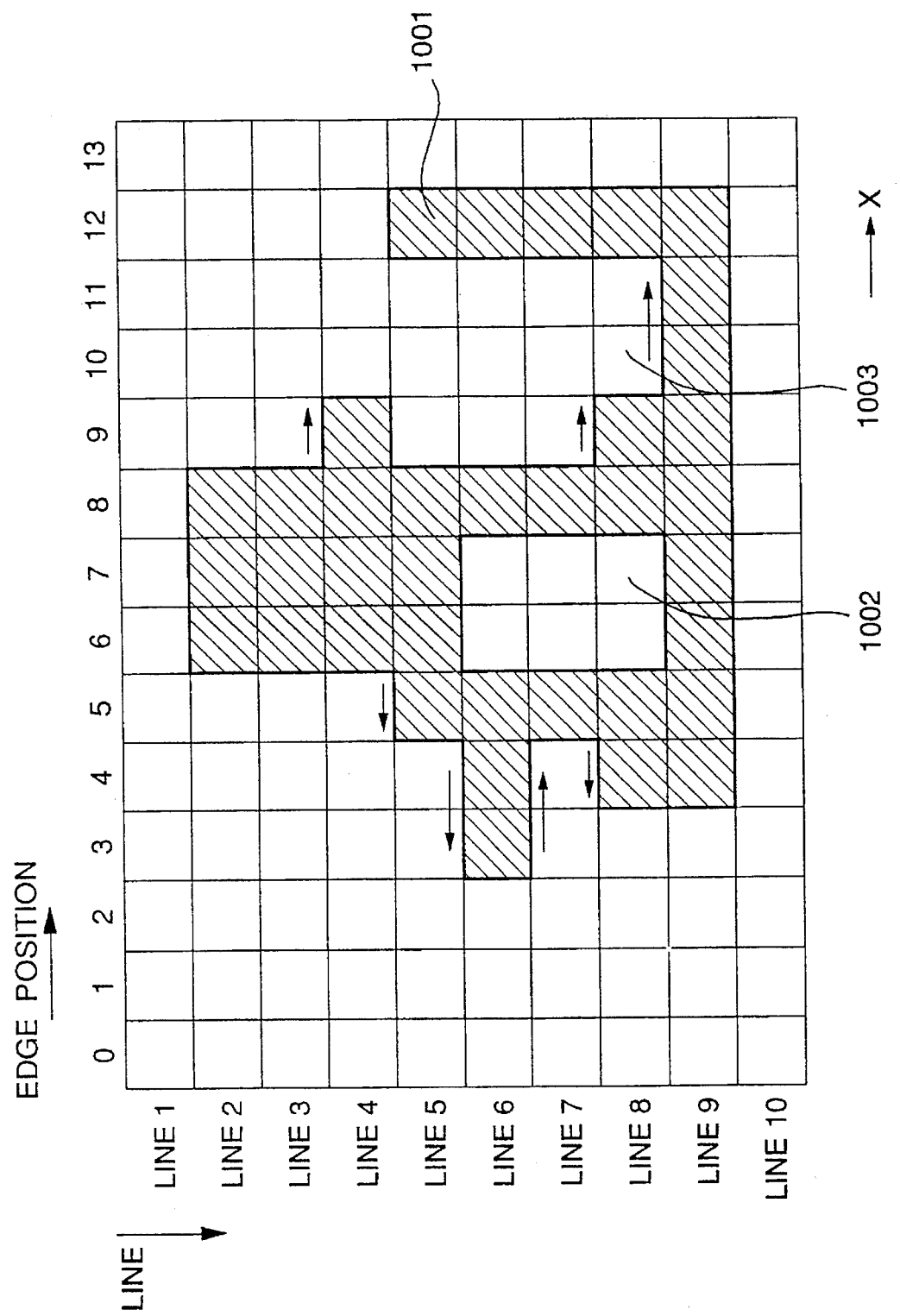
FIG. 11 is a view showing an example of a dot pattern encoded by the encoding process according to the first embodiment.

In FIG. 11, since line 1 does not include any black dot, the flow advances from step S4 to steps S5 and S6, and a code "LINEEQ" (code data "0") alone is generated in line 1. Since line 2 includes black dots, the flow advances from step S4 to step S9, edge positions (6) and (9) as change positions of dots and the number "2" of edges are stored in a table (FIG. 12) in the RAM 504. Since the number of edges is increased by "2" as compared to the number (0) of edges in the previous line, a code "LINEDIF<+2>" (code data "10010") is generated in step S12, and since it is determined in step S14 that the black dot in the current line is not continuous with a black dot in the previous line, a code "OPEN<6,3 (=9−6)>" (code data "11111001100011") is generated in step S15. Note that dot data in the current line are sequentially scanned from the left until the first edge is found, and the process sequence in step S13 and subsequent steps varies depending on whether a dot next to the found edge is a black or white dot.

Since line 3 has the same number of edges as that in the previous line, a code "LINEEQ" is generated in step S11. Since it is determined in step S14 that the black dot in the current line is continuous with that in the previous line, the edge position of the current line is checked in step S16. Since the edge position coincides with that in line 2, a code "ADV0" (code data "0") is generated for a left edge, and a code "ADV0" is generated for a right edge in step S21.

Since line 4 has the same number of edges as that in the previous line, a code "LINEEQ" is generated in step S11. A code "ADV0" is generated for a left edge in step S16, and since the position of a right edge is shifted by one to the right, a code "ADV1" is generated for the right edge in step S21.

In line 5, since the number of edges is increased by "2", a code "LINEDIF<+2>" is generated in step S12. In continuous black dots, a code "ADV1" (code data "10") is generated for a left edge in step S16, and a code "SW1" (code data "1110") is generated for a right edge in step S21.

Thereafter, since a black dot 1001 in FIG. 11 is located at a position indicated by an edge position (12), the flow advances from step S14 to step S15, and a code "OPEN<2 (=12−9−1), 1>" (code data "11111000100001") is generated for this black dot.

In line 6, since the number of edges is increased by "2" as compared to that in line 5, a code "LINEDIF<+2>" is generated in step S12. Since the left edge of left continuous black dots is moved by two dots in the forward direction, a code "ADV2" is generated in step S16. Since it is determined in step S20 that the previous line (line 5) does not include any white dot continuous with a white dot of interest on the current line (line 6), the flow advances from step S20 to step S15, and a code "OPEN<2,2>" is generated for this white dot.

In step S21, a code "ADV0" is generated. Finally, a code "ADV0" is generated for the left edge of a right noncontinuous black dot in step S16, and a code "ADV0" is generated for its right edge in step S21.

Similarly, in line 7, a code "LINEEQ" is generated in step S11; "SW2" in step S16; "ADV0" in step S21; "ADV0" in step S16; "ADV0" in step S21; "ADV0" in step S16; and "ADV0" in step S21.

Similarly, in line 8, a code "LINEEQ" is generated in step S11; "SW1" in step S16; "ADV0" in step S21; "ADV0" in step S16; "SW1" in step S21; "ADV0" in step S16; and "ADV0" in step S21.

In line 9, since the number of edges is decreased by "4" as compared to that in line 8, a code "LINEDIF<−4>" is generated in step S12, and in continuous black dots, a code "ADV0" is generated for a left edge in step S16. Since the previous line (line includes a white dot (white dot 1002 in FIG. 11) noncontinuous with the current line (line 9), a code "CLOSE" (code data "111111") is generated in step S18. Since the previous line includes another white dot (white dot 1003 in FIG. 11), a code "CLOSE" (code data "111111") for this portion is generated in step S18. Finally, in step S21, a code "ADV0" is generated.

In line 10, a code "LINEDIF<−2>" is generated in step S7, and a code "CLOSE" is generated in step S8, thus ending the process.

The above-mentioned encoding result is as follows:

Line 1: LINEEQ

Line 2: LINEDIF<+2>, OPEN<6,3>

Line 3: LINEEQ, ADV0, ADV0

Line 4: LINEEQ, ADV0, ADV1

Line 5: LINEDIF<+2>, ADV1, SW1, OPEN<2,1>

Line 6: LINEDIF<+2>, ADV2, OPEN<2,2>, ADV0, ADV0, ADV0

Line 7: LINEEQ, SW2, ADV0, ADV0, ADV0, ADV0

Line 8: LINEEQ, SW1, ADV0, ADV0, SW1, ADV0, ADV0

Line 9: LINEDIF<−4>, ADV0, CLOSE, CLOSE, ADV0

Line 10: LINEDIF<−2>, CLOSE

These encoded codes are actually expressed by code data shown in FIGS. 4 and 5, and are stored in the code memory 107 as codes compressed in the scanning order (from the left to the right of the scanning line) of pattern data together with the total number of lines in correspondence with identification information (e.g., a character code) for identifying the required pattern. More specifically, the code memory 107 stores code data so that a pattern expressed by the stored code data can be identified. For example, the code data are stored in correspondence with a character code.

Decoding Apparatus

A process for decoding the above-mentioned encoded data according to the first embodiment will be described below. The first embodiment exemplifies a laser beam printer as an image forming apparatus for performing a decoding process.

Figure 13:
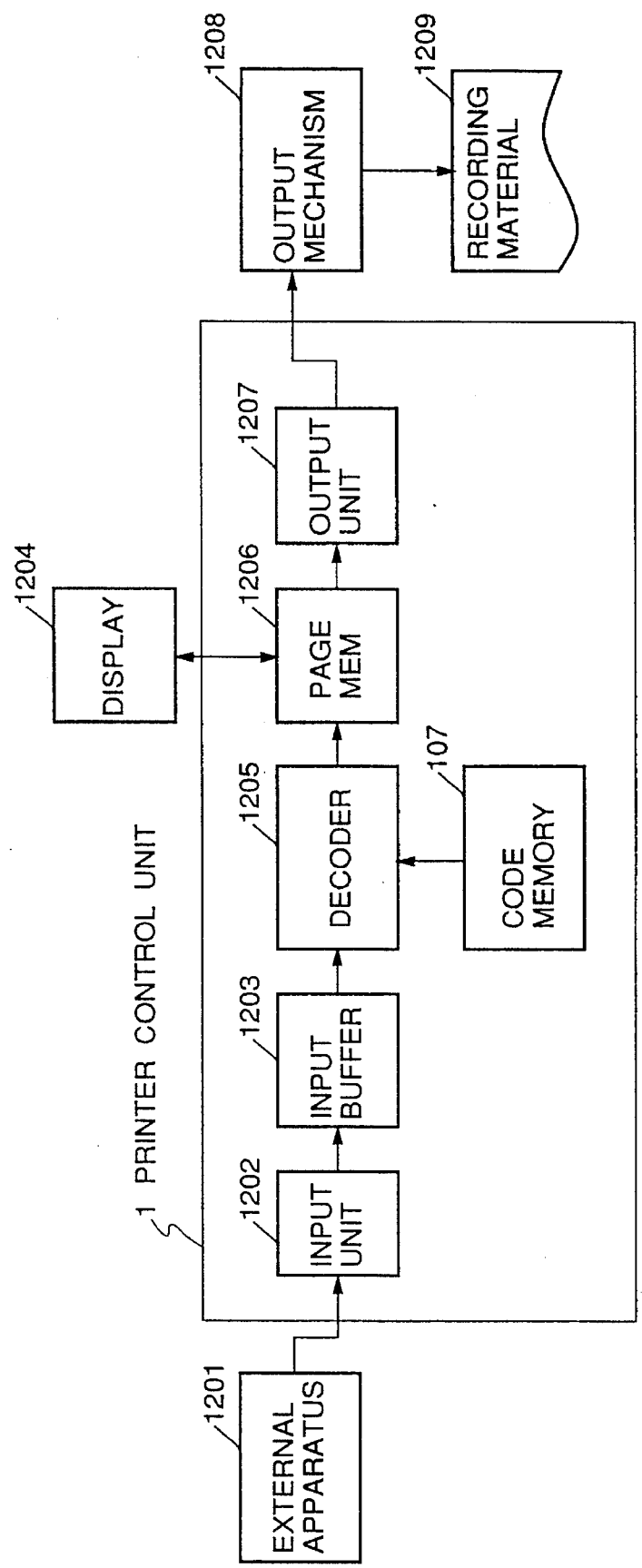
FIG. 13 is a block diagram showing a schematic arrangement of an image forming apparatus for performing the decoding process according to the first embodiment.

FIG. 13 is a view showing a schematic arrangement of a laser beam printer for performing a decoding process of the first embodiment, and used for explaining the flow of processes in the above-mentioned printer control unit 1.

In FIG. 13, an external apparatus 1201 such as a host computer as a print data generation source outputs, e.g., character information consisting of character codes, position information and the like using a keyboard (not shown). An input unit 1202 performs communication control with the external apparatus 1201, and stores input character information in an input buffer 1203. The input buffer 1203 has a capacity capable of storing character information for at least one page. The code memory 107 stores encoded code data of required character patterns, and their total numbers of lines in units of patterns, as described above. The code memory 107 is not limited to one incorporated in an image forming apparatus such as the LBP 1500, but may be an external storage medium detachable from the image forming apparatus or external equipment such as a host computer for outputting code data. A display 1204 displays a pattern-developed image, messages to an operator, and the like. A decoder 1205 receives a character code and its position information for one character from the input buffer 1203 when a predetermined amount of character codes are input to the input buffer 1203, reads out code data and the total number of lines corresponding to a pattern expressed by the received character code, and executes a decoding process of the readout code data. The decoder 1205 stores character pattern data decoded in an internal memory (not shown; a work area in a RAM 1304) in a page memory 1206 (to be described later) on the basis of its position information and the like when a page end command is input or when the internal memory (not shown) is full of data. The page memory 1206 stores pattern data for at least one page. An output unit 1207 performs ON/OFF control of a laser beam of an output mechanism 1208, thereby outputting output information on a recording material 1209 such as a paper sheet.

Figure 14:
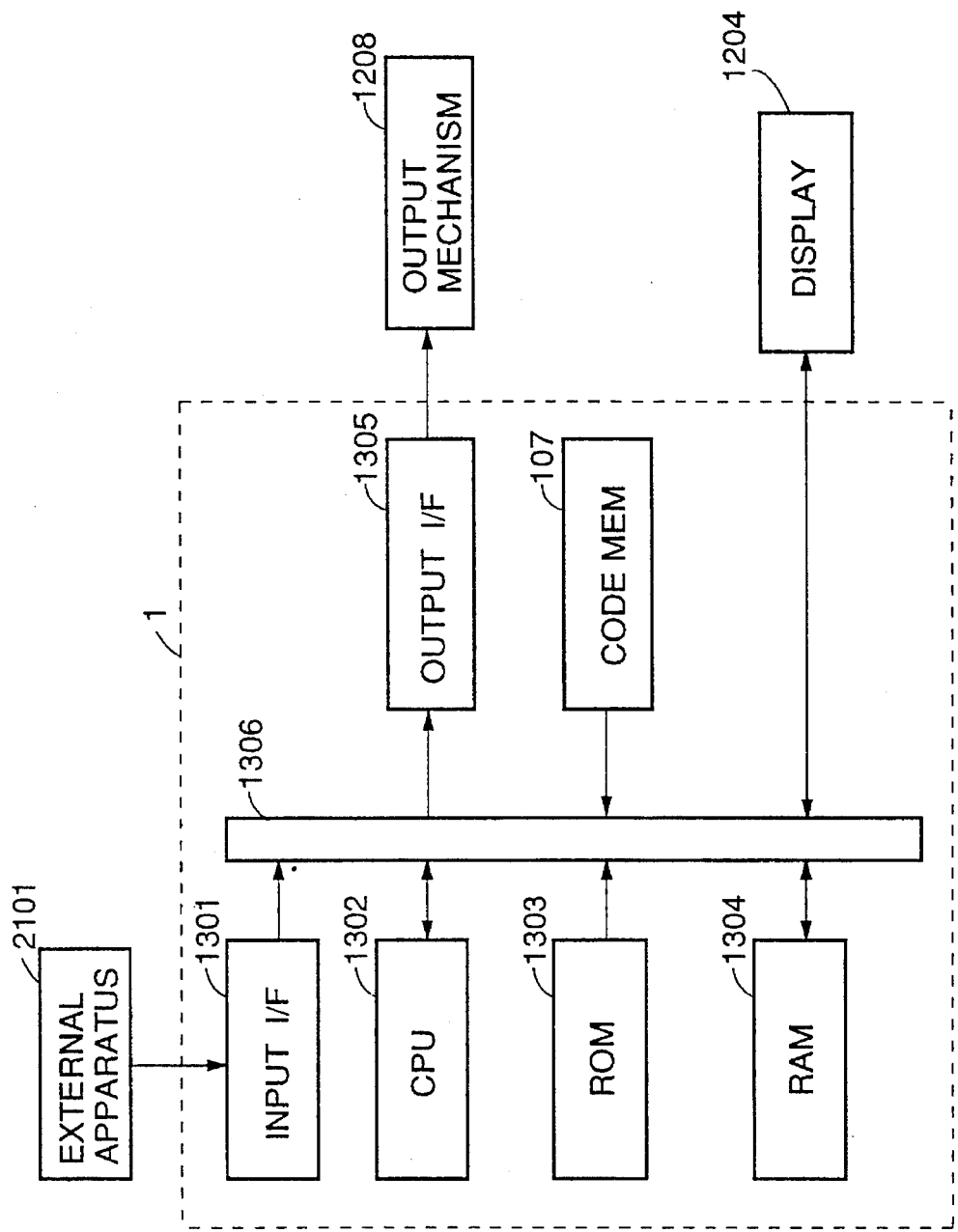
FIG. 14 is a block diagram showing a detailed arrangement of the image forming apparatus for performing the decoding process according to the first embodiment.

FIG. 14 shows the detailed arrangement of the printer control unit 1 in the decoding process of the first embodiment. In FIG. 14, the printer control unit 1 is connected to the external apparatus 1201 for outputting character codes, position information, and the like. The unit 1 includes an input interface 1301 for receiving character codes, position information, and the like from the external apparatus 1201, and a CPU 1302 for controlling the entire printer control unit 1 including the decoding process.

Figure 15:
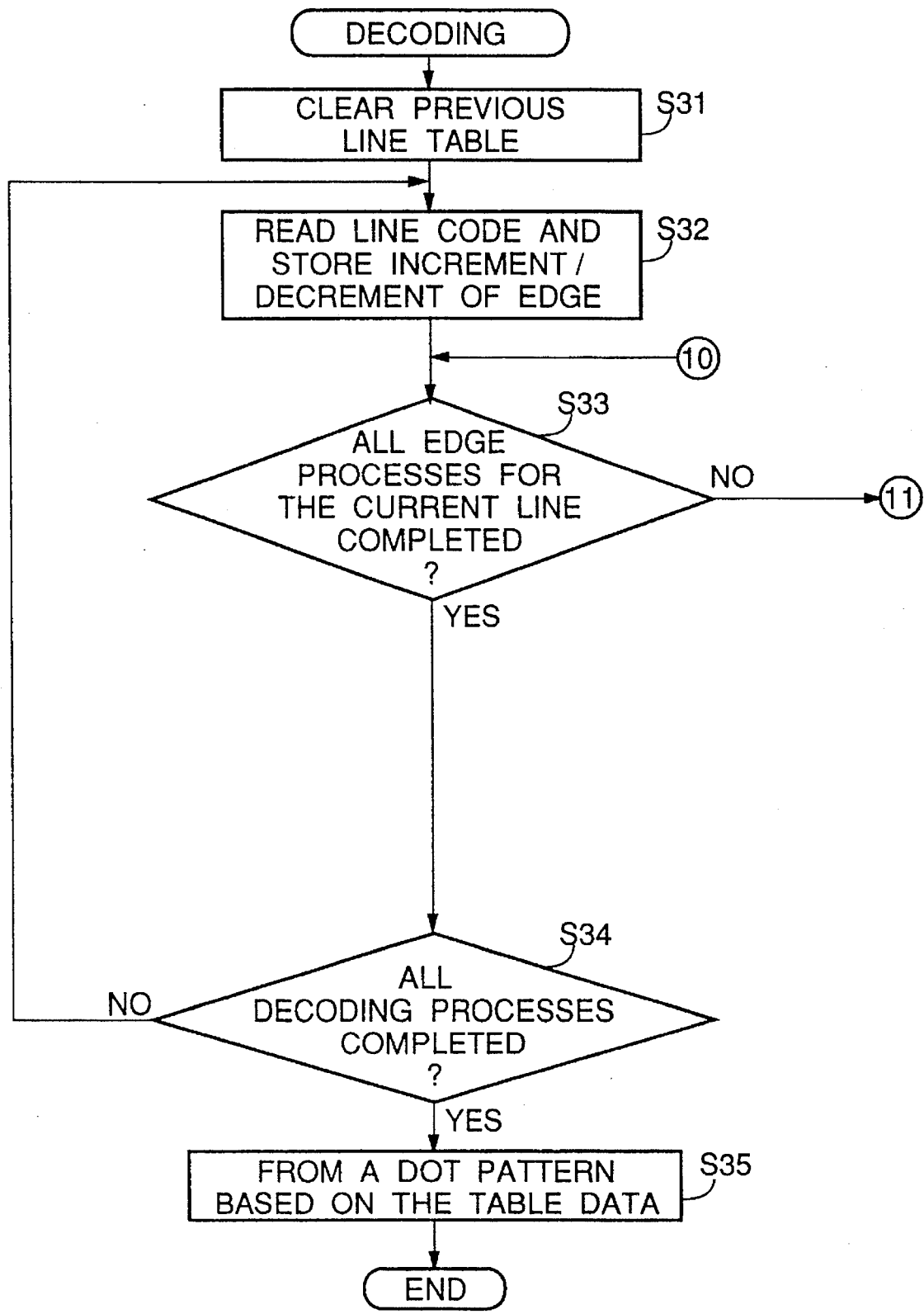
FIG. 15 is a flow chart showing the decoding process according to the first embodiment.
Figure 16:
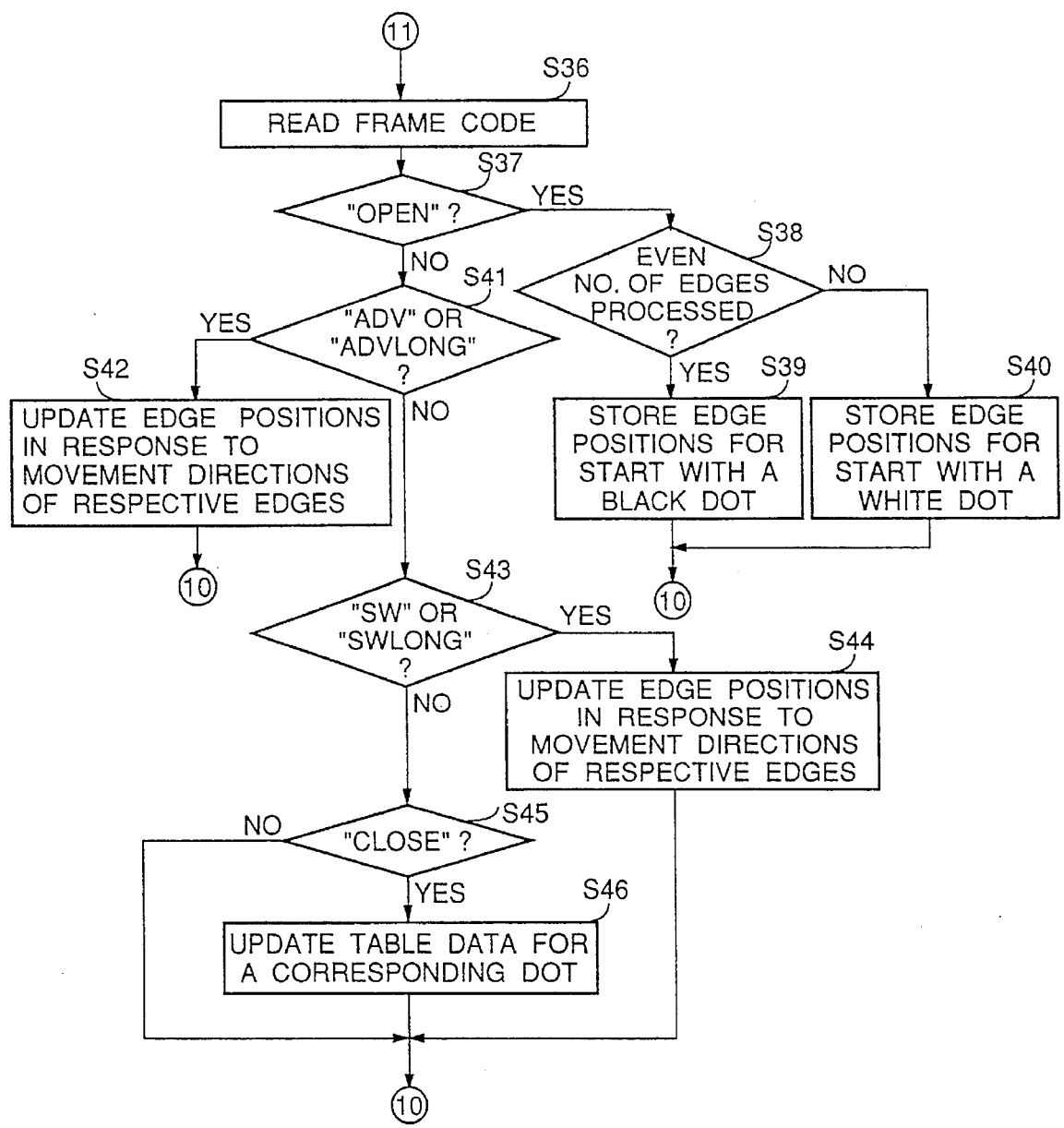
FIG. 16 is a flow chart showing the decoding process according to the first embodiment.
Figure 17A:
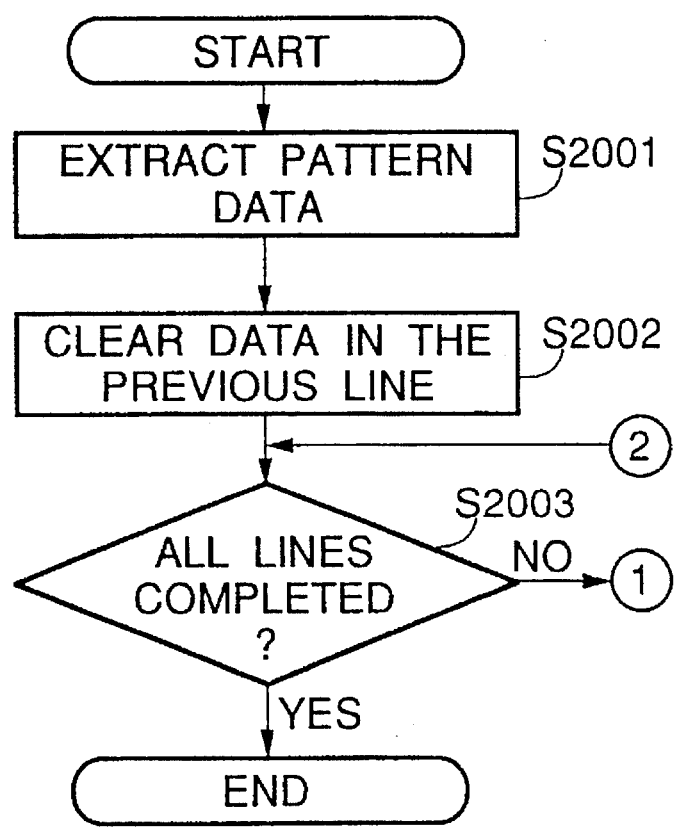
FIGS. 17A and 17B are flow charts showing the encoding process according to the first embodiment.
Figure 17B:
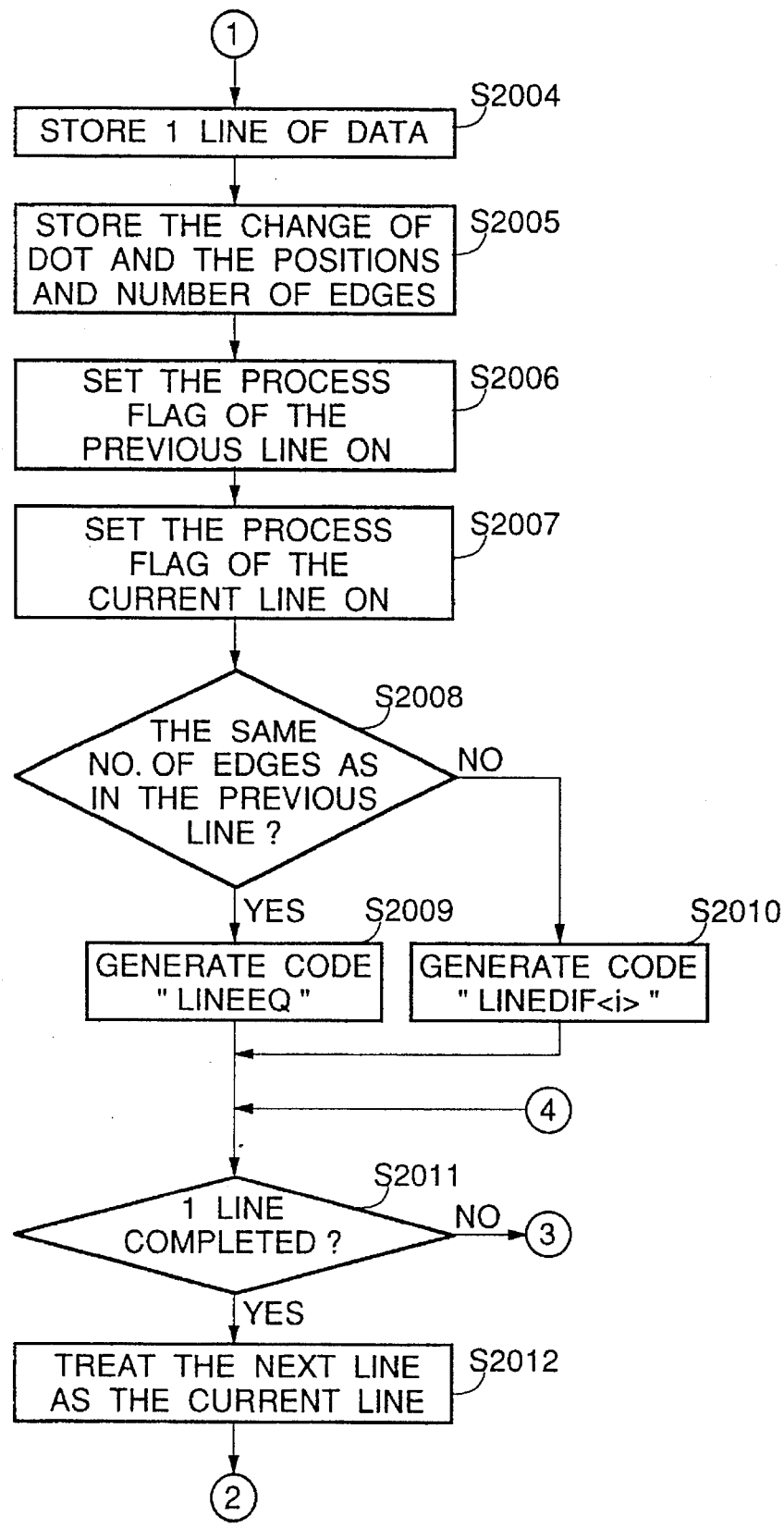
Figure 18:
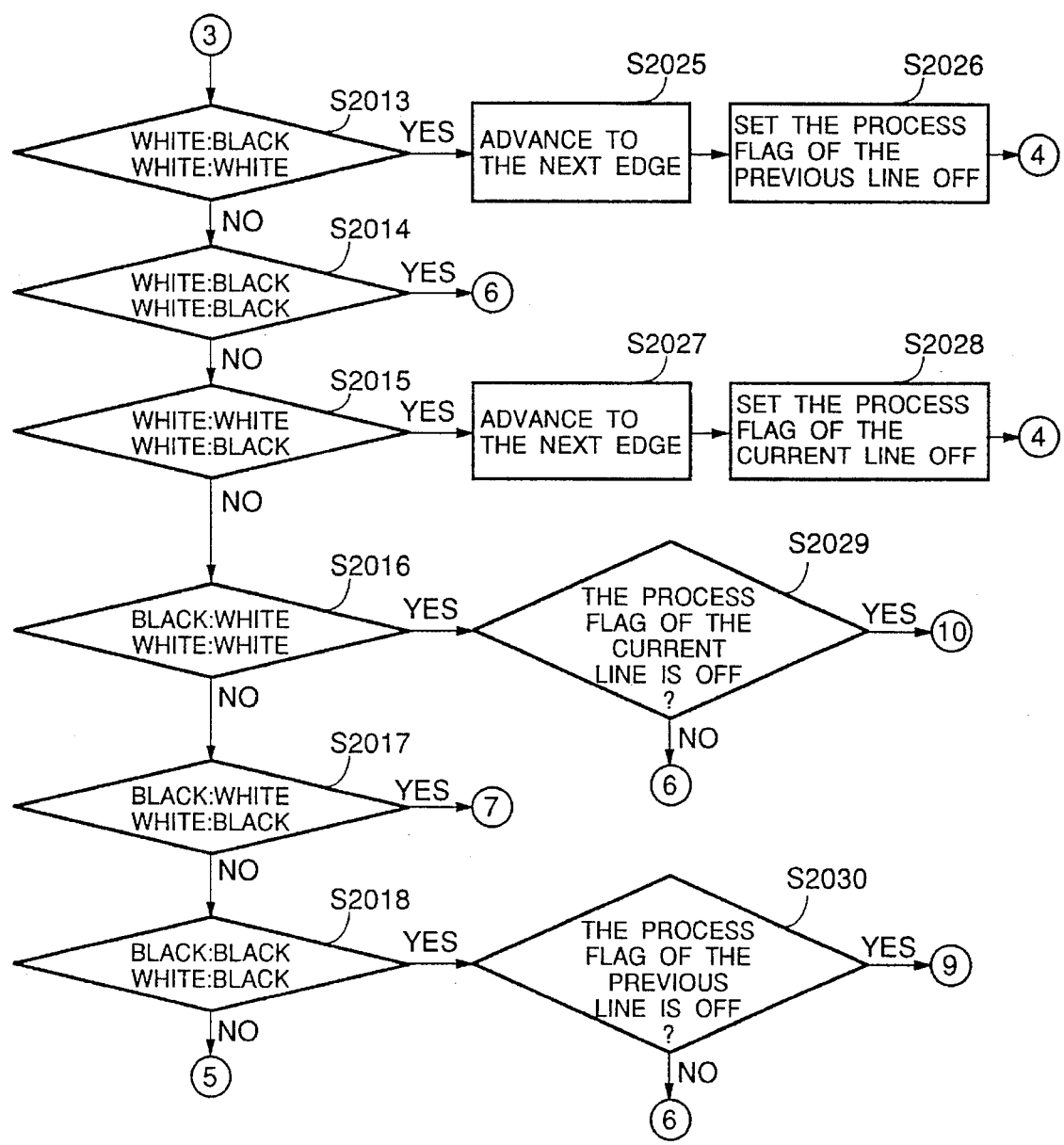
FIG. 18 is a flow chart showing the encoding process according to the first embodiment.
Figure 19:
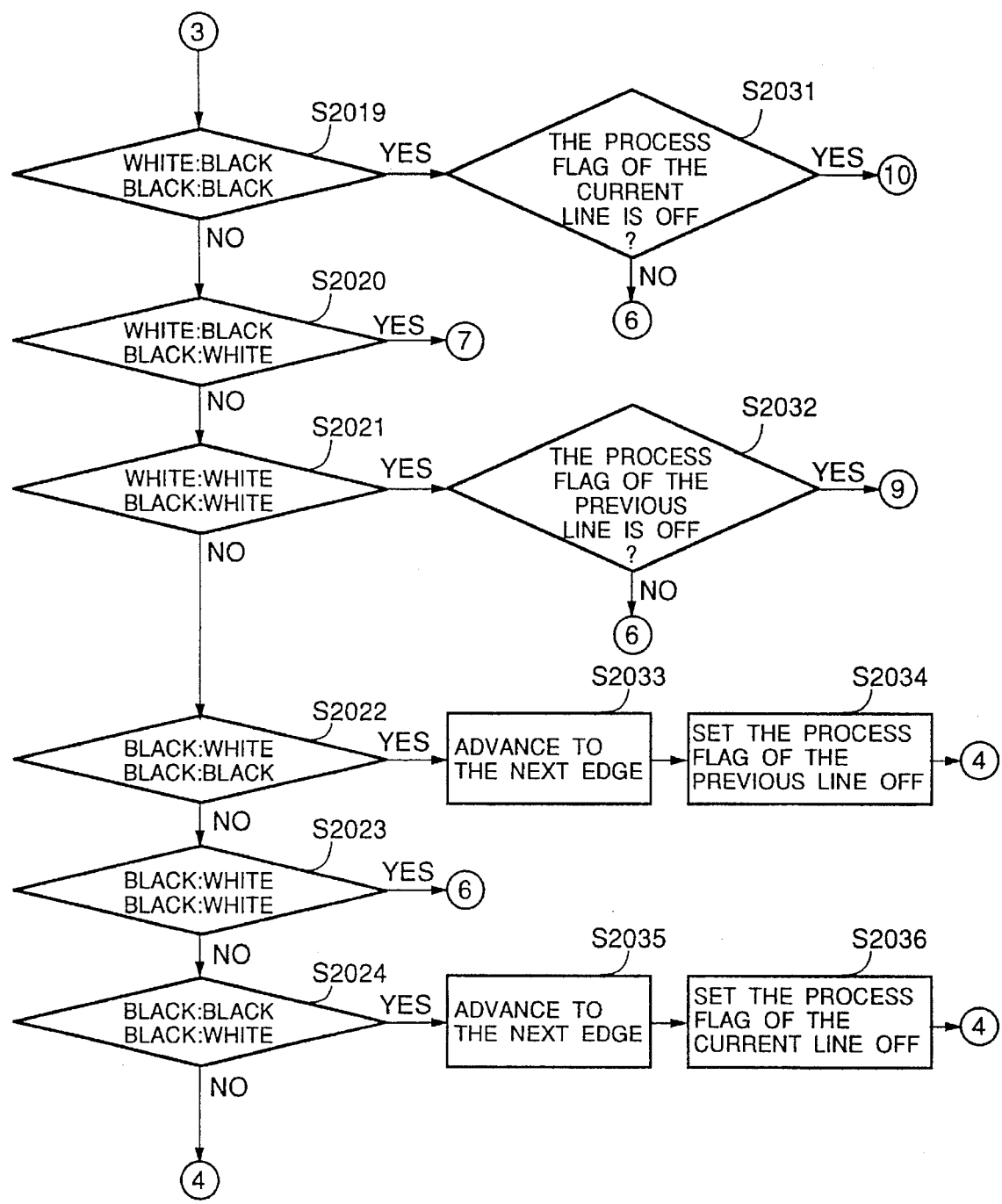
FIG. 19 is a flow chart showing the encoding process according to the first embodiment.
Figure 20:
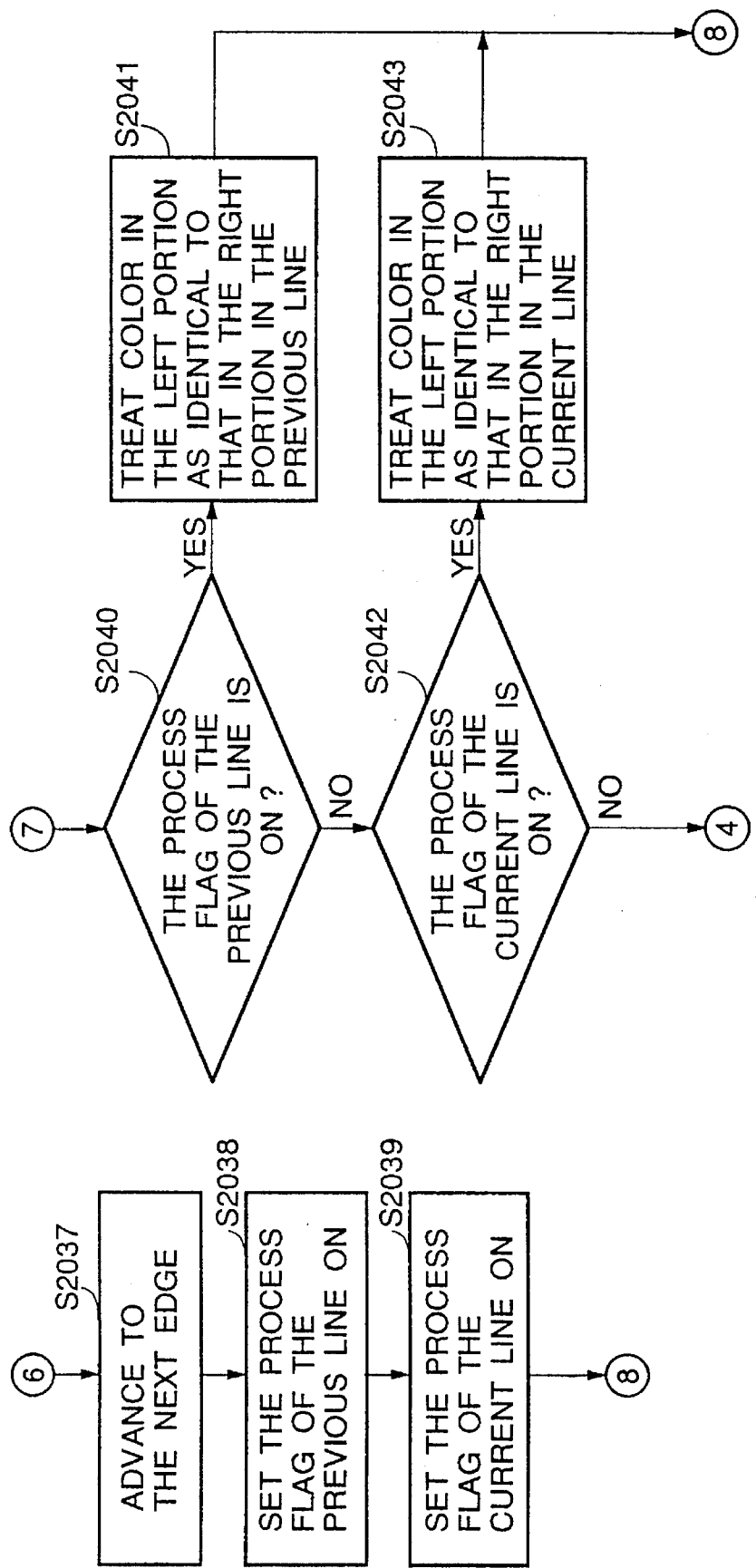
FIG. 20 is a flow chart showing the encoding process according to the first embodiment.
Figure 21:
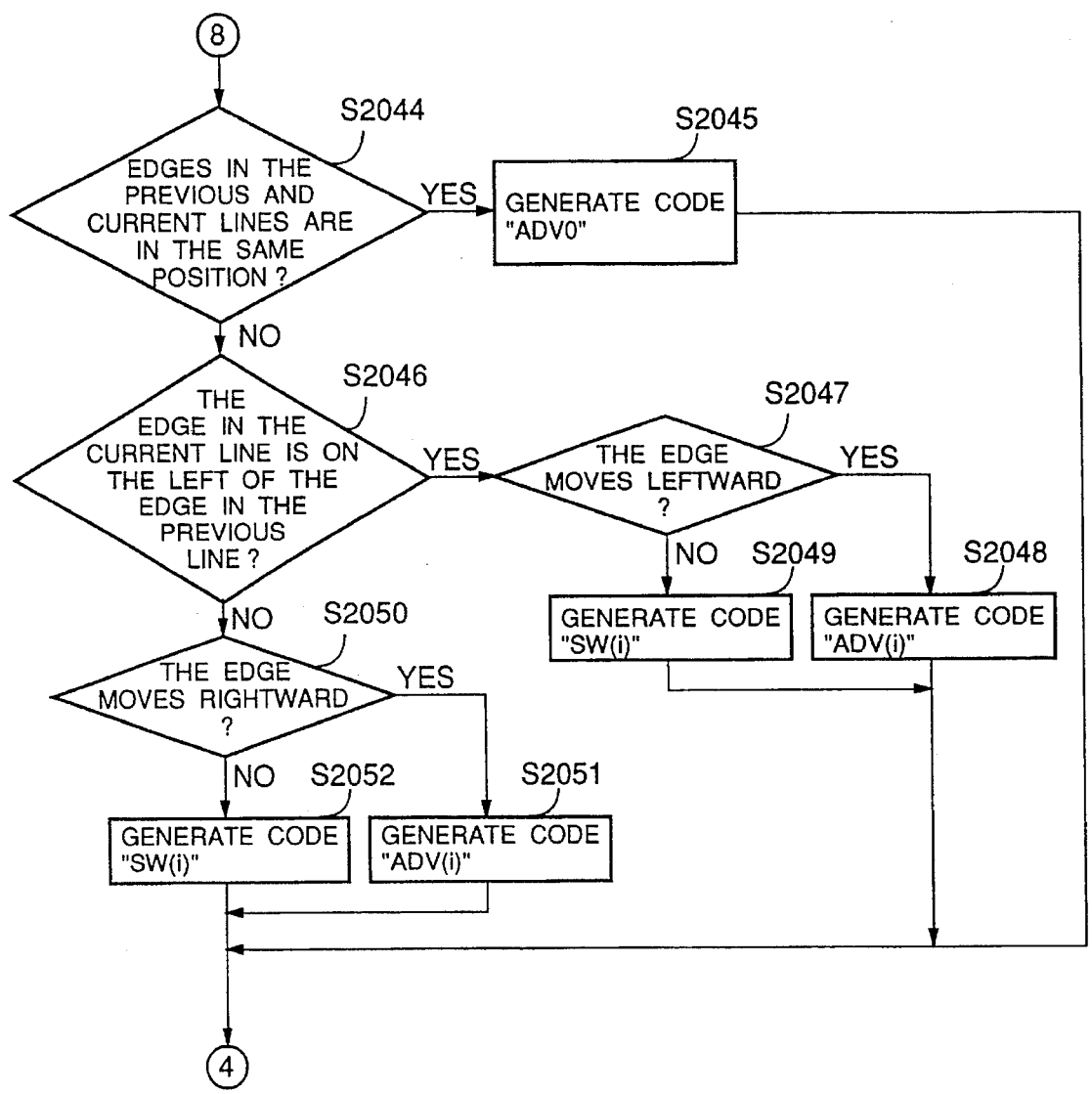
FIG. 21 is a flow chart showing the encoding process according to the first embodiment.
Figure 22:
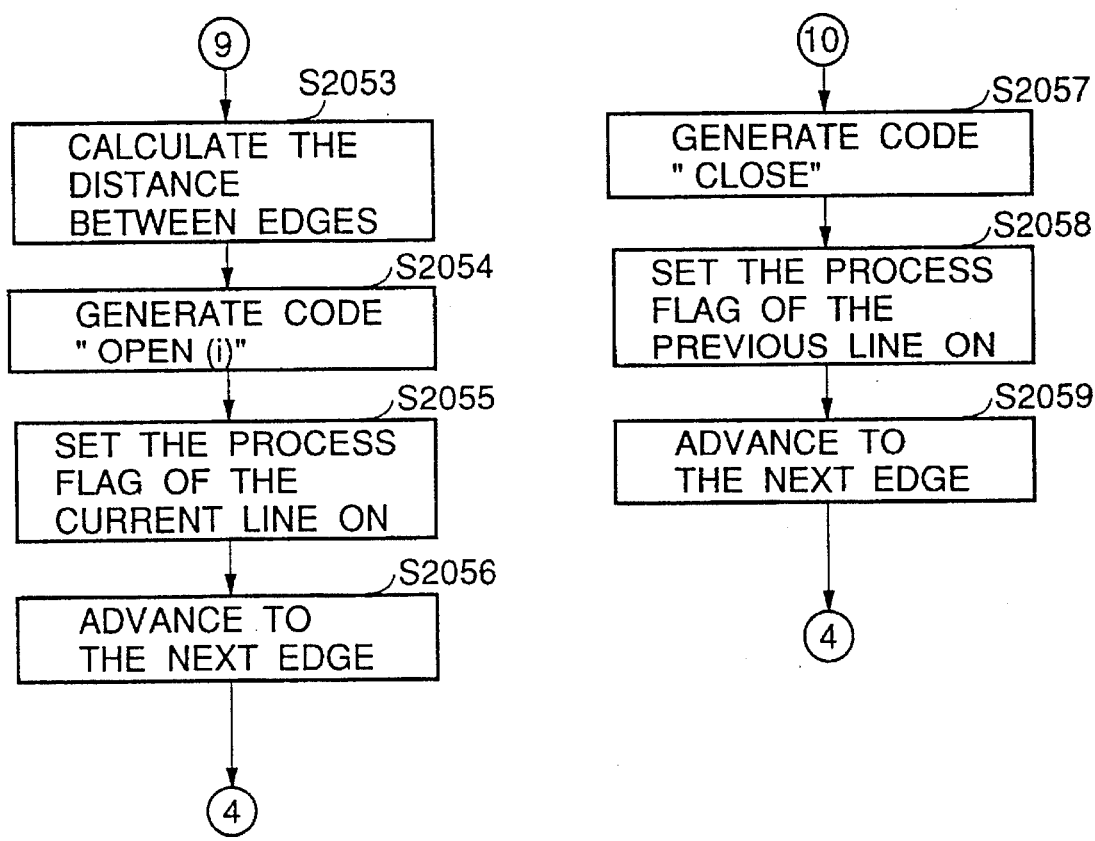
FIG. 22 is a flow chart showing the encoding process according to the first embodiment.

The unit 1 also includes a ROM 1303 for storing a control program of the CPU 1302 itself, a control program shown in the flow charts of FIGS. 15 and 16 to be executed by the CPU 1302, various data, and the like, and the RAM 1304, used as a work area of the CPU 1302, for temporarily storing various data. More specifically, the RAM 1304 is used as the input buffer 1203 for storing character codes, and the like received from the external apparatus 1201, the above-mentioned memory (not shown) on which code data are decoded by the decoder 1205, the page memory 1206 for storing decoded character pattern data for at least one page, and a table for storing the total number of lines, previous line data, current line data, the numbers of edges of the current and previous lines, the moving directions of edges, and the like. Note that this table is temporarily generated in the decoding process. The unit 1 further includes an output interface 1305 for outputting an output image as a video signal to the output mechanism 1208 for actually performing a print operation, and the above-mentioned code memory 107. The display 1204 displays an output image, messages to an operator, and the like. These components are connected to a system bus 1306.

In the first embodiment, the decoding process is executed by the control program of the CPU 1302, but may be processed in a hardware manner by a special-purpose decoding circuit.

A process for decoding code data obtained by encoding the pattern shown in FIG. 11 will be described below with reference to the flow charts shown in FIGS. 15 and 16. This process is started from a state wherein the decoder 1205 reads out all code data and the total number of lines corresponding to a pattern of a character code, read out from the input buffer 1203, from the code memory 107 to the work area on the RAM 1304.

In step S31, a previous line table of a table in the work area on the RAM 1304 is cleared. In step S32, a line code (LINEDIF<±1> or LINEEQ) as top data in line 1 is read out, and an increment/decrement of edges is stored in the table on the RAM 1304, as shown in the row of "line 1" in FIG. 12. In the case of the pattern shown in FIG. 11, the code "LINEEQ" of line 1 is read out first, and since it is determined in step S33 that all edge processes for the current line are completed, the flow advances from step S33 to step S34. Since it is determined in step S34 that all decoding processes are not completed, the flow returns from step S34 to step S32 to start the decoding process of the next line (line 2). In line 2, in step S32, a line code "LINEDIF<+2> is read out as in line 1, and data indicating that the number of edges is increased by two is stored in the table. In step S36, a frame code "OPEN<6,3>" as the next code is read out. At this time, the flow advances from step S36 to step S37 to check if the code "OPEN" is a start code of a black dot or a start code of a white dot.

In this case, since the number of edges processed so far is an even number, it is determined that the code "OPEN" is a start code of a black dot, and the flow advances to step S39 to store edge positions in the table, as shown in the row of "line 2" in FIG. 12. On the other hand, if the number of edges processed so far is an odd number, this code "OPEN" is determined as a start code of a-white dot.

In line 3, in step S32, a line code "LINEEQ" is read out, and data indicating that the number of edges is the same as that in the previous line is stored in the table. In step S36, a frame code "ADV0" as the next code is read out, and since this code indicates that the edge position is left unchanged, the content of the table updated in step S42 becomes the same as that of line 2. Similarly, since the next frame code is also "ADV0", the content of the table updated in step S42 becomes the same as that of line 2.

In line 4, in step S32, a line code "LINEEQ" is read out, and data indicating that the number of edges is the same as that in the previous line is stored in the table. A frame code "ADV0" as the next code is then read out, and the corresponding edge position is stored in the table in step S42, as shown in the row of "line 4" in FIG. 12. In step S36, the next frame code "ADV1" is read out again. Since this code indicates that the left edge position remains the same, and the right edge position is moved by one to the right, the corresponding edge position is stored in the table in step S42, as shown in the row of "line 4" in FIG. 12.

In line 5, in step S32, a line code "LINEDIF<+2>" is read out, and data indicating that the number of edges is increased by two is stored in the table. A frame code "ADV1" as the next code is then read out, and it is determined in step S42 that the left edge position is shifted by one to the left. It is also determined based on the next frame code "SW1" in step S44 that the right edge position is shifted by one to the left. As shown in the row of "line 5" in the table of FIG. 12, the second edge position as a change point is set to be (9) again. Furthermore, the next code "OPEN<2,1>" is read out, and since it is determined in step S38 that the number of edges processed so far is an even number, this code "OPEN" is determined as a start code of a black dot, and the flow advances to step S39. In step S39, since another black dot having a 1-dot width is present at a position separated by three dots from the previous black dot to the right, new edge change points (12, 13) are stored in the table, as shown in the row of "line 5" in FIG. 12.

When codes "LINEDIF<+2>, ADV2, OPEN<2,2>, ADV0, ADV0, ADV0" of line 6 are read out, the number of edges is increased by two based on the line code "LINEDIF<+2>" to become (6), and the change position of the first change becomes (3) based on the frame code "ADV2". Then, it is determined based on the frame code "OPEN<2,2>" that white dots including an edge changing from a black dot to a white dot and having a 2-dot width start from a position larger by 3 than the change position (3) of the previous edge. At this time, the flow advances from step S38 to step S40, and a start point (6) of the white dot 1002 shown in FIG. 11 and an edge position (8) changing from a white dot to a black dot are set.

It is then determined based on the subsequent codes "ADV0" that the positions of the three right edges in line 6 are not moved. The edge positions of line 6 obtained as described above are stored in the table, as shown in the row of "line 6" in FIG. 12.

When codes "LINEEQ, SW2, ADV0, ADV0, ADV0, ADV0, ADV0" in line 7 are read out, it is determined based on the line code "LINEEQ" that the number of edges is the same as that in the previous line, and the left edge change point is moved by two to the right based on the frame code "SW2". In addition, since the edge positions of the subsequent black dot are not moved including the two edges of the white dot 1002 shown in FIG. 11, the edge positions are stored in the table, as shown in the row of "line 7" in FIG. 12.

When codes "LINEEQ, SW1, ADV0, ADV0, SW1, ADV0, ADV0" in line 8 are read out, it is determined based on the line code "LINEEQ" that the number of edges is the same as that in the previous line, and the left edge change point is moved by one to the left based on the frame code "SW1" to become (4). The edge change point is changed from (9) to (10) based on the next code "SW1". Then, all the codes are stored in the table, as shown in the row of "line 8" in FIG. 12.

When codes "LINEDIF<-4>, ADV0, CLOSE, CLOSE, ADV0" in line 9 are read out, it is determined based on the line code "LINEDIF<-4>" that the number of edges is decreased by four and becomes (2), it is determined based on the frame code "ADV0" that the left edge position is left unchanged, and it is also determined based on the next frame code "CLOSE" that the white dot is ended. Upon detection of this code "CLOSE", the flow advances from step S45 to step S46, and the edge positions of the previous line corresponding to the code "CLOSE" are not moved to the row of the next line in the table. More specifically, in FIG. 12, since change points (6) and (8) in line 8 correspond to the edge positions of this white dot 1002, these points are not moved to the row of "line 9" in the table. When the next code "CLOSE" is read out, the coordinates of the edge positions corresponding to this code "CLOSE" are not stored in the row of the next line in the table. In this case, the edge positions corresponding to the second code "CLOSE" correspond to (10) and (12) in the row of "line 8" in the table of FIG. 12. Based on the last code "ADV0", the coordinate (13) of the last edge position is stored in the row of "line 9" in the table.

Finally, when codes "LINEDIF<-2>, CLOSE" in line 10 are read out, it is determined based on the line code "LINEDIF<-2>" that the number of edges is decreased by 2 and becomes (0), and based on the frame code "CLOSE", the edge positions corresponding this code "CLOSE" are not stored in the row of "line 10" in the table.

Since the number of lines in the table shown in FIG. 12 has reached 10, decoding processes of all the lines are completed, and the flow advances from step S34 to step S35. In step S35, a dot pattern is formed on the work area on the RAM 1304 according to the information stored in the table shown in FIG. 12. For example, as shown in FIG. 11, pattern development is performed in such a manner that white dots are formed at all dot positions in line 1; black dots are formed at the sixth to eighth dot positions in each of lines 2 and 3; black dots are formed at the sixth to ninth dot positions in line 4; and black dots are formed at the fifth to eighth dot positions, white dots are formed at the ninth to 11th dot positions, a black dot is formed at the 12th dot position, and a white dot is formed at the 13th dot position in line 5. In line 6, black dots are formed at the third to fifth dot positions, white dots are formed at the sixth and seventh dot positions, a black dot is formed at the eighth dot position, white dots are formed at the ninth to 11th dot positions, a black dot is formed at the 12th dot position, and white dots are formed at the 13th and subsequent dot positions. The following lines are also pattern-developed, as shown in FIG. 11, although not described in detail.

In this manner, the pattern data developed on the work area of the RAM 1304 is sequentially stored in the page memory 1206 for storing pattern data for at least one page on the basis of its position information when a page end command is input or when the work area of the RAM 1304 is full of data. Every time pattern data for one page are stored in the page memory 1206, they are output as a video signal to the output mechanism 1208 via the output unit 1207, and are printed on the recording material 1209 or are displayed on the display 1204.

In the first embodiment, the encoding process of the present invention has been described with reference to the flow charts of FIGS. 7, 8A and 8B. The encoding process of the present invention will be described in more detail below with reference to the flow charts shown in FIGS. 17A and 17B to 22.

The encoding process to be executed by the CPU 502 in the encoder 106 of the first embodiment will be described in detail below with reference to the flow charts shown in FIGS. 17A and 17B to 22. This process is started from a state wherein the reading unit 104 reads out a character pattern and its total number of lines corresponding to a required character code from the character pattern generator 103 on the basis of an instruction from the keyboard 101, and develops and stores the character pattern in the memory 105.

In step S2001, a region to be compressed of pattern data (e.g., the character pattern 201 in FIG. 2) is read out. The flow advances to step S2002, and the table on the RAM 504 for storing previous line data is cleared to "0". In step S2003, the number of processed lines is checked. If processes for all lines are completed, the processes are ended.

On the other hand, if processes for all lines are not completed, the flow advances to step S2004, and 1-line data to be encoded (dot data in the first line) is read out from the memory 105, and is stored in the work area of the RAM 504. The flow then advances to step S2005, and the change positions of dots in this dot pattern, i.e., the edge positions and the number of edges are stored in the table of the RAM 504. The flow advances to step S2006, and a process flag of the previous line is set to be ON. When this flag is ON, this means that the process of edges in the previous line of a point of interest, i.e., code generation is not completed yet. The flow advances to step S2007, and a process flag of the current line is similarly set to be ON. When this flag is ON, this means that the process of edges in the current line of the point of interest, i.e., code generation is not completed yet. In step S2008, the number of edges in the previous line is compared with the number of edges in the current line. If these numbers of edges are equal to each other, the flow advances to step S2009, and a code "LINEEQ" is generated. If these numbers of edges are not equal to each other, the flow advances to step S2010, and the number of increased or decreased edges is calculated to generate a code "LINEDIF<i>". In step S2011, the number of processed edges is checked. If it is determined that processes of all edges are completed, the flow advances to step S2012 to set the current line as the previous line and to set the next line as the current line. Thereafter, the flow returns to step S2003.

On the other hand, if it is determined in step S2011 that edge processes for one line are not completed, the flow advances to step S2013, and the colors of dots in the previous and current lines at the left side of a current edge position of interest, and the colors of dots in the previous and current lines at the right side of the current edge position of interest are checked. Note that the content in step S2013 means that the color of a dot in the previous line corresponding to a current portion of interest is white (upper left), and the color of a dot in the current line is also white. The content in step S2013 also means that when dots at the right side of the portion of interest are checked, the next edge is found in the previous line first, the color of a dot in the previous line corresponding to that portion is black (upper right), and the color of a dot in the current line is still white (lower right). The same applies to steps S2014 to S2024. If it is determined in step S2013 that the colors of the dots in both the lines at the left side of the edge position of interest are white, and the color of the dot in only the previous line at the right side of the edge position of interest is white, the flow advances to step S2025; otherwise, the flow advances to step S2014. In step S2025, dots in the current and previous lines at the right side of the edge position of interest are checked to advance the point of interest to the next edge position in either the current or previous line. The flow advances to step S2026 to set the process flag of the previous line to be OFF, and the flow returns to step S2011.

If it is determined in step S2014 that the colors of the dots in both the lines at the left side of the edge position of interest are white, and the colors of the dots in both the lines at the right side of the edge position of interest are black, the flow advances to step S2037; otherwise, the flow advances to step S2015.

If it is determined in step S2015 that the colors of the dots in both the lines at the left side of the edge position of interest are white, and the color of the dot in only the previous line at the right side of the edge position of interest is white, the flow advances to step S2027; otherwise, the flow advances to step S2016. In step S2027, dots in the current and previous lines at the right side of the edge position of interest are checked to advance the point of interest to the next edge position in either the current or previous line. The flow then advances to step S2028 to set the process flag of the current line to be OFF, and the flow returns to step S2011.

If it is determined in step S2016 that the color of the dot in only the current line at the left side of the edge position of interest is white, and the colors of the dots in both the lines at the right side of the edge position of interest are white, the flow advances to step S2029; otherwise, the flow advances to step S2017. In step S2029, the process flag of the current line is checked. If it is determined in step S2029 that the process flag of the current line is OFF, the flow advances to step S2056; otherwise, the flow advances to step S2037.

If it is determined in step S2017 that the colors of the dots in the previous and current lines at the left side of the edge position of interest are respectively black and white, and the colors of the dots in the previous and current lines at the right side of the edge position of interest are respectively white and black, the flow advances to step S2040; otherwise, the flow advances to step S2018.

If it is determined in step S2018 that the color of the dot in only the previous line at the left side of the edge position of interest is black, and the colors of dots in both the lines at the right side of the edge position of interest are black, the flow advances to step S2030; otherwise, the flow advances to step S2019. In step S2030, the process flag of the previous line is checked. If it is determined in step S2030 that the process flag of the previous line is OFF, the flow advances to step S2052; otherwise, the flow advances to step S2037.

If it is determined in step S2019 that the color of the dot in only the previous line at the left side of the edge position of interest is white, and the colors of dots in both the lines at the right side of the edge position of interest are black, the flow advances to step S2031; otherwise, the flow advances to step S2020. In step S2031, the process flag of the current line is checked. If it is determined in step S2031 that the process flag of the current line is OFF, the flow advances to step S2056; otherwise, the flow advances to step S2037.

If it is determined in step S2020 that the colors of the dots in the previous and current lines at the left side of the edge position of interest are respectively white and black, and the colors of the dots in the previous and current lines at the right side of the edge position of interest are respectively black and white, the flow advances to step S2040; otherwise, the flow advances to step S2021.

If it is determined in step S2021 that the color of the dot in only the previous line at the left side of the edge position of interest is white, and the colors of the dots in both the lines at the right side of the edge position of interest are white, the flow advances to step S2032; otherwise, the flow advances to step S2022. In step S2032, the process flag of the previous line is checked. If it is determined in step S2032 that the process flag of the previous line is OFF, the flow advances to step S2052; otherwise, the flow advances to step S2037.

If it is determined in step S2022 that the colors of dots in both the lines at the left side of the edge position of interest are black, and the color of the dot in only the previous line at the right side of the edge position of interest is white, the flow advances to step S2033; otherwise, the flow advances to step S2023. In step S2033, dots in the current and previous lines at the right side of the edge position of interest are checked to advance the point of interest to the next edge position in either the current or previous line. The flow advances to step S2034 to set the process flag of the previous line to be OFF, and the flow returns to step S2011.

If it is determined in step S2023 that the colors of the dots in both the lines at the left side of the edge position of interest are black, and the colors of the dots in both the lines at the right side of the edge position of interest are white, the flow advances to step S2037; otherwise, the flow advances to step S2024.

If it is determined in step S2024 that the colors of the dots in both the lines at the left side of the edge position of interest are black, and the color of the dot in only the current line at the right side of the edge position of interest is white, the flow advances to step S2035; otherwise, the flow returns to step S2011. In step S2035, dots in the current and previous lines at the right side of the edge position of interest are checked to advance the point of interest to the next edge position in either the current or previous line. The flow advances to step S2036 to set the process flag of the current line to be OFF, and the flow returns to step S2011.

In step S2037, dots in the current and previous lines at the right side of the edge position of interest are checked to advance the point of interest to the next edge position in either the current or previous line. The flow advances to step S2038 to set the process flag of the previous line to be ON. The flow then advances to step S2039 to set the process flag of the current line to be ON, and the flow advances to step S2043.

In step S2040, the process flag of the previous line is checked. If it is determined in step S2040 that the process flag of the previous line is ON, the flow advances to step S2041; otherwise, the flow advances to step S2042. In step S2041, it is determined that the color of the dot at the left side of the point of interest is the same as that at the right side of the point of interest in the previous line, and the process is continued. For example, if the colors of the dots in the previous and current lines at the left side of the point of interest are respectively white and black, and the colors of the dots in the previous and current lines at the right side of the point of interest are respectively black and white, it is also determined in a process of the next edge that the color of the dot in the previous line at the left side of the point of interest is black. The flow then advances to step S2045.

In step S2042, the process flag of the current line is checked. If it is determined in step S2042 that the process flag of the current line is ON, the flow advances to step S2043; otherwise, the flow returns to step S2011. In this case, if processes are normally performed, the flag of the current line is never set to be OFF. In step S2043, it is determined that the color of the dot at the left side of the point of interest is the same as that at the right side of the point of interest in the current line, and the process is continued. For example, if the colors of the dots in the previous and current lines at the left side of the point of interest are respectively black and white, and the colors of the dots in the previous and current lines at the right side of the point of interest are respectively white and black, it is also determined in a process of the next edge that the color of the dot in the previous line at the left side of the point of interest is white. The flow then advances to step S2045.

In step S2044, the states of the previous and current lines at the previous edge position before the point of interest was advanced to the right are checked again, and if it is determined that edges in the previous and current lines are present at the same position, the flow advances to step S2045. In step S2045, a code "ADV0" is generated, and the flow returns to step S2011. On the other hand, if edges in the previous and current lines are not present at the same position, the flow advances to step S2046.

In step S2046, the states of the previous and current lines at the previous edge position before the point of interest was advanced to the right are checked again, and if it is determined that the edge position in the current line is present at the left side of the edge position in the previous line, the flow advances to step S2047. The direction of movement of the edge is checked, and if it is determined that the edge moves leftward, a difference between the edge positions is calculated to generate a code "ADV(i)" in step S2048. Thereafter, the flow advances to step S2011. On the other hand, if it is determined in step S2047 that the edge moves rightward, a difference between the edge positions is calculated to generate a code "SW(i)" in step S2049. Thereafter, the flow advances to step S2011.

If it is determined in step S2046 described above that the edge position in the current line is present at the right side of the edge position of the previous line, the flow advances to step S2050. The direction of movement of the edge is checked. If it is determined that the edge moves rightward, a difference between the edge positions is calculated to generate a code "ADV(i)" in step S2051. Thereafter, the flow advances to step S2011. On the other hand, if it is determined in step S2050 that the edge moves leftward, a difference between the edge positions is calculated to generate a code "SW(i)" in step S2052. Thereafter, the flow advances to step S2011.

In step S2053, the distance between the immediately preceding edge position in the current line and the current edge position of interest is calculated, and the flow advances to step S2054 to generate a code "OPEN(i)" according to the calculated distance. In step S2055, the process flag of the current line is set to be ON. In step S2056, dots in the current and previous lines at the right side of the edge position of interest are checked to advance the point of interest to the next edge position in either the current or previous line, and the flow returns to step S2011.

In step S2057, a code "CLOSE" is generated. In step S2058, the process flag of the previous line is set to be ON. In step S2059, dots in the current and previous lines at the right side of the edge position of interest are checked to advance the point of interest to the next edge position in either the current or previous line, and the flow returns to step S2011.

Conditions for judging whether or not a dot in the current line is continuous with a dot in the previous line will be described below with reference to the flow charts shown in FIGS. 17A and 17B to 22 and dot patterns shown in FIGS. 9 and 10.

In FIG. 9, if the size of each black dot is defined as one dot, the black dots 802a to 802c are processed as continuous dots, and the black dot 803 is processed as an independent dot. More specifically, it is checked in step S2015 or S2017 if the previous line includes a black dot continuous with a black dot in the current line. If such a black dot is not included in the immediately preceding line, the flow advances from step S2032 to step S2059 in the next edge process, and the uppermost portion of the black dot 802a is encoded as a code "OPEN". Therefore, the first line is encoded as "LINEDIF<+2>, OPEN<2,1>". A black dot 802b portion in the second line is determined as a black dot continuous with the black dot 802a in the previous line. Thus, a code "ADV1" is generated in step S2048, and a code "SW1" is generated in step S2049. In step S2059, the black dot 803 is encoded as a code "OPEN<0,1>". Therefore, the second line is encoded as "LINEDIF<+2>, ADV1, SW1, OPEN<0,1>". Similarly, the black dot 802c is determined as a black dot continuous with the black dot 802b. Thus, a code "SW1" is generated in step S2052, and another code "SW1" is generated in step S2052. In step S2057, the black dot 803 in the second line is encoded as a code "CLOSE". In this manner, the third line of the pattern 801 shown in FIG. 9 is encoded as "LINEDIF<-2>, SW1, SW1, CLOSE". In step S2057, a code "CLOSE" is generated according to the black dot 802c in the third line, and the fourth line is encoded as "LINEDIF<-2>, CLOSE".

In this manner, the encoded result is as follows.

Line 1: LINEDIF<+2>, OPEN<2,1>

Line 2: LINEDIF<+2>, ADV1, SW1, OPEN<0,1>

Line 3: LINEDIF<-2>, SW1, SW1, CLOSE

Line 4: LINEDIF<-2>, CLOSE

The above-mentioned encoded codes are expressed by code data shown in FIGS. 4 and 5 as follows in practice, and are stored in the code memory 107 together with the total number of lines (=4) in correspondence with identification information (e.g., a character code) for identifying a required pattern:

Line 1: 1001011111000100001

Line 2: 100101011101111000000001

Line 3: 1001111101110111111

Line 4: 10011111111

Similarly, in the case of the dot pattern shown in FIG. 10 as well, the black dots 902a and 902b are processed as continuous ones. More specifically, it is checked in step S2017 if the previous line includes a black dot continuous with a black dot in the current line. If the immediately preceding line does not include such a black dot, the flow advances from step S2032 to step S2059 in the next edge processing, and the uppermost portion of the black dot 902a is encoded as a code "OPEN". Therefore, the first line is encoded as "LINEDIF<+2>, OPEN<1,2>". A black dot 902a portion in the second line is determined as a black dot continuous with the black dot 902a in the previous line. Thus, a code "ADV0" is generated in step S2045, and a code "SW1" is generated in step S2049. A black dot 902b portion is encoded as a code "OPEN<0,1>" in step S2054. Therefore, the second line is encoded as "LINEDIF<+2>, ADV0, SW1, OPEN<0,1>". In the next line, the black dot 902b is determined as a black dot continuous with the black dot 902a, and is encoded as a code "SW1" in step S2052. In step S2057, the white dot 903 in the second line is encoded as a code "CLOSE".

Finally, a code "ADV0" is generated in step S2045. Thus, the third line of the pattern shown in FIG. 10 is encoded as "LINEDIF<-2>, SW1, CLOSE, ADV0". In step S2057, a code "CLOSE" is generated according to the black dot 902b in the third line, and the fourth line is encoded as "LINEDIF<-2>, CLOSE".

The above-mentioned encoded codes are expressed by code data shown in FIGS. 4 and 5 in practice, and are stored in the code memory 107 together with the total number of lines in correspondence with identification information (e.g., a character code) for identifying a required pattern.

A process for encoding the dot pattern shown in FIG. 11 will be described below with reference to the process sequence shown in the above-mentioned flow charts of FIGS. 17A and 17B to 22.

In FIG. 11, since line 1 does not include any black dot, the flow advances from step S2004 to step S2009, and a code "LINEEQ" (code data "0") alone is generated in line 1. Since line 2 includes black dots, the flow advances from step S2004 to step S2005, and edge positions (6) and (9) as dot change positions and the number "2" of edges are stored in the table (FIG. 12) in the RAM 504. Since the number of edges is increased by two as compared to the number (0) of edges in the previous line, a code "LINEDIF<+2> (code data "10010") is generated in step S2010. Furthermore, since it is determined in step S2015 that dots in both the previous and current lines at the left side of the edge are white dots, and dots in the previous and current lines at the right side of the edge are respectively a white dot and a black dot, the flow advances from step S2021 to steps S2032 and S2053 in the next edge process, and a code "OPEN<6,3 (=9−6)>" (code data "11111001100011") is generated in step S2054.

Since line 3 has the same number of edges as that of the previous line, a code "LINEEQ" is generated in step S2009. Since it is determined in step S2014 that the black dot in the current line is continuous with a black dot in the previous line, the edge positions are checked in step S2044. Since the edge positions coincide with those in line 2, a code "ADV0" (code data "0") is generated for the left edge, and a code "ADV0" is generated for the right edge in step S2045.

Since line 4 has the same number of edges as that in the previous line, a code "LINEEQ" is generated in step S2009, and a code "ADV0" is generated for the left edge in step S2045. Since the right edge position is shifted by one to the right, a code "ADV1" is generated for the right edge in step S2051.

In line 5, since the number of edges is increased by two, a code "LINEDIF<+2>" is generated in step S2010, a code "ADV1" (code data "10") is generated for the left edge of continuous dots in step S2048, and a code "SW1" (code data "1110") is generated for the right edge in step S2049.

Thereafter, since the black dot 1001 in FIG. 11 is located at the edge position (12), the flow advances to step S2054, and a code "OPEN<2 (=12–9–1), 1>" (code data "11111000100001") is generated for this black dot.

In line 6, since the number of edges is increased by two as compared to that in line 5, a code "LINEDIF<+2>" is generated in step S2010. Since the left edge of left continuous black dots is moved by two dots in the forward direction, it is encoded as a code "ADV2" in step S2048. Since it is determined in step S2020 that the previous line (line 5) does not include a white dot continuous with a white dot of interest on the current line (line 6), the flow advances to step S2054, and a code "OPEN<2,2>" is generated for this white dot.

In step S2045, a code "ADV0" is generated. Finally, a code "ADV0" is generated for the left edge of a right noncontinuous black dot in step S2045, and a code "ADV0" is generated for the right edge thereof in step S2045.

Similarly, in line 7, a code "LINEEQ" is generated in step S2009; "SW2" in step S2052; "ADV0" in step S2045; "ADV0" in step S2045; "ADV0" in step S2045; "ADV0" in step S2045; and "ADV0" in step S2045.

Similarly, in line 8, a code "LINEEQ" is generated in step S2009; "SW1" in step S2049; "ADV0" in step S2045; "ADV0" in step S2045; "SW1" in step S2045; "ADV0" in step S2045; and "ADV0" in step S2045.

In line 9, since the number of edges is decreased by four as compared to that in line 8, a code "LINEDIF<–4>" is generated in step S2010, and in continuous black dots, a code "ADV0" is generated for a left edge in step S2045. Since the previous line (line 8) includes a white dot (white dot 1002 in FIG. 11) noncontinuous with the current line (line 9), a code "CLOSE" (code data "111111") is generated in step S2057. Furthermore, since the previous line includes another white dot (white dot 1003 in FIG. 11) noncontinuous with the current line, a code "CLOSE" (code data "111111") for this portion is generated in step S2057. Finally, in step S2045, a code "ADV0" is generated.

In line 10, a code "LINEDIF<–2>" is generated in step S2010, and a code "CLOSE" is generated in step S2057, thus ending the process.

The above-mentioned encoding result is as follows:

Line 1: LINEEQ

Line 2: LINEDIF<+2>, OPEN<6,3>

Line 3: LINEEQ, ADV0, ADV0

Line 4: LINEEQ, ADV0, ADV1

Line 5: LINEDIF<+2>, ADV1, SW1, OPEN<2,1>

Line 6: LINEDIF<+2>, ADV2, OPEN<2,2>, ADV0, ADV0, ADV0

Line 7: LINEEQ, SW2, ADV0, ADV0, ADV0, ADV0, ADV0

Line 8: LINEEQ, SW1, ADV0, ADV0, SW1, ADV0, ADV0

Line 9: LINEDIF<–4>, ADV0, CLOSE, CLOSE, ADV0

Line 10: LINEDIF<–2>, CLOSE

These encoded codes are actually expressed by code data shown in FIGS. 4 and 5, and are stored in the code memory 107 as codes compressed in the scanning order (from the left to the right of the scanning line) of pattern data together with the total number of lines in correspondence with identification information (e.g., a character code) for identifying the required pattern. More specifically, the code memory 107 stores code data so that a pattern expressed by the stored code data can be identified. For example, the code data are stored in correspondence with a character code.

An image forming apparatus of the second embodiment, which executes the above-mentioned encoding and decoding processes, will be described hereinafter.

Image Forming Apparatus

In the second embodiment, a laser beam printer will be exemplified as an image forming apparatus for executing the encoding and decoding processes.

Figure 23:
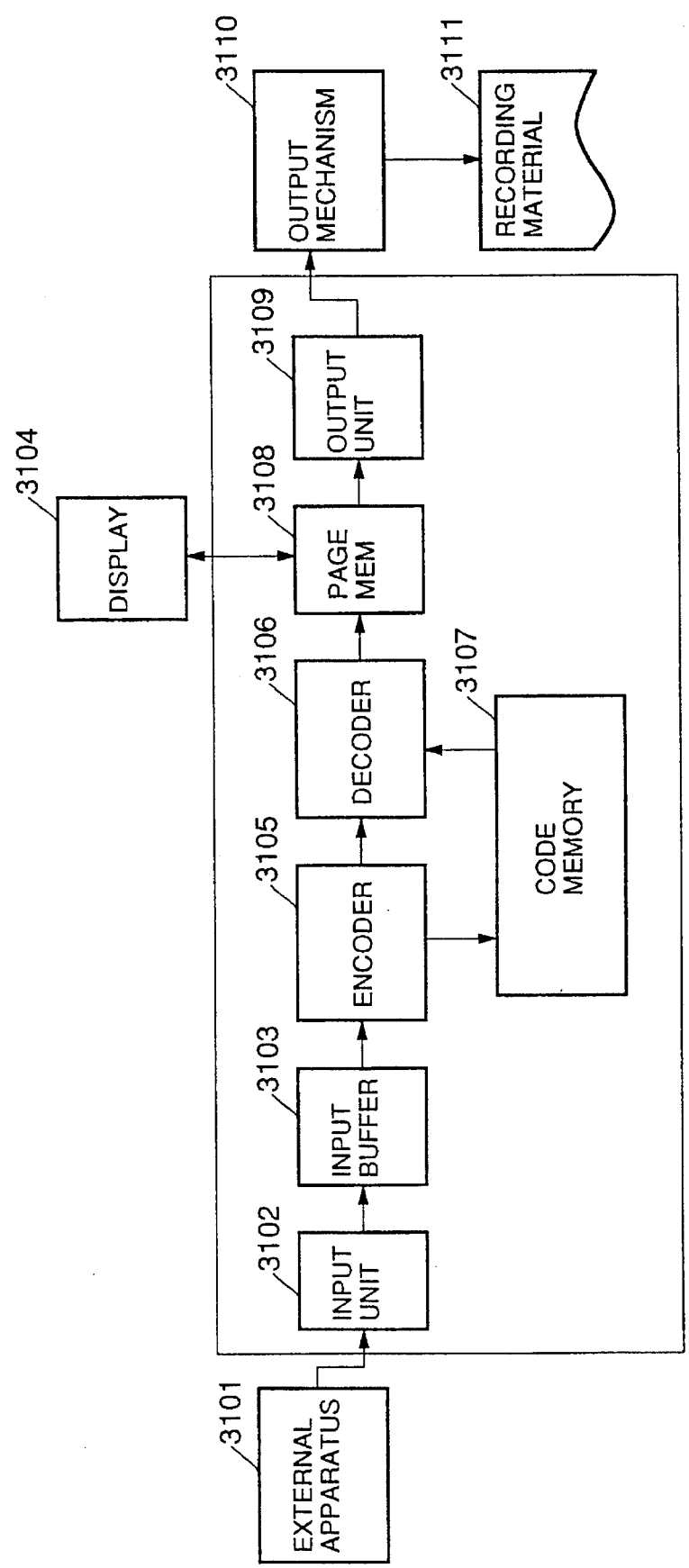
FIG. 23 is a block diagram showing a schematic arrangement of an image forming apparatus for performing the encoding and decoding processes according to the second embodiment of the present invention.

FIG. 23 is a block diagram showing a schematic arrangement of a laser beam printer for executing encoding and decoding processes according to the second embodiment so as to explain the flow of processes of a printer control unit 3001.

In FIG. 23, an external apparatus 3101 such as a host computer serving as a print data generation source outputs, e.g., character information consisting of character pattern data, a character code, position information, and the like using a keyboard (not shown) or the like. An input unit 3102 performs communication control with the external apparatus 3101, and stores input character information, and the like in an input buffer 3103. The input buffer 3103 has a capacity capable of storing character information for at least one page. A display 3104 displays a pattern-developed image, messages to an operator, and the like. An encoder 3105 reads out character pattern data from the input buffer 3103, and performs encoding processes. The encoder 3105 stores encoded character pattern data and the total number of lines of a character pattern in a code memory 3107. The code memory 3107 stores encoded code data and a total number of lines of a required character pattern. The code memory 3107 is not limited to one incorporated in the image forming apparatus such as a laser beam printer 1500, but may be an external storage medium detachable from the image forming apparatus, a hard disk, or the like. A decoder 3106 receives a character code for one character and its position information from the input buffer 3103, reads out code data and the total number of lines corresponding to the received character code, and executes decoding processes. The decoder 3106 stores decoded character pattern data in a page memory 3108 (to be described below) on the basis of its position information. The page memory 3108 stores pattern data for at least one page. An output unit 3109 performs ON/OFF control of a laser beam to cause an output mechanism 3110 to record a print result on a recording material 3111 such as a paper sheet.

Figure 24:
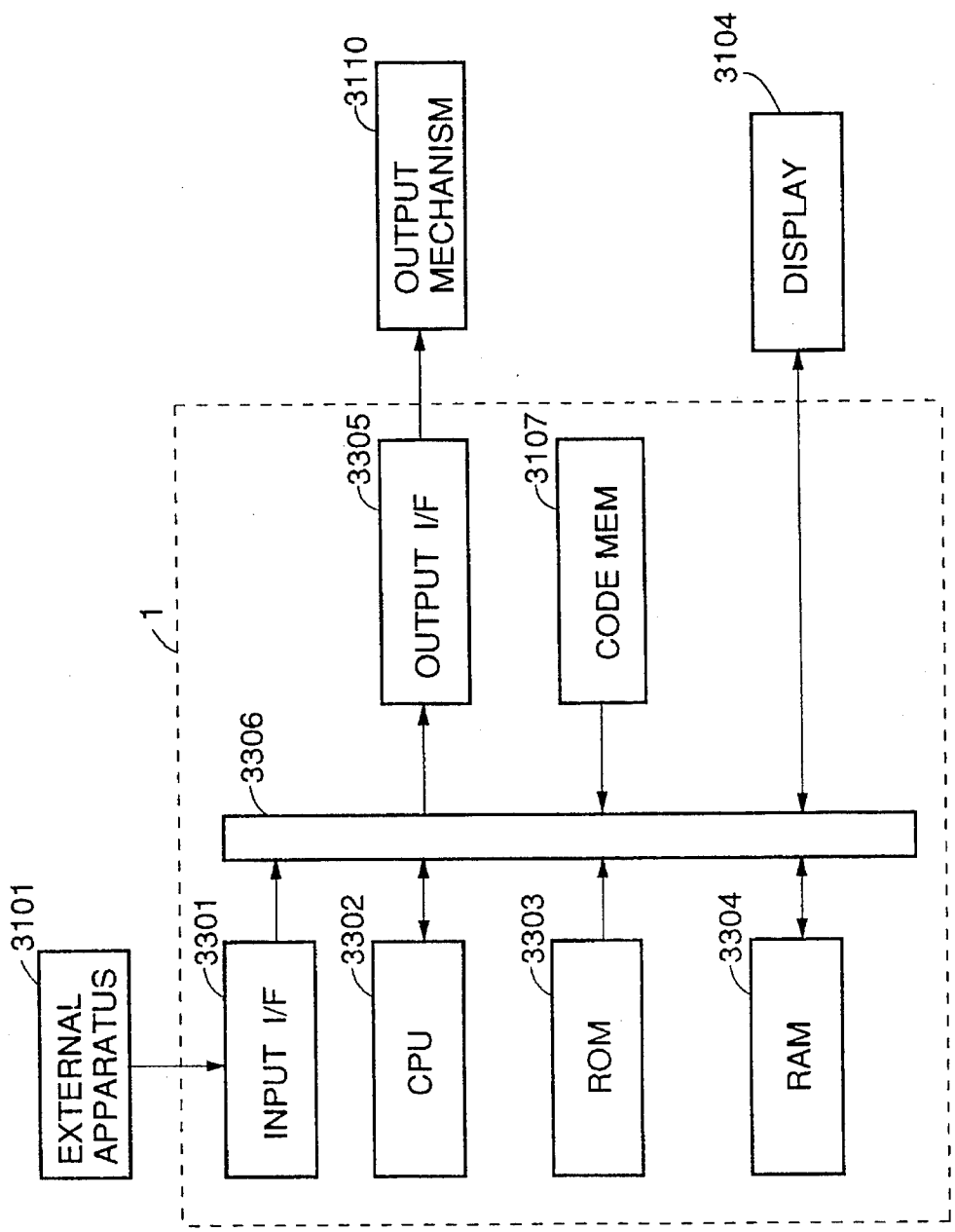
FIG. 24 is a block diagram showing a detailed arrangement of the image forming apparatus for performing the encoding and decoding processes according to the second embodiment.

FIG. 24 shows the detailed arrangement of the printer control unit 3001 in the second embodiment. In FIG. 24, the printer control unit 3001 is connected to the external apparatus 3101 for outputting character pattern data, a character code, position information, and the like. An input interface 3301 receives character pattern data, a character code, position information, and the like from the external apparatus 3101. A CPU 3302 controls the entire printer control unit including the encoding and decoding processes. More specifically, the CPU 3302 controls a display on the display 3104. Also, the CPU 3302 controls a read access of a character pattern and the total number of lines from the encoder 3105 and a write access of code data and the total number of lines in the code memory 3107 in accordance with the above-mentioned encoding control program (shown in the flow charts of FIGS. 7, 8A and 8B or FIGS. 17A and 17B to 22) and various data stored in a ROM 3303. Furthermore, the CPU 3302 controls a read access of code data and the total number of lines from the above-mentioned code memory 3107, a read access from the decoder 3106, and the like in accordance with the above-mentioned decoding control program (shown in the flow charts of FIGS. 15 and 16) and various data stored in the ROM 3303. The ROM 3303 stores the control programs, various data, and the like for the CPU 3302. A RAM 3304 is used as a work area of the CPU 3302, and temporarily stores various data. More specifically, the RAM 3304 is used as an input buffer for storing a character code received from the external apparatus 3101, and is also used as the page memory 3108 for storing at least one page of character pattern data decoded by the decoder 3106. Furthermore, the RAM 3304 is used as a table for storing the total number of lines, previous line data, current line data, the numbers of edges of the current and previous lines, the moving directions of edges, and the like, as will be described later. Note that this table is temporarily formed in encoding and decoding processes. An output interface 3305 outputs an output image as a video signal to the output mechanism 3110 for performing an actual print operation. The printer control unit 3001 includes the above-mentioned code memory 3107. The display 3104 displays an output image, messages to an operator, and the like. These components are connected to a system bus 3306.

In the second embodiment, the encoding process is executed by the control program of the CPU 3302, but may be executed in a hardware manner using a special-purpose encoding circuit.

In the second embodiment, the decoding process is executed by the control program of the CPU 3302, but may be executed in a hardware manner using a special-purpose decoding circuit. The operation of the CPU 3302 will be described below.

When the CPU 3302 receives character information consisting of character pattern data, a character code, position information, and the like output from the external apparatus 3101, it stores the received information in the work area in the RAM 3304. For example, when a predetermined amount of character pattern data are stored in the work area, or when the CPU 3302 receives an encoding command instructed by, e.g., a keyboard (not shown) of the external apparatus 3101, the CPU 3302 executes the above-mentioned encoding control program stored in the ROM 3303 to encode the character pattern data stored in the work area in the RAM 3304. Then, the CPU 3302 stores encoded code data of character pattern data, the total number of lines of a character pattern, and the like in the code memory 3107 in correspondence with identification information (e.g., a character code) for identifying the character pattern.

When the CPU 3302 receives character information consisting of a character code, position information, and the like, it stores the received information in the work area in the above-mentioned RAM 3304. For example, when a predetermined amount of character codes are stored in the work area, the CPU 3302 executes the above-mentioned decoding control program stored in the ROM 3303 to read out code data, the total number of lines, and the like corresponding to a character code for one character from the code memory 3107 to the work area and to execute the decoding process in the work area.

Furthermore, when a page end command is input from the external apparatus 3101 or when the work area is full of data, the CPU 3302 stores decoded character pattern data for at least one page present in the work area in the page memory 3108 in the RAM 3304 on the basis of the position information, and the like, and ON/OFF-controls a laser beam in accordance with the stored data so as to cause the output mechanism 3110 to output an image onto a recording material such as a paper sheet.

As described above, according to this embodiment, an encoding method which can compress a character pattern and the like with a high compression ratio can be provided.

This compression method is particularly effective for a large character or high-fine dot data since it is not easily influenced by the size of a bit map.

Even when a dot pattern is enlarged in a ×2 scale in the vertical and horizontal directions (×4 in a bit map), since the data amount of a compressed pattern is as small as about ×2, a large amount of pattern data can be stored in a limited memory capacity.

Since codes encoded by this encoding method require a short expansion time, a time required for pattern development can be shortened.

The present invention can be applied to either a system constituted by a plurality of devices or an apparatus consisting of a single device. Also, the present invention can be applied to a case wherein the present invention is achieved by supplying a program for practicing the present invention to a system or an apparatus, as a matter of course.

In this embodiment, a case has been exemplified wherein a dot pattern is a character pattern. However, the present invention is not limited to this, but may be applied to, e.g., an image pattern, a graphic pattern, and the like. Furthermore, the present invention may be applied to an image pattern, and the like read by an image reader.

As an image forming apparatus for practicing this embodiment, the laser beam printer has been exemplified. However, as will be apparent from the following description, the present invention can be applied to other printer systems, such as an ink-jet system, a thermal transfer system, a wire dot impact system, and the like. Therefore, the present invention is not restricted to such printer systems.

Apparatus Main Body

FIG. 26 is a schematic view showing an ink-jet recording apparatus to which the present invention can be applied.

In FIG. 26, a carriage HC is engaged with a spiral groove 5004 of a lead screw 5005, which is rotated via driving force transmission gears 5011 and 5009 in cooperation with forward/reverse rotation of a driving motor 5013. The carriage HC has a pin (not shown), and is reciprocally moved in directions of arrows a and b. The carriage HC carries an ink-jet cartridge IJC. A paper pressing plate 5002 presses a paper sheet against a platen 5000 across the moving direction of the carriage. Photocouplers 5007 and 5008 serve as home position detection means for confirming the presence of a lever 5006 of the carriage in a corresponding region, and switching the rotational direction of the motor 5013. A member 5016 supports a cap member 5022 for capping the front surface of a recording head. A suction means 5015 draws the interior of the cap member 5022 by suction, and executes suction recovery of the recording head via an intra-cap opening 5023. A cleaning blade 5017, and a member 5019 for allowing the blade to be movable in the back-and-forth direction are supported on a main body support plate 5018. The blade is not limited to this shape. Alternatively, a known cleaning blade can be adopted in this embodiment, as a matter of course. A lever 5021 is used for starting a suction operation in a suction recovery process, and is moved upon movement of a cam 5020 engaged with the carriage. The movement control of the lever is performed by the driving force from the driving motor via a known transmission means (e.g., by switching a clutch).

These capping, cleaning, and suction recovery processes are executed at their corresponding positions upon operation of the lead screw 5005 when the carriage reaches a region at the home position side. However, the present invention is not limited to this as long as required operations are performed at known timings.

Control Arrangement

A control arrangement for executing recording control of the above-mentioned apparatus arrangement will be described below with reference to the block diagram shown in FIG. 27. A control circuit shown in FIG. 27 includes an interface for receiving a recording signal, an MPU 1701, a program ROM 1702 for storing a control program executed by the MPU 1701, and a dynamic RAM 1703 for storing various data (e.g., the recording signal, recording data to be supplied to the head, and the like). The control circuit also includes a gate array 1704 for performing supply control of recording data to a recording head 1708, and also performing data transfer control among the interface 1700, the MPU 1701, and the RAM 1703. The control circuit further includes a carriage motor 1710 for conveying the recording head 1708, a paper feed motor 1709 for feeding a recording sheet, a head driver 1705 for driving the head, and motor drivers 1706 and 1707 for respectively driving the paper feed motor 1709 and the carriage motor 1710.

The operation of the control arrangement will be described below. When a recording signal is input to the interface 1700, the recording signal is converted into print recording data between the gate array 1704 and the MPU 1701. The motor drivers 1706 and 1707 are driven, and the recording head is driven according to the recording data supplied to the head driver 1705, thus executing a print operation.

As described above, the present invention can be practiced by adding the control programs (programs for executing the above-mentioned encoding and decoding processes) for practicing the present invention at least to the ROM 1702 in the control arrangement of the ink-jet printer. Therefore, as can be apparent from the above description, an image forming apparatus for practicing the present invention is not limited to the laser beam printer, but may be applied to, e.g., the above-mentioned ink-jet printer.

As described above, according to the present invention, an encoding process suitable for a dot pattern such as a character, a symbol, or the like, can be performed to obtain a high compression ratio.

Also, an encoding process which can shorten a time required for expansion can be realized.

Furthermore, encoded data can be decoded at high speed.

What is claimed is:

1. An information processing apparatus comprising:
   change point detection means for obtaining dot change point positions and the number of change points in units of scanning lines by scanning a dot pattern on a scanning line in a predetermined direction;
   discrimination means for discriminating start and end positions of a dot set by scanning the dot pattern in the predetermined direction so as to detect appearance of a noncontinuous dot pattern in a direction substantially perpendicular to a direction of the scanning line; and
   generation means for generating information for each scanning line based on the number of change points and based on the positions of the dot change point in each said scanning line, the information representing, as relative values with respect to an immediately preceding scanning line, the change point positions and the number of change points detected by said change point detection means, and representing the start and end positions of the dot set discriminated by said discrimination means.

2. An apparatus according to claim 1, wherein the dot pattern is stored in said information processing apparatus.

3. An apparatus according to claim 1, wherein the dot pattern is stored in an external storage device detachable from said information processing apparatus.

4. An apparatus according to claim 1, wherein each of the dot change points represents a boundary of the dot set in units of scanning lines.

5. An apparatus according to claim 4, wherein the dot set is a set of continuous dots in an identical color.

6. An apparatus according to claim 1, wherein the information generated by said generation means is encoded code data.

7. An information processing apparatus comprising:
   change point detection means for obtaining dot change point positions and the number of change points in units of scanning lines by scanning a dot pattern in a predetermined direction;
   discrimination means for discriminating start and end positions of a dot set by scanning the dot pattern in the predetermined direction so as to detect appearance of a noncontinuous dot pattern in a direction substantially perpendicular to a direction of the scanning line; and
   generation means for generating information representing, as a relative value with respect to an immediately preceding scanning line, the change point positions and the number of change points detected by said change point detection means and the start and end positions of the dot set discriminated by said discrimination means
   wherein said generating means generates, as first information, a different between the number of dot change points of each scanning line and the number of change points on an immediately preceding scanning line detected by said change point detection means.

8. An information processing apparatus comprising:
   change point detection means for obtaining dot change point positions and the number of change points in units of scanning lines by scanning a dot pattern in a predetermined direction;
   discrimination means for discriminating start and end positions of a dot set by scanning the dot pattern in the predetermined direction so as to detect appearance of a noncontinuous dot pattern in a direction substantially perpendicular to a direction of the scanning line; and
   generation means for generating information representing, as a relative value with respect to an immediately preceding scanning line, the change point positions and the number of change points detected by said change point detection means and the start and end positions of the dot set discriminated by said discrimination means
   wherein said generating means generates, as second information, relative positions between the dot change point positions of each scanning line and change point positions on an immediately preceding scanning line detected by said change point detection means, and the start and end positions of the dot set discriminated by said discrimination means.

9. An apparatus according to claim 2, further comprising storage means for storing the information generated by said generation means in correspondence with identification information for identifying the dot pattern.

10. An apparatus according to claim 9, wherein said storage means comprises an external storage device detachable from an output apparatus.

11. An apparatus according to claim 1, wherein said information processing apparatus is a host computer.

12. An output apparatus comprising:
    change point detection means for obtaining dot change point positions and the number of change points in units of scanning lines by scanning a dot pattern on a scanning line input from an external apparatus in a predetermined direction;

discrimination means for discriminating start and end positions of a dot set by scanning the dot pattern input from said external apparatus in the predetermined direction so as to detect appearance of a noncontinuous dot pattern in a direction substantially perpendicular to a direction of the scanning line; and generation means for generating information for each scanning line based on the number of change points and based on the positions of the dot change point in each said scanning line, the information representing, as relative values with respect to an immediately preceding scanning line, the change point positions and the number of change points detected by said change point detection means, and representing the start and end positions of the dot set discriminated by said discrimination means.

13. An apparatus according to claim 12, wherein each of the dot change points represents a boundary of the dot set in units of scanning lines.

14. An apparatus according to claim 12, wherein the dot set is a set of continuous dots in an identical color.

15. An apparatus according to claim 12, wherein the information generated by said generation means is encoded code data.

16. An output apparatus comprising:

change point detection means for obtaining dot change point positions and the number of change points in units of scanning lines by scanning a dot pattern input from an external apparatus in a predetermined direction;

discrimination means for discriminating start and end positions of a dot set by scanning the dot pattern input from said external apparatus in the predetermined direction so as to detect appearance of a noncontinuous dot pattern in a direction substantially perpendicular to a direction of the scanning line; and generation means for generating information representing, as a relative value with respect to an immediately preceding scanning line, the change point positions and the number of change points detected by said change point detection means and the start and end positions of the dot set discriminated by said discrimination means wherein said generation means generates, as first information, a difference between the number of dot change points of each scanning line and the number of change points on an immediately preceding scanning line detected by said change point detection means.

17. An output apparatus comprising:

change point detection means for obtaining dot change point positions and the number of change points in units of scanning lines by scanning a dot pattern input from an external apparatus in a predetermined direction;

discrimination means for discriminating start and end positions of a dot set by scanning the dot pattern input from said external apparatus in the predetermined direction so as to detect appearance of a noncontinuous dot pattern in a direction substantially perpendicular to a direction of the scanning line; and generation means for generating information representing, as a relative value with respect to an immediately preceding scanning line, the change point positions and the number of change points detected by said change point detection means and the start and end positions of the dot set discriminated by said discrimination means wherein said generation means generates, as second information, relative positions between the dot change point positions of each scanning line and change point positions on an immediately preceding scanning line detected by said change point detection means, and the start and end positions of the dot set discriminated by said discrimination means.

18. An apparatus according to claim 12, further comprising storage means for storing the information generated by said generation means in correspondence with identification information for identifying the dot pattern.

19. An apparatus according to claim 18, wherein said storage means comprises an external storage device detachable from said output apparatus.

20. An apparatus according to claim 12, wherein said output apparatus is a laser beam printer.

21. An output apparatus comprising:

storage means for obtaining dot change point positions and the number of change points in units of scanning lines by scanning a dot pattern in a predetermined direction, for discriminating start and end positions of a dot set by scanning the dot pattern in the predetermined direction so as to detect appearance of noncontinuous dot pattern in a direction substantially perpendicular to a direction of the scanning line, and for storing information representing, as relative values with respect to an immediately preceding scanning line, the obtained change point positions and the obtained number of change points and the discriminated start and end positions of the dot set, in advance in correspondence with identification information for identifying the dot pattern, said information being generated for each scanning line based on the number of change points and based on the positions of the dot change point in each said scanning line; and output means for outputting the number of dot change points and dot change point positions of each line in a dot pattern corresponding to code information on the basis of the information read out from said storage means.

22. An apparatus according to claim 21, wherein each of the dot change points represents a boundary of the dot set in units of scanning lines.

23. An apparatus according to claim 21, wherein the dot set is a set of continuous dots in an identical color.

24. An apparatus according to claim 21, wherein the information stored in said storage means is code data obtained by encoding the dot pattern, and is decoded by said output means.

25. An output apparatus comprising:

storage means for obtaining dot change point positions and the number of change points in units of scanning lines by scanning a dot pattern in a predetermined direction, for discriminating start and end positions of a dot set by scanning the dot pattern in the predetermined direction so as to detect appearance of noncontinuous dot pattern in a direction substantially perpendicular to a direction of the scanning line, and for storing information representing, as a relative value with respect to an immediately preceding scanning line, the obtained change point positions and the obtained number of change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from said storage means, wherein said storage means stores, as first information, a difference between the obtained number of dot change points of each scanning line and the number of change points on an immediately preceding scanning line.

26. An output apparatus comprising:

storage means for obtaining dot change point positions and the number of change points in units of scanning lines by scanning a dot pattern in a predetermined direction, for discriminating start and end positions of a dot set by scanning the dot pattern in the predetermined direction so as to detect appearance of noncontinuous dot pattern in a direction substantially perpendicular to a direction of the scanning line, and for storing information representing, as a relative value with respect to an immediately preceding scanning line, the obtained change point positions and the obtained number of change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from said storage means wherein said storage means stores, as second information, relative positions between the obtained dot change point positions of each scanning line and the change point positions on an immediately preceding scanning line, and the discriminated start and end positions of the dot set.

27. An apparatus according to claim 21, wherein said storage means comprises an external storage device detachable from said output apparatus.

28. An output apparatus comprising:

storage means for obtaining dot change point positions and the number of change points in units of scanning lines by scanning a dot pattern in a predetermined direction, for discriminating start and end positions of a dot set by scanning the dot pattern in the predetermined direction so as to detect appearance of noncontinuous dot pattern in a direction substantially perpendicular to a direction of the scanning line, and for storing information representing, as a relative value with respect to an immediately preceding scanning line, the obtained change point positions and the obtained number of change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from said storage means wherein said output means outputs the number of dot change points of each line on the basis of the information stored in said storage means and representing a difference between the obtained number of dot change points of each scanning line and the number of change points on an immediately preceding scanning line.

29. An output apparatus comprising:

storage means for obtaining dot change point positions and the number of change points in units of scanning lines by scanning a dot pattern in a predetermined direction, for discriminating start and end positions of a dot set by scanning the dot pattern in the predetermined direction so as to detect appearance of noncontinuous dot pattern in a direction substantially perpendicular to a direction of the scanning line, and for storing information representing, as a relative value with respect to an immediately preceding scanning line, the obtained change point positions and the obtained number of change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from said storage means wherein said output means outputs the dot change point positions of each line on the basis of the information stored in said storage means and representing relative positions between the obtained dot change point positions of each scanning line and the change point positions on an immediately preceding scanning line, and the discriminated start and end positions of the dot set.

30. An apparatus according to claim 21, further comprising image forming means for generating a dot pattern to form an image on the basis of the number of dot change points and the dot change point positions output from said output means.

31. An output apparatus comprising:

connection means for connecting a storage means for obtaining dot change point positions and the number of change points in units of scanning lines by scanning a dot pattern in a predetermined direction, for discriminating start and end positions of a dot set by scanning the dot pattern in the predetermined direction so as to detect appearance of a noncontinuous dot pattern in a direction substantially perpendicular to a direction of the scanning line, and for storing information representing, as relative values with respect to an immediately preceding scanning line, the obtained change points and the discriminated start and end positions of the dot set, in advance in correspondence with identification information for identifying the dot pattern, said information being generated for each scanning line based on the number of change points and based on the positions of the dot change point in each said scanning line, the information; and output means for outputting the number of dot change points and dot change point positions of each line in a dot pattern corresponding to code information on the basis of the information read out from said storage means via said connection means in accordance with the code information which is externally input and specifies a dot pattern.

32. An apparatus according to claim 31, wherein each of the dot change points represents a boundary of the dot set in units of scanning lines.

33. An apparatus according to claim 31, wherein the dot set is a set of continuous dots in an identical color.

34. An apparatus according to claim 31, wherein the information stored in said storage means is code data obtained by encoding the dot pattern, and is decoded by said output means.

35. An output apparatus comprising:

connection means for connecting a storage means for obtaining dot change point positions and the number of change points in units of scanning lines by scanning a dot pattern in a predetermined direction, for discriminating start and end positions of a dot set by scanning the dot pattern in the predetermined direction so as to detect appearance of a noncontinuous dot pattern in a direction substantially perpendicular to a direction of the scanning line, and for storing information representing, as a relative value with respect to an immediately preceding scanning line, the obtained change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from said storage means via said connection means in accordance with the code information which is externally input and specifies a dot pattern wherein said storage means stores, as first information, a difference between the obtained number of dot change points of each scanning line and the number of change points on an immediately preceding scanning line.

36. An output apparatus comprising:

connection means for connecting a storage means for obtaining dot change point positions and the number of change points in units of scanning lines by scanning a dot pattern in a predetermined direction, for discriminating start and end positions of a dot set by scanning the dot pattern in the predetermined direction so as to detect appearance of a noncontinuous dot pattern in a direction substantially perpendicular to a direction of the scanning line, and for storing information representing, as a relative value with respect to an immediately preceding scanning line, the obtained change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from said storage means via said connection means in accordance with the code information which is externally input and specifies a dot pattern wherein said storage means stores, as second information, relative positions between the obtained dot change point positions of each scanning line and the change point positions on an immediately preceding scanning line, and the discriminated start and end positions of the dot set.

37. An apparatus according to claim 31, wherein said storage means is an external storage device, which can be connected to said connection means.

38. An output apparatus comprising:

connection means for connecting a storage means for obtaining dot change point positions and the number of change points in units of scanning lines by scanning a dot pattern in a predetermined direction, for discriminating start and end positions of a dot set by scanning the dot pattern in the predetermined direction so as to detect appearance of a noncontinuous dot pattern in a direction substantially perpendicular to a direction of the scanning line, and for storing information representing, as a relative value with respect to an immediately preceding scanning line, the obtained change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from said storage means via said connection means in accordance with the code information which is externally input and specifies a dot pattern wherein said output means outputs the number of dot change points of each line on the basis of the information stored in said storage means and representing a difference between the obtained number of dot change points of each scanning line and the number of change points on an immediately preceding scanning line.

39. An output apparatus comprising:

connection means for connecting a storage means for obtaining dot change point positions and the number of change points in units of scanning lines by scanning a dot pattern in a predetermined direction, for discriminating start and end positions of a dot set by scanning the dot pattern in the predetermined direction so as to detect appearance of a noncontinuous dot pattern in a direction substantially perpendicular to a direction of the scanning line, and for storing information representing, as a relative value with respect to an immediately preceding scanning line, the obtained change points and the discriminated start and end positions of the dot set, in advance in correspondence with identification information for identifying the dot pattern; and output means for outputting the number of dot change points and dot change point positions of each line in a dot pattern corresponding to code information on the basis of the information read out from said storage means via said connection means in accordance with the code information which is externally input and specifies a dot pattern wherein said output means outputs the dot change point positions of each line on the basis of the information stored in said storage means representing relative positions between the obtained dot change point positions of each scanning line and the change point positions on an immediately preceding scanning line, and the discriminated start and end positions of the dot set.

40. An apparatus according to claim 31, further comprising image forming means for generating a dot pattern to form an image on the basis of the number of dot change points and the dot change point positions output from said output means.

41. An output apparatus comprising:

change point detection means for obtaining dot change point positions and the number of change points in units of scanning lines by scanning a dot pattern on a scanning line in a predetermined direction;

discriminating means for discriminating start and end positions of a dot set by detecting appearance of a noncontinuous dot pattern in a direction substantially perpendicular to a direction of the scanning line;

generation means for generating information for each scanning line based on the number of change points and based on the positions of the dot change point in each said scanning line, the information representing, as relative values with respect to an immediately preceding scanning line, the change point positions and the number of change points detected by said change point detection means and the start and end positions of the dot set discriminated by said discrimination means;

storage means for storing the information generated by said generation means in correspondence with identification information for identifying the dot pattern; and output means for outputting the number of dot change points and dot change point positions of each line in a dot pattern corresponding to code information on the basis of the information read out from said storage means.

42. An apparatus according to claim 41, wherein the dot pattern is input from a host computer to said output apparatus.

43. An apparatus according to claim 41, wherein the dot pattern is read by an image reader, and the read dot pattern is input to said output apparatus.

44. An apparatus according to claim 41, wherein each of the dot change points represents a boundary of the dot set in units of scanning lines.

45. An apparatus according to claim 41, wherein the dot set is a set of continuous dots in an identical color.

46. An apparatus according to claim 41, wherein the information generated by said generation means is encoded code data.

47. An output apparatus comprising:

change point detection means for obtaining dot change point positions and the number of change points in units of scanning lines by scanning a dot pattern in a predetermined direction;

discriminating means for discriminating start and end positions of a dot set by detecting appearance of a noncontinuous dot pattern in a direction substantially perpendicular to a direction of the scanning line;

generation means for generating information representing, as a relative value with respect to an immediately preceding scanning line, the change point positions and the number of change points detected by said change point detection means and the start and end positions of the dot set discriminated by said discrimination means;

storage means for storing the information generated by said generation means in correspondence with identification information for identifying the dot pattern; and output means for outputting the number of dot change points and dot change point positions of each line in a dot pattern corresponding to code information on the basis of the information read out from said storage means wherein said generation means generates, as first information, a difference between the number of dot change points of each scanning line and the number of change points on an immediately preceding scanning line detected by said change point detection means.

48. An output apparatus comprising:

change point detection means for obtaining dot change point positions and the number of change points in units of scanning lines by scanning a dot pattern in a predetermined direction;

discriminating means for discriminating start and end positions of a dot set by detecting appearance of a noncontinuous dot pattern in a direction substantially perpendicular to a direction of the scanning line;

generation means for generating information representing, as a relative value with respect to an immediately preceding scanning line, the change point positions and the number of change points detected by said change point detection means and the start and end positions of the dot set discriminated by said discrimination means;

storage means for storing the information generated by said generation means in correspondence with identification information for identifying the dot pattern; and output means for outputting the number of dot change points and dot change point positions of each line in a dot pattern corresponding to code information on the basis of the information read out from said storage means wherein said generation means generates, as second information, relative positions between the dot change point positions of each scanning line and change point positions on an immediately preceding scanning line detected by said change point detection means, and the start and end positions of the dot set discriminated by said discrimination means.

49. An apparatus according to claim 41, wherein said storage means comprises an external storage device detachable from said output apparatus.

50. An output apparatus comprising:

change point detection means for obtaining dot change point positions and the number of change points in units of scanning lines by scanning a dot pattern in a predetermined direction;

discriminating means for discriminating start and end positions of a dot set by detecting appearance of a noncontinuous dot pattern in a direction substantially perpendicular to a direction of the scanning line;

generation means for generating information representing, as a relative value with respect to an immediately preceding scanning line, the change point positions and the number of change points detected by said change point detection means and the start and end positions of the dot set discriminated by said discrimination means;

storage means for storing the information generated by said generation means in correspondence with identification information for identifying the dot pattern; and output means for outputting the number of dot change points and dot change point positions of each line in a dot pattern corresponding to code information on the basis of the information read out from said storage means wherein said output means outputs the number of dot change points of each line on the basis of the information stored in said storage means and representing a difference between the obtained number of dot change points of each scanning line and the number of change points on an immediately preceding scanning line detected by said change point detection means.

51. An output apparatus comprising:

change point detection means for obtaining dot change point positions and the number of change points in units of scanning lines by scanning a dot pattern in a predetermined direction;

discriminating means for discriminating start and end positions of a dot set by detecting appearance of a noncontinuous dot pattern in a direction substantially perpendicular to a direction of the scanning line;

generation means for generating information representing, as a relative value with respect to an immediately preceding scanning line, the change point positions and the number of change points detected by said change point detection means and the start and end positions of the dot set discriminated by said discrimination means;

storage means for storing the information generated by said generation means in correspondence with identification information for identifying the dot pattern; and output means for outputting the number of dot change points and dot change point positions of each line in a dot pattern corresponding to code information on the basis of the information read out from said storage means wherein said output means outputs the dot change point positions of each line on the basis of the information stored in said storage means and representing relative positions between the obtained dot change point positions of each scanning line and the change point positions on an immediately preceding scanning line detected by said change point detection means, and the start and end positions of the dot set discriminated by said discrimination means.

52. An apparatus according to claim 41, further comprising image forming means for generating a dot pattern to form an image on the basis of the number of dot change points and the dot change point positions output from said output means.

53. An information processing method comprising the steps of:

obtaining dot change point positions and the number of change points in units of scanning lines by scanning a dot pattern on a scanning line in a predetermined direction;

discriminating start and end positions of a dot set by scanning the dot pattern in the predetermined direction so as to detect appearance of a noncontinuous dot pattern in a direction substantially perpendicular to a direction of the scanning line; and generating information for each scanning line based on the number of change points and based on the positions of the dot change point in each said scanning line, the information representing, as relative values with respect to an immediately preceding scanning line, the change point positions and the number of change points detected by said change point detection step, and representing the start and end positions of the dot set discriminated by said discrimination step.

54. A method according to claim 53, further comprising a storing step for storing a dot pattern.

55. A method according to claim 54, wherein the dot pattern is stored in an external storage device detachable from an information processing apparatus.

56. A method according to claim 53, wherein in the obtaining step each of the dot change points represents a boundary of the dot set in units of scanning lines.

57. A method according to claim 56, wherein the dot set is a set of continuous dots in an identical color.

58. A method according to claim 53, wherein the information generated by said generation step is encoded code data.

59. A method according to claim 53, further comprising a storage step for storing the information generated by said generation step in correspondence with identification information for identifying the dot pattern.

60. A method according to claim 59, wherein in said storage step information is stored in an external storage device detachable from an output device.

61. A method according to claim 55, wherein said information processing apparatus is a host computer.

62. An output method comprising the steps of:

obtaining dot change point positions and the number of change points in units of scanning lines by scanning a dot pattern on a scanning line input from an external apparatus in a predetermined direction;

discriminating start and end positions of a dot set by scanning the dot pattern input from said external apparatus in the predetermined direction so as to detect appearance of a noncontinuous dot pattern in a direction substantially perpendicular to a direction of the scanning line; and generating information for each scanning line based on the number of change points and based on the positions of the dot change point in each said scanning line, the information representing, as relative values with respect to an immediately preceding scanning line, the change point positions and the number of change points detected by said change point detection step, and representing the start and end positions of the dot set discriminated by said discrimination step.

63. A method according to claim 62, wherein each of the dot change points represents a boundary of the dot set in units of scanning lines.

64. A method according to claim 62, wherein the dot set is a set of continuous dots in an identical color.

65. A method according to claim 62, wherein the information generated by said generation step is encoded code data.

66. A method according to claim 62, further comprising a storage step for storing the information generated by said generation step in correspondence with identification for identifying the dot pattern.

67. A method according to claim 66, wherein the storage device comprises an external storage device detachable from said output step.

68. An output method comprising the steps of:

obtaining dot change point positions and the number of change points in units of scanning lines by scanning a dot pattern in a predetermined direction, discriminating start and end positions of a dot set by scanning the dot pattern in the predetermined direction so as to detect appearance of noncontinuous dot pattern in a direction substantially perpendicular to a direction of the scanning line, and storing information representing, as relative values with respect to an immediately preceding scanning line, the obtained change point positions and the obtained number of change points and the discriminated start and end positions of the dot set, in advance in correspondence with identification information for identifying the dot pattern, said information being generated for each scanning line based on the number of change points and based on the positions of the dot change point in each said scanning line; and outputting the number of dot change points and dot change point positions of each line in a dot pattern corresponding to code information on the basis of the information read out from said storage step.

69. A method according to claim 68, wherein each of the dot change points represents a boundary of the dot set in units of scanning lines.

70. A method according to claim 68, wherein the dot set is a set of continuous dots in an identical color.

71. A method according to claim 68, wherein the information stored in said storage step is code data obtained by encoding the dot pattern, and is decoded by said output step.

72. A method according to claim 69, further comprising an image forming step for generating a dot pattern to form an image on the basis of the number of dot change points and the dot change point positions output from said output step.

73. An output method comprising the steps of:

connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as relative values with respect to an immediately preceding scanning line, the obtained change points and the discriminated start and end positions of the dot set, in advance in correspondence with identification information for identifying the dot pattern, said information being generated for each scanning line based on the number of change points and based on the positions of the dot change point in each said scanning line, the information; and outputting the number of dot change points and dot change point positions of each line in a dot pattern corresponding to code information on the basis of the information read out from said storage step via said connection step in accordance with the code information which is externally input and specifies a dot pattern.

74. An apparatus according to claim 73, wherein each of the dot change points represents a boundary of the dot set in units of scanning lines.

75. A method according to claim 73, wherein the dot set is a set of continuous dots in an identical color.

76. A method according to claim 73, wherein the information stored in said storage step is coded data obtained by encoding the dot pattern, and is decoded by said output step.

77. A method according to claim 73, further comprising an image forming step for generating a dot pattern to form an image on the basis of the number of dot change points and the dot change point positions output from said output step.

78. An output method comprising the steps of:

obtaining dot change point positions and the number of change points in units of scanning lines by scanning a dot pattern on a scanning line in a predetermined direction;

discriminating start and end positions of a dot set by detecting appearance of a noncontinuous dot pattern in a direction substantially perpendicular to a direction of the scanning line;

generating information for each scanning line based on the number of change points and based on the positions of the dot change point in each said scanning line, the information representing, as relative values with respect to an immediately preceding scanning line, the change point positions and the number of change points detected by said change point detection step and the start and end positions of the dot set discriminated by said discrimination step;

storing the information generated by said generation step in correspondence with identification information for identifying the dot pattern; and outputting the number of dot change points and dot change point positions of each line in a dot pattern corresponding to code information on the basis of the information read out from said storage step.

79. A method according to claim 78, wherein in the input step the dot pattern is input from a host computer.

80. A method according to claim 78, wherein the dot pattern is read by an image reader, and the read dot pattern is input to said output step.

81. A method according to claim 78, wherein each of the dot change points represents a boundary of the dot set in units of scanning lines.

82. A method according to claim 78, wherein the dot set is a set of continuous dots in an identical color.

83. A method according to claim 78, wherein the information generated by said generation step is encoded code data.

84. A method according to claim 78, wherein said storage step stores information in an external storage device.

85. A method according to claim 78, further comprising an image forming step for generating a dot pattern to form an image on the basis of the number of dot change points and the dot change point positions output from said output step.

86. An information processor comprising the steps of:

a change point detector for obtaining dot change point positions and the number of change points in units of scanning lines by scanning a dot pattern on a scanning line in a predetermined direction;

a discriminator for discriminating start and end positions of a dot set by scanning the dot pattern in the predetermined direction so as to detect appearance of a noncontinuous dot pattern in a direction substantially perpendicular to a direction of the scanning line; and a generator for generating information for each scanning line based on the number of change points and based on the positions of the dot change point in each said scanning line, the information representing, as relative values with respect to an immediately preceding scanning line, the change point positions and the number of change points detected by said change point detector, and representing the start and end positions of the dot set discriminated by said discriminator.

87. A device according to claim 86, wherein the dot pattern is stored in said information processor.

88. A device according to claim 86, wherein the dot pattern is stored in an external storage device detachable from said information processor.

89. A device according to claim 88, wherein each of the dot change points represents a boundary of the dot set in units of scanning lines.

90. A device according to claim 87, wherein the dot set is a set of continuous dots in an identical color.

91. A device according to claim 86, wherein the information generated by said generator is encoded code data.

92. A device according to claim 87, further comprising a storage device for storing the information generated by said generator in correspondence with identification information for identifying the dot pattern.

93. A device according to claim 92, wherein said storage device comprises an external storage device detachable from an output device.

94. A device according to claim 86, wherein said information processor is a host computer.

95. An output device comprising the steps of:

a change point detector for obtaining dot change point positions and the number of change points in units of scanning lines by scanning a dot pattern on a scanning line input from an external apparatus in a predetermined direction;

a discriminator for discriminating start and end positions of a dot set by scanning the dot pattern input from said external apparatus in the predetermined direction so as to detect appearance of a noncontinuous dot pattern in a direction substantially perpendicular to a direction of the scanning line; and a generator for generating information for each scanning line based on the number of change points and based on the positions of the dot change point in each said scanning line, the information representing, as relative values with respect to an immediately preceding scanning line, the change point positions and the number of change points detected by said change point detector, and representing the start and end positions of the dot set discriminated by said discriminator.

96. A device according to claim 95, wherein each of the dot change points represents a boundary of the dot set in units of scanning lines.

97. A device according to claim 95, wherein the dot set is a set of continuous dots in an identical color.

98. A device according to claim 95, wherein the information generated by said generator is encoded code data.

99. A device according to claim 95, further comprising a storage device for storing the information generated by said generator in correspondence with identification for identifying the dot pattern.

100. A device according to claim 99, wherein the storage device comprises an external storage device detachable from said output device.

101. A device according to claim 95, wherein said output step is a laser beam printer.

102. An output device comprising the steps of:
    a storage device for obtaining dot change point positions and the number of change points in units of scanning lines by scanning a dot pattern in a predetermined direction, discriminating start and end positions of a dot set by scanning the dot pattern in the predetermined direction so as to detect appearance of noncontinuous dot pattern in a direction substantially perpendicular to a direction of the scanning line, and storing information representing, as relative values with respect to an immediately preceding scanning line, the obtained change point positions and the obtained number of change points and the discriminated start and end positions of the dot set, in advance in correspondence with identification information for identifying the dot pattern, said information being generated for each scanning line based on the number of change points and based on the positions of the dot change point in each said scanning line; and
    an output device for outputting the number of dot change points and dot change point positions of each line in a dot pattern corresponding to code information on the basis of the information read out from said storage device.

103. A device according to claim 102, wherein each of the dot change points represents a boundary of the dot set in units of scanning lines.

104. A device according to claim 102, wherein the dot set is a set of continuous dots in an identical color.

105. A device according to claim 102, wherein the information stored in said storage device is code data obtained by encoding the dot pattern, and is decoded by said output device.

106. A device according to claim 102, wherein said storage device comprises an external storage device detachable from said output device.

107. A device according to claim 102, further comprising an image forming device for generating a dot pattern to form an image on the basis of the number of dot change points and the dot change point positions output from said output device.

108. An output device comprising the steps of:
    a connector for connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as relative values with respect to an immediately preceding scanning line, the obtained change points and the discriminated start and end positions of the dot set, in advance in correspondence with identification information for identifying the dot pattern, said information being generated for each scanning line based on the number of change points and based on the positions of the dot change point in each said scanning line, the information; and
    an output device outputting the number of dot change points and dot change point positions of each line in a dot pattern corresponding to code information on the basis of the information read out from said storage device via said connector in accordance with the code information which is externally input and specifies a dot pattern.

109. An apparatus according to claim 108, wherein each of the dot change points represents a boundary of the dot set in units of scanning lines.

110. A device according to claim 108, wherein the dot set is a set of continuous dots in an identical color.

111. A device according to claim 108, wherein the information stored in said storage device is coded data obtained by encoding the dot pattern, and is decoded by said output device.

112. A device according to claim 108, wherein said storage device is an external storage device, which can be connected to said connector.

113. A device according to claim 108, further comprising an image forming device for generating a dot pattern to form an image on the basis of the number of dot change points and the dot change point positions output from said output device.

114. An output device comprising the steps of:
    a change point detector for obtaining dot change point positions and the number of change points in units of scanning lines by scanning a dot pattern on a scanning line in a predetermined direction;
    a discriminator for discriminating start and end positions of a dot set by detecting appearance of a noncontinuous dot pattern in a direction substantially perpendicular to a direction of the scanning line;
    a generator for generating information for each scanning line based on the number of change points and based on the positions of the dot change point in each said scanning line, the information representing, as relative values with respect to an immediately preceding scanning line, the change point positions and the number of change points detected by said change point detector and the start and end positions of the dot set discriminated by said discriminator;
    a storage device for storing the information generated by said generator in correspondence with identification information for identifying the dot pattern; and an output device for outputting the number of dot change points and dot change point positions of each line in a dot pattern corresponding to code information on the basis of the information read out from said storage device.

115. A device according to claim 114, wherein the dot pattern is input from a host computer to said output device.

116. A device according to claim 114, wherein the dot pattern is read by an image reader, and the read dot pattern is input to said output device.

117. A device according to claim 114, wherein each of the dot change points represents a boundary of the dot set in units of scanning lines.

118. A device according to claim 114, wherein the dot set is a set of continuous dots in an identical color.

119. A device according to claim 114, wherein the information generated by said generator is encoded code data.

120. A device according to claim 114, wherein said storage device comprises an external storage device detachable from said output device.

121. A device according to claim 114, further comprising an image forming device for generating a dot pattern to form an image on the basis of the number of dot change points and the dot change point positions output from said output device.

122. A storage medium used in an information processing apparatus, said storage medium comprising means for storing a program comprising process steps to:

obtain dot change point positions and the number of change points in units of scanning lines by scanning a dot pattern on a scanning line in a predetermined direction;

discriminate start and end positions of a dot set by scanning the dot pattern in the predetermined direction so as to detect appearance of a noncontinuous dot pattern in a direction substantially perpendicular to a direction of the scanning line; and generate information for each scanning line based on the number of change points and based on the positions of the dot change point in each said scanning line, the information representing, as relative values with respect to an immediately preceding scanning line, the change point positions and the number of change points detected by said change point detection step, and representing the start and end positions of the dot set discriminated by said discrimination step.

123. A storage medium according to claim 122, further comprising a storing step for storing a dot pattern.

124. A storage medium according to claim 123, wherein the dot pattern is stored in an external storage device detachable from an information processing apparatus.

125. A storage medium according to claim 122, wherein in the obtaining step each of the dot change points represents a boundary of the dot set in units of scanning lines.

126. A storage medium according to claim 125, wherein the dot set is a set of continuous dots in an identical color.

127. A storage medium according to claim 122, wherein the information generated by said generation step is encoded code data.

128. A storage medium according to claim 122, comprising a storage step to store the information generated by said generation step in correspondence with identification information for identifying the dot pattern.

129. A storage medium according to claim 128, wherein in said storage step information is stored in an external storage device detachable from an output device.

130. A storage medium according to claim 124, wherein said information processing apparatus is a host computer.

131. An output storage medium used in an information processing apparatus, said storage medium comprising means for storing a program comprising process steps to:

obtain dot change point positions and the number of change points in units of scanning lines by scanning a dot pattern on a scanning line input from an external apparatus in a predetermined direction;

discriminate start and end positions of a dot set by scanning the dot pattern input from said external apparatus in the predetermined direction so as to detect appearance of a noncontinuous dot pattern in a direction substantially perpendicular to a direction of the scanning line; and generate information for each scanning line based on the number of change points and based on the positions of the dot change point in each said scanning line, the information representing, as relative values with respect to an immediately preceding scanning line, the change point positions and the number of change points detected by said change point detection step, and representing the start and end positions of the dot set discriminated by said discrimination step.

132. A storage medium according to claim 131, wherein each of the dot change points represents a boundary of the dot set in units of scanning lines.

133. A storage medium according to claim 131, wherein the dot set is a set of continuous dots in an identical color.

134. A storage medium according to claim 131, wherein the information generated by said generation step is encoded code data.

135. A storage medium according to claim 131, further comprising a storage step to store the information generated by said generation step in correspondence with identification for identifying the dot pattern.

136. A storage medium according to claim 131, wherein said output step is a laser beam printer.

137. An output storage medium used in an information processing apparatus, said storage medium comprising means for storing a program comprising process steps to:

obtain dot change point positions and the number of change points in units of scanning lines by scanning a dot pattern in a predetermined direction, discriminate start and end positions of a dot set by scanning the dot pattern in the predetermined direction so as to detect appearance of noncontinuous dot pattern in a direction substantially perpendicular to a direction of the scanning line, and store information representing, as relative values with respect to an immediately preceding scanning line, the obtained change point positions and the obtained number of change points and the discriminated start and end positions of the dot set, in advance in correspondence with identification information for identifying the dot pattern, said information being generated for each scanning line based on the number of change points and based on the positions of the dot change point in each said scanning line; and output the number of dot change points and dot change point positions of each line in a dot pattern corresponding to code information on the basis of the information read out from said storage step.

138. A storage medium according to claim 137, wherein each of the dot change points represents a boundary of the dot set in units of scanning lines.

139. A storage medium according to claim 137, wherein the information stored in said storage step is code data obtained by encoding the dot pattern, and is decoded by said output step.

140. A storage medium according to claim 137, wherein said storage step comprises an external storage device detachable from said output step.

141. A storage medium according to claim 137, further comprising an image forming step to generate a dot pattern to form an image on the basis of the number of dot change points and the dot change point positions output from said output step.

142. An output storage medium used in an information processing apparatus, said storage medium comprising means for storing a program comprising process steps to:

connect a storage means for obtaining dot change point positions and the number of change points in units of scanning lines by scanning a dot pattern in a predetermined direction, discriminate start and end positions of a dot set by scanning the dot pattern in the predetermined direction so as to detect appearance of a noncontinuous dot pattern in a direction substantially perpendicular to a direction of the scanning line, and store information representing, as relative values with respect to an immediately preceding scanning line, the obtained change points and the discriminated start and end positions of the dot set, in advance in correspondence with identification information for identifying the dot pattern, said information being generated for each scanning line based on the number of change points and based on the positions of the dot change point in each said scanning line, the information; and output the number of dot change points and dot change point positions of each line in a dot pattern corresponding to code information on the basis of the information read out from said storage step via said connection step in accordance with the code information which is externally input and specifies a dot pattern.

143. An apparatus according to claim 142, wherein each of the dot change points represents a boundary of the dot set in units of scanning lines.

144. A storage medium according to claim 142, wherein the dot set is a set of continuous dots in an identical color.

145. A storage medium according to claim 142, wherein the information stored in said storage step is coded data obtained by encoding the dot pattern, and is decoded by said output step.

146. A storage medium according to claim 145, further comprising an image forming step to generate a dot pattern to form an image on the basis of the number of dot change points and the dot change point positions output from said output step.

147. An output storage medium used in an information processing apparatus, said storage medium comprising means for storing a program comprising process steps to:

obtain dot change point positions and the number of change points in units of scanning lines by scanning a dot pattern on a scanning line in a predetermined direction;

discriminate start and end positions of a dot set by detecting appearance of a noncontinuous dot pattern in a direction substantially perpendicular to a direction of the scanning line;

generate information for each scanning line based on the number of change points and based on the positions of the dot change point in each said scanning line, the information representing, as relative values with respect to an immediately preceding scanning line, the change point positions and the number of change points detected by said change point detection step and the start and end positions of the dot set discriminated by said discrimination step;

store the information generated by said generation step in correspondence with identification information for identifying the dot pattern; and output the number of dot change points and dot change point positions of each line in a dot pattern corresponding to code information on the basis of the information read out from said storage step.

148. A storage medium according to claim 147, wherein the dot pattern is input from a host computer to said output step.

149. A storage medium according to claim 147, wherein the dot pattern is read by an image reader, and the read dot pattern is input to said output step.

150. A storage medium according to claim 147, wherein each of the dot change points represents a boundary of the dot set in units of scanning lines.

151. A storage medium according to claim 147, wherein the dot set is a set of continuous dots in an identical color.

152. A storage medium according to claim 147, wherein the information generated by said generation step is encoded code data.

153. A storage medium according to claim 147, wherein said storage step comprises an external storage device detachable from said output device.

154. A storage medium according to claim 147, further comprising an image forming step for generating a dot pattern to form an image on the basis of the number of dot change points and the dot change point positions output from said output step.

155. An information processing method comprising the steps of:

obtaining dot change point positions and the number of change points in units of scanning lines by scanning a dot pattern in a predetermined direction;

discriminating start and end positions of a dot set by scanning the dot pattern in the predetermined direction so as to detect appearance of a noncontinuous dot pattern in a direction substantially perpendicular to a direction of the scanning line; and generating information representing, as a relative value with respect to an immediately preceding scanning line, the change point positions and the number of change points detected by said change point detection step and the start and end positions of the dot set discriminated by said discrimination step, wherein said generating step generates, as first information, a difference between the number of dot change points of each scanning line and the number of change points on an immediately preceding scanning line detected by said change point detection step.

156. An information processing method comprising the steps of:

obtaining dot change point positions and the number of change points in units of scanning lines by scanning a dot pattern in a predetermined direction;

discriminating start and end positions of a dot set by scanning the dot pattern in the predetermined direction so as to detect appearance of a noncontinuous dot pattern in a direction substantially perpendicular to a direction of the scanning line; and generating information representing, as a relative value with respect to an immediately preceding scanning line, the change point positions and the number of change points detected by said change point detection step and the start and end positions of the dot set discriminated by said discrimination step, wherein said generating step generates, as second information, relative positions between the dot change point positions of each scanning line and change point positions on an immediately preceding scanning line detected by said change point detection step, and the start and end positions of the dot set discriminated by said discrimination step.

157. An output method comprising the steps of:

obtaining dot change point positions and the number of change points in units of scanning lines by scanning a dot pattern input from an external apparatus in a predetermined direction;

discriminating start and end positions of a dot set by scanning the dot pattern input from said external apparatus in the predetermined direction so as to detect appearance of a noncontinuous dot pattern in a direction substantially perpendicular to a direction of the scanning line; and generating information representing, as a relative value with respect to an immediately preceding scanning line, the change point positions and the number of change points detected by said change point detection step and the start and end positions of the dot set discriminated by said discrimination step, wherein said generation step generates, as first information, a difference between the number of dot change points of each scanning line and the number of change points on an immediately preceding scanning line detected by said change point detection step.

158. An output method comprising the steps of:

obtaining dot change point positions and the number of change points in units of scanning lines by scanning a dot pattern input from an external apparatus in a predetermined direction;

discriminating start and end positions of a dot set by scanning the dot pattern input from said external apparatus in the predetermined direction so as to detect appearance of a noncontinuous dot pattern in a direction substantially perpendicular to a direction of the scanning line; and generating information representing, as a relative value with respect to an immediately preceding scanning line, the change point positions and the number of change points detected by said change point detection step and the start and end positions of the dot set discriminated by said discrimination step, wherein said generation step generates, as second information, relative positions between the dot change point positions of each scanning line and change point positions on an immediately preceding scanning line detected by said change point detection step, and the start and end positions of the dot set discriminated by said discrimination step.

159. An output method comprising the steps of:

obtaining dot change point positions and the number of change points in units of scanning lines by scanning a dot pattern in a predetermined direction, discriminating start and end positions of a dot set by scanning the dot pattern in the predetermined direction so as to detect appearance of noncontinuous dot pattern in a direction substantially perpendicular to a direction of the scanning line, and storing information representing, as a relative value with respect to an immediately preceding scanning line, the obtained change point positions and the obtained number of change points and the discriminated start and end positions of the dot set, in advance in correspondence with identification information for identifying the dot pattern; and outputting the number of dot change points and dot change point positions of each line in a dot pattern corresponding to code information on the basis of the information read out from said storage step, wherein said storage step stores, as first information, a difference between the obtained number of dot change points of each scanning line and the number of change points on an immediately preceding scanning line.

160. An output method comprising the steps of:

obtaining dot change point positions and the number of change points in units of scanning lines by scanning a dot pattern in a predetermined direction, for discriminating start and end positions of a dot set by scanning the dot pattern in the predetermined direction so as to detect appearance of noncontinuous dot pattern in a direction substantially perpendicular to a direction of the scanning line, and for storing information representing, as a relative value with respect to an immediately preceding scanning line, the obtained change point positions and the obtained number of change points and the discriminated start and end positions of the dot set, in advance in correspondence with identification information for identifying the dot pattern; and outputting the number of dot change points and dot change point positions of each line in a dot pattern corresponding to code information on the basis of the information read out from said storage step, wherein said storage step stores, as second information, relative positions between the obtained dot change point positions of each scanning line and the change point positions on an immediately preceding scanning line, and the discriminated start and end positions of the dot set.

161. An output method comprising the step of:

obtaining dot change point positions and the number of change points in units of scanning lines by scanning a dot pattern in a predetermined direction, discriminating start and end positions of a dot set by scanning the dot pattern in the predetermined direction so as to detect appearance of noncontinuous dot pattern in a direction substantially perpendicular to a direction of the scanning line, and storing information representing, as a relative value with respect to an immediately preceding scanning line, the obtained change point positions and the obtained number of change points and the discriminated start and end positions of the dot set, in advance in correspondence with identification information for identifying the dot pattern; and outputting the number of dot change points and dot change point positions of each line in a dot pattern corresponding to code information on the basis of the information read out from said storage step, wherein said output step outputs the number of dot change points of each line on the basis of the information stored in said storage step and representing a difference between the obtained number of dot change points of each scanning line and the number of change points on an immediately preceding scanning line.

162. An output method comprising the steps of:

obtaining dot change point positions and the number of change points in units of scanning lines by scanning a dot pattern in a predetermined direction, discriminating start and end positions of a dot set by scanning the dot pattern in the predetermined direction so as to detect appearance of noncontinuous dot pattern in a direction substantially perpendicular to a direction of the scanning line, and storing information representing, as a relative value with respect to an immediately preceding scanning line, the obtained change point positions and the obtained number of change points and the discriminated start and end positions of the dot set, in advance in correspondence with identification information for identifying the dot pattern; and outputting the number of dot change points and dot change point positions of each line in a dot pattern corresponding to code information on the basis of the information read out from said storage step, wherein said output step outputs the dot change point positions of each line on the basis of the information stored in said storage step and representing relative positions between the obtained dot change point positions of each scanning line and the change point positions on an immediately preceding scanning line, and the discriminated start and end positions of the dot set.

163. An output apparatus comprising the steps of:

connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as a relative value with respect to an immediately preceding scanning line, the obtained change points and the discriminated start and end positions of the dot set, in advance in correspondence with identification information for identifying the dot pattern; and outputting the number of dot change points and dot change point positions of each line in a dot pattern corresponding to code information on the basis of the information read out from said storage step via said connection step in accordance with the code information which is externally input and specifies a dot pattern, wherein said storage step stores, as first information, a difference between the obtained number of dot change points of each scanning line and the number of change points on an immediately preceding scanning line.

164. An output method comprising the steps of:

connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as a relative value with respect to an immediately preceding scanning line, the obtained change points and the discriminated start and end positions of the dot set, in advance in correspondence with identification information for identifying the dot pattern; and outputting the number of dot change points and dot change point positions of each line in a dot pattern corresponding to code information on the basis of the information read out from said storage step via said connection step in accordance with the code information which is externally input and specifies a dot pattern, wherein said storage step stores, as second information, relative positions between the obtained dot change point positions of each scanning line and the change point positions on an immediately preceding scanning line, and the discriminated start and end positions of the dot set.

165. An output method comprising the steps of:

connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as a relative value with respect to an immediately preceding scanning line, the obtained change points and the discriminated start and end positions of the dot set, in advance in correspondence with identification information for identifying the dot pattern; and outputting the number of dot change points and dot change point positions of each line in a dot pattern corresponding to code information on the basis of the information read out from said storage step via said connection step in accordance with the code information which is externally input and specifies a dot pattern, wherein said output step outputs the number of dot change points of each line on the basis of the information stored in said storage step and representing a difference between the obtained number of dot change points of each scanning line and the number of change points on an immediately preceding scanning line.

166. An output method comprising the steps of:

connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as a relative value with respect to an immediately preceding scanning line, the obtained change points and the discriminated start and end positions of the dot set, in advance in correspondence with identification information for identifying the dot pattern; and outputting the number of dot change points and dot change point positions of each line in a dot pattern corresponding to code information on the basis of the information read out from said storage step via said connection step in accordance with the code information which is externally input and specifies a dot pattern, wherein said output step outputs the dot change point positions of each line on the basis of the information stored in said storage step representing relative positions between the obtained dot change point positions of each scanning line and the change point positions on an immediately preceding scanning line, and the discriminated start and end positions of the dot set.

167. An output method comprising the steps of:

obtaining dot change point positions and the number of change points in units of scanning lines by scanning a dot pattern in a predetermined direction;

discriminating start and end positions of a dot set by detecting appearance of a noncontinuous dot pattern in a direction substantially perpendicular to a direction of the scanning line;

generating information representing, as a relative value with respect to an immediately preceding scanning line, the change point positions and the number of change points detected by said change point detecting step and the start and end positions of the dot set discriminated by said discriminating step;

storing the information generated by said generator in correspondence with identification information for identifying the dot pattern; and outputting the number of dot change points and dot change point positions of each line in a dot pattern corresponding to code information on the basis of the information read out from said storage step, wherein said generating step generates, as first information, a difference between the number of dot change points of each scanning line and the number of change points on an immediately preceding scanning line detected by said change point detecting step.

168. An output method comprising the steps of:

obtaining dot change point positions and the number of change points in units of scanning lines by scanning a dot pattern in a predetermined direction;

discriminating start and end positions of a dot set by detecting appearance of a noncontinuous dot pattern in a direction substantially perpendicular to a direction of the scanning line;

generating information representing, as a relative value with respect to an immediately preceding scanning line, the change point positions and the number of change points detected by said change point detecting step and the start and end positions of the dot set discriminated by said discriminating step;

storing the information generated by said generator in correspondence with identification information for identifying the dot pattern; and outputting the number of dot change points and dot change point positions of each line in a dot pattern corresponding to code information on the basis of the information read out from said storage step, wherein said generating step generates, as second information, relative positions between the dot change point positions of each scanning line and change point positions on an immediately preceding scanning line detected by said change point detecting step, and the start and end positions of the dot set discriminated by said discriminating step.

169. An output method comprising the steps of:

obtaining dot change point positions and the number of change points in units of scanning lines by scanning a dot pattern in a predetermined direction;

discriminating start and end positions of a dot set by detecting appearance of a noncontinuous dot pattern in a direction substantially perpendicular to a direction of the scanning line;

generating information representing, as a relative value with respect to an immediately preceding scanning line, the change point positions and the number of change points detected by said change point detecting step and the start and end positions of the dot set discriminated by said discriminating step;

storing the information generated by said generating step in correspondence with identification information for identifying the dot pattern; and outputting the number of dot change points and dot change point positions of each line in a dot pattern corresponding to code information on the basis of the information read out from said storage step, wherein said output step outputs the number of dot change points of each line on the basis of the information stored in said storage step and representing a difference between the obtained number of dot change points of each scanning line and the number of change points on an immediately preceding scanning line detected by said change point detecting step.

170. An output method comprising the steps of:

obtaining dot change point positions and the number of change points in units of scanning lines by scanning a dot pattern in a predetermined direction;

discriminating start and end positions of a dot set by detecting appearance of a noncontinuous dot pattern in a direction substantially perpendicular to a direction of the scanning line;

generating information representing, as a relative value with respect to an immediately preceding scanning line, the change point positions and the number of change points detected by said change point detecting step and the start and end positions of the dot set discriminated by said discriminating step;

storing the information generated by said generator in correspondence with identification information for identifying the dot pattern; and outputting the number of dot change points and dot change point positions of each line in a dot pattern corresponding to code information on the basis of the information read out from said storage step, wherein said output step outputs the dot change point positions of each line on the basis of the information stored in said storage step and representing relative positions between the obtained dot change point positions of each scanning line and the change point positions on an immediately preceding scanning line detected by said change point detecting step, and the start and end positions of the dot set discriminated by said discriminating step.

171. An information processing device comprising:

a change point detector obtaining dot change point positions and the number of change points in units of scanning lines by scanning a dot pattern in a predetermined direction;

a discriminator for discriminating start and end positions of a dot set by scanning the dot pattern in the predetermined direction so as to detect appearance of a noncontinuous dot pattern in a direction substantially perpendicular to a direction of the scanning line; and a generator for generating information representing, as a relative value with respect to an immediately preceding scanning line, the change point positions and the number of change points detected by said change point detector and the start and end positions of the dot set discriminated by said discriminator, wherein said generator generates, as first information, a difference between the number of dot change points of each scanning line and the number of change points on an immediately preceding scanning line detected by said change point detector.

172. An information processing device comprising:

a change point detector for obtaining dot change point positions and the number of change points in units of scanning lines by scanning a dot pattern in a predetermined direction;

a discriminator for discriminating start and end positions of a dot set by scanning the dot pattern in the predetermined direction so as to detect appearance of a noncontinuous dot pattern in a direction substantially perpendicular to a direction of the scanning line; and a generator for generating information representing, as a relative value with respect to an immediately preceding scanning line, the change point positions and the number of change points detected by said change point detector and the start and end positions of the dot set discriminated by said discriminator, wherein said generator generates, as second information, relative positions between the dot change point positions of each scanning line and change point positions on an immediately preceding scanning line detected by said change point detector, and the start and end positions of the dot set discriminated by said discriminator.

173. An output device comprising:

a change point detector for obtaining dot change point positions and the number of change points in units of scanning lines by scanning a dot pattern input from an external apparatus in a predetermined direction;

a discriminator for discriminating start and end positions of a dot set by scanning the dot pattern input from said external apparatus in the predetermined direction so as to detect appearance of a noncontinuous dot pattern in a direction substantially perpendicular to a direction of the scanning line; and a generator for generating information representing, as a relative value with respect to an immediately preceding scanning line, the change point positions and the number of change points detected by said change point detector and the start and end positions of the dot set discriminated by said discriminator, wherein said generator generates, as first information, a difference between the number of dot change points of each scanning line and the number of change points on an immediately preceding scanning line detected by said change point detector.

174. An output device comprising:

a change point detector for obtaining dot change point positions and the number of change points in units of scanning lines by scanning a dot pattern input from an external apparatus in a predetermined direction;

a discriminator for discriminating start and end positions of a dot set by scanning the dot pattern input from said external apparatus in the predetermined direction so as to detect appearance of a noncontinuous dot pattern in a direction substantially perpendicular to a direction of the scanning line; and a generator for generating information representing, as a relative value with respect to an immediately preceding scanning line, the change point positions and the number of change points detected by said change point detector and the start and end positions of the dot set discriminated by said discriminator, wherein said generator generates, as second information, relative positions between the dot change point positions of each scanning line and change point positions on an immediately preceding scanning line detected by said change point detector, and the start and end positions of the dot set discriminated by said discriminator.

175. An output device comprising:

a change point detector for obtaining dot change point positions and the number of change points in units of scanning lines by scanning a dot pattern in a predetermined direction, discriminating start and end positions of a dot set by scanning the dot pattern in the predetermined direction so as to detect appearance of noncontinuous dot pattern in a direction substantially perpendicular to a direction of the scanning line, and storing information representing, as a relative value with respect to an immediately preceding scanning line, the obtained change point positions and the obtained number of change points and the discriminated start and end positions of the dot set, in advance in correspondence with identification information for identifying the dot pattern; and an output device for outputting the number of dot change points and dot change point positions of each line in a dot pattern corresponding to code information on the basis of the information read out from said storage device, wherein said storage device stores, as first information, a difference between the obtained number of dot change points of each scanning line and the number of change points on an immediately preceding scanning line.

176. An output device comprising:

a storage device for obtaining dot change point positions and the number of change points in units of scanning lines by scanning a dot pattern in a predetermined direction, for discriminating start and end positions of a dot set by scanning the dot pattern in the predetermined direction so as to detect appearance of noncontinuous dot pattern in a direction substantially perpendicular to a direction of the scanning line, and for storing information representing, as a relative value with respect to an immediately preceding scanning line, the obtained change point positions and the obtained number of change points and the discriminated start and end positions of the dot set, in advance in correspondence with identification information for identifying the dot pattern; and an output device for outputting the number of dot change points and dot change point positions of each line in a dot pattern corresponding to code information on the basis of the information read out from said storage device, wherein said storage device stores, as second information, relative positions between the obtained dot change point positions of each scanning line and the change point positions on an immediately preceding scanning line, and the discriminated start and end positions of the dot set.

177. An output device comprising:

a change point detector for obtaining dot change point positions and the number of change points in units of scanning lines by scanning a dot pattern in a predetermined direction, discriminating start and end positions of a dot set by scanning the dot pattern in the predetermined direction so as to detect appearance of noncontinuous dot pattern in a direction substantially perpendicular to a direction of the scanning line, and storing information representing, as a relative value with respect to an immediately preceding scanning line, the obtained change point positions and the obtained number of change points and the discriminated start and end positions of the dot set, in advance in correspondence with identification information for identifying the dot pattern; and an output device for outputting the number of dot change points and dot change point positions of each line in a dot pattern corresponding to code information on the basis of the information read out from said storage device, wherein said output device outputs the number of dot change points of each line on the basis of the information stored in said storage device and representing a difference between the obtained number of dot change points of each scanning line and the number of change points on an immediately preceding scanning line.

178. An output device comprising:

a change point detector for obtaining dot change point positions and the number of change points in units of scanning lines by scanning a dot pattern in a predetermined direction, discriminating start and end positions of a dot set by scanning the dot pattern in the predetermined direction so as to detect appearance of noncontinuous dot pattern in a direction substantially perpendicular to a direction of the scanning line, and storing information representing, as a relative value with respect to an immediately preceding scanning line, the obtained change point positions and the obtained number of change points and the discriminated start and end positions of the dot set, in advance in correspondence with identification information for identifying the dot pattern; and an output device for outputting the number of dot change points and dot change point positions of each line in a dot pattern corresponding to code information on the basis of the information read out from said storage device, wherein said output device outputs the dot change point positions of each line on the basis of the information stored in said storage device and representing relative positions between the obtained dot change point positions of each scanning line and the change point positions on an immediately preceding scanning line, and the discriminated start and end positions of the dot set.

179. An output device comprising:

a connector for connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as a relative value with respect to an immediately preceding scanning line, the obtained change points and the discriminated start and end positions of the dot set, in advance in correspondence with identification information for identifying the dot pattern; and an output device for outputting the number of dot change points and dot change point positions of each line in a dot pattern corresponding to code information on the basis of the information read out from said storage device via said connector in accordance with the code information which is externally input and specifies a dot pattern, wherein said storage device stores, as first information, a difference between the obtained number of dot change points of each scanning line and the number of change points on an immediately preceding scanning line.

180. An output device comprising:

a connector for connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as a relative value with respect to an immediately preceding scanning line, the obtained change points and the discriminated start and end positions of the dot set, in advance in correspondence with identification information for identifying the dot pattern; and an output device for outputting the number of dot change points and dot change point positions of each line in a dot pattern corresponding to code information on the basis of the information read out from said storage device via said connector in accordance with the code information which is externally input and specifies a dot pattern, wherein said storage device stores, as second information, relative positions between the obtained dot change point positions of each scanning line and the change point positions on an immediately preceding scanning line, and the discriminated start and end positions of the dot set.

181. An output device comprising:

a connector for connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as a relative value with respect to an immediately preceding scanning line, the obtained change points and the discriminated start and end positions of the dot set, in advance in correspondence with identification information for identifying the dot pattern; and an output device for outputting the number of dot change points and dot change point positions of each line in a dot pattern corresponding to code information on the basis of the information read out from said storage device via said connector in accordance with the code information which is externally input and specifies a dot pattern, wherein said output device outputs the number of dot change points of each line on the basis of the information stored in said storage device and representing a difference between the obtained number of dot change points of each scanning line and the number of change points on an immediately preceding scanning line.

182. An output device comprising:

a connector for connecting a storage means for obtaining dot change point positions and the number of change points in units of scanning lines by scanning a dot pattern in a predetermined direction, discriminating start and end positions of a dot set by scanning the dot pattern in the predetermined direction so as to detect appearance of a noncontinuous dot pattern in a direction substantially perpendicular to a direction of the scanning line, and storing information representing, as a relative value with respect to an immediately preceding scanning line, the obtained change points and the discriminated start and end positions of the dot set, in advance in correspondence with identification information for identifying the dot pattern; and an output device for outputting the number of dot change points and dot change point positions of each line in a dot pattern corresponding to code information on the basis of the information read out from said storage device via said connector in accordance with the code information which is externally input and specifies a dot pattern, wherein said output device outputs the dot change point positions of each line on the basis of the information stored in said storage device representing relative positions between the obtained dot change point positions of each scanning line and the change point positions on an immediately preceding scanning line, and the discriminated start and end positions of the dot set.

183. An output device comprising:

a change point detector for obtaining dot change point positions and the number of change points in units of scanning lines by scanning a dot pattern in a predetermined direction;

a discriminator for discriminating start and end positions of a dot set by detecting appearance of a noncontinuous dot pattern in a direction substantially perpendicular to a direction of the scanning line;

a generator for generating information representing, as a relative value with respect to an immediately preceding scanning line, the change point positions and the number of change points detected by said change point detector and the start and end positions of the dot set discriminated by said discriminator;

a storage device for storing the information generated by said generator in correspondence with identification information for identifying the dot pattern; and an output device for outputting the number of dot change points and dot change point positions of each line in a dot pattern corresponding to code information on the basis of the information read out from said storage device, wherein said generator generates, as first information, a difference between the number of dot change points of each scanning line and the number of change points on an immediately preceding scanning line detected by said change point detector.

184. An output device comprising:

a change point detector for obtaining dot change point positions and the number of change points in units of scanning lines by scanning a dot pattern in a predetermined direction;

a discriminator for discriminating start and end positions of a dot set by detecting appearance of a noncontinuous dot pattern in a direction substantially perpendicular to a direction of the scanning line;

a generator for generating information representing, as a relative value with respect to an immediately preceding scanning line, the change point positions and the number of change points detected by said change point detector and the start and end positions of the dot set discriminated by said discriminator;

a storage device for storing the information generated by said generation means in correspondence with identification information for identifying the dot pattern; and an output device for outputting the number of dot change points and dot change point positions of each line in a dot pattern corresponding to code information on the basis of the information read out from said storage device, wherein said generation device generates, as second information, relative positions between the dot change point positions of each scanning line and change point positions on an immediately preceding scanning line detected by said change point detector, and the start and end positions of the dot set discriminated by said discriminator.

185. An output device comprising:

a change point detector for obtaining dot change point positions and the number of change points in units of scanning lines by scanning a dot pattern in a predetermined direction;

a discriminator for discriminating start and end positions of a dot set by detecting appearance of a noncontinuous dot pattern in a direction substantially perpendicular to a direction of the scanning line;

a generator for generating information representing, as a relative value with respect to an immediately preceding scanning line, the change point positions and the number of change points detected by said change point detector and the start and end positions of the dot set discriminated by said discriminator;

a storage device for storing the information generated by said generation step in correspondence with identification information for identifying the dot pattern; and an output device for outputting the number of dot change points and dot change point positions of each line in a dot pattern corresponding to code information on the basis of the information read out from said storage device, wherein said output device outputs the number of dot change points of each line on the basis of the information stored in said storage means and representing a difference between the obtained number of dot change points of each scanning line and the number of change points on an immediately preceding scanning line detected by said change point detector.

186. An output device comprising:

a change point detector for obtaining dot change point positions and the number of change points in units of scanning lines by scanning a dot pattern in a predetermined direction;

a discriminator for discriminating start and end positions of a dot set by detecting appearance of a noncontinuous dot pattern in a direction substantially perpendicular to a direction of the scanning line;

a generator for generating information representing, as a relative value with respect to an immediately preceding scanning line, the change point positions and the number of change points detected by said change point detector and the start and end positions of the dot set discriminated by said discriminator;

a storage device for storing the information generated by said generation step in correspondence with identification information for identifying the dot pattern; and an output device for outputting the number of dot change points and dot change point positions of each line in a dot pattern corresponding to code information on the basis of the information read out from said storage device, wherein said output device outputs the dot change point positions of each line on the basis of the information stored in said storage device and representing relative positions between the obtained dot change point positions of each scanning line and the change point positions on an immediately preceding scanning line detected by said change point detector, and the start and end positions of the dot set discriminated by said discriminator.

187. A storage medium used in an information processing apparatus, said storage medium comprising means for storing a program comprising process steps to:

obtain dot change point positions and the number of change points in units of scanning lines by scanning a dot pattern in a predetermined direction;

discriminate start and end positions of a dot set by scanning the dot pattern in the predetermined direction so as to detect appearance of a noncontinuous dot pattern in a direction substantially perpendicular to a direction of the scanning line; and generate information representing, as a relative value with respect to an immediately preceding scanning line, the change point positions and the number of change points detected by said change point detection step and the start and end positions of the dot set discriminated by said discrimination step, wherein said generating step generates, as first information, a difference between the number of dot change points of each scanning line and the number of change points on an immediately preceding scanning line detected by said change point detection step.

188. A storage medium used in an information processing apparatus, said storage medium comprising means for storing a program comprising process steps to:

obtain dot change point positions and the number of change points in units of scanning lines by scanning a dot pattern in a predetermined direction;

discriminate start and end positions of a dot set by scanning the dot pattern in the predetermined direction so as to detect appearance of a noncontinuous dot pattern in a direction substantially perpendicular to a direction of the scanning line; and generate information representing, as a relative value with respect to an immediately preceding scanning line, the change point positions and the number of change points detected by said change point detection step and the start and end positions of the dot set discriminated by said discrimination step, wherein said generating step generates, as second information, relative positions between the dot change point positions of each scanning line and change point positions on an immediately preceding scanning line detected by said change point detection step, and the start and end positions of the dot set discriminated by said discrimination step.

189. A storage medium used in an information processing apparatus, said storage medium comprising means for storing a program comprising process steps to:

obtain dot change point positions and the number of change points in units of scanning lines by scanning a dot pattern input from an external apparatus in a predetermined direction;

discriminate start and end positions of a dot set by scanning the dot pattern input from said external apparatus in the predetermined direction so as to detect appearance of a noncontinuous dot pattern in a direction substantially perpendicular to a direction of the scanning line; and generate information representing, as a relative value with respect to an immediately preceding scanning line, the change point positions and the number of change points detected by said change point detection step and the start and end positions of the dot set discriminated by said discrimination step, wherein said generation step generates, as first information, a difference between the number of dot change points of each scanning line and the number of change points on an immediately preceding scanning line detected by said change point detection step.

190. A storage medium used in an information processing apparatus, said storage medium comprising means for storing a program comprising process steps to:

obtain dot change point positions and the number of change points in units of scanning lines by scanning a dot pattern input from an external apparatus in a predetermined direction;

discriminate start and end positions of a dot set by scanning the dot pattern input from said external apparatus in the predetermined direction so as to detect appearance of a noncontinuous dot pattern in a direction substantially perpendicular to a direction of the scanning line; and generate information representing, as a relative value with respect to an immediately preceding scanning line, the change point positions and the number of change points detected by said change point detection step and the start and end positions of the dot set discriminated by said discrimination step, wherein said generation step generates, as second information, relative positions between the dot change point positions of each scanning line and change point positions on an immediately preceding scanning line detected by said change point detection step, and the start and end positions of the dot set discriminated by said discrimination step.

191. A storage medium used in an information processing apparatus, said storage medium comprising means for storing a program comprising process steps to:

obtain dot change point positions and the number of change points in units of scanning lines by scanning a dot pattern in a predetermined direction, discriminate start and end positions of a dot set by scanning the dot pattern in the predetermined direction so as to detect appearance of noncontinuous dot pattern in a direction substantially perpendicular to a direction of the scanning line, and store information representing, as a relative value with respect to an immediately preceding scanning line, the obtained change point positions and the obtained number of change points and the discriminated start and end positions of the dot set, in advance in correspondence with identification information for identifying the dot pattern; and output the number of dot change points and dot change point positions of each line in a dot pattern corresponding to code information on the basis of the information read out from said storage step, wherein said storage step stores, as first information, a difference between the obtained number of dot change points of each scanning line and the number of change points on an immediately preceding scanning line.

192. A storage medium used in an information processing apparatus, said storage medium comprising means for storing a program comprising process steps to:

obtain dot change point positions and the number of change points in units of scanning lines by scanning a dot pattern in a predetermined direction, to discriminate start and end positions of a dot set by scanning the dot pattern in the predetermined direction so as to detect appearance of noncontinuous dot pattern in a direction substantially perpendicular to a direction of the scanning line, and to store information representing, as a relative value with respect to an immediately preceding scanning line, the obtained change point positions and the obtained number of change points and the discriminated start and end positions of the dot set, in advance in correspondence with identification information for identifying the dot pattern; and output the number of dot change points and dot change point positions of each line in a dot pattern corresponding to code information on the basis of the information read out from said storage step, wherein said storage step stores, as second information, relative positions between the obtained dot change point positions of each scanning line and the change point positions on an immediately preceding scanning line, and the discriminated start and end positions of the dot set.

193. A storage medium used in an information processing apparatus, said storage medium comprising means for storing a program comprising process steps to:

obtain dot change point positions and the number of change points in units of scanning lines by scanning a dot pattern in a predetermined direction, discriminate start and end positions of a dot set by scanning the dot pattern in the predetermined direction so as to detect appearance of noncontinuous dot pattern in a direction substantially perpendicular to a direction of the scanning line, and store information representing, as a relative value with respect to an immediately preceding scanning line, the obtained change point positions and the obtained number of change points and the discriminated start and end positions of the dot set, in advance in correspondence with identification information for identifying the dot pattern; and output the number of dot change points and dot change point positions of each line in a dot pattern corresponding to code information on the basis of the information read out from said storage step, wherein said output step outputs the number of dot change points of each line on the basis of the information stored in said storage step and representing a difference between the obtained number of dot change points of each scanning line and the number of change points on an immediately preceding scanning line.

194. A storage medium used in an information processing apparatus, said storage medium comprising means for storing a program comprising process steps to:

obtain dot change point positions and the number of change points in units of scanning lines by scanning a dot pattern in a predetermined direction, discriminate start and end positions of a dot set by scanning the dot pattern in the predetermined direction so as to detect appearance of noncontinuous dot pattern in a direction substantially perpendicular to a direction of the scanning line, and store information representing, as a relative value with respect to an immediately preceding scanning line, the obtained change point positions and the obtained number of change points and the discriminated start and end positions of the dot set, in advance in correspondence with identification information for identifying the dot pattern; and output the number of dot change points and dot change point positions of each line in a dot pattern corresponding to code information on the basis of the information read out from said storage step, wherein said output step outputs the dot change point positions of each line on the basis of the information stored in said storage step and representing relative positions between the obtained dot change point positions of each scanning line and the change point positions on an immediately preceding scanning line, and the discriminated start and end positions of the dot set.

195. A storage medium used in an information processing apparatus, said storage medium comprising means for storing a program comprising process steps to:

connect a storage means for obtaining dot change point positions and the number of change points in units of scanning lines by scanning a dot pattern in a predetermined direction, discriminate start and end positions of a dot set by scanning the dot pattern in the predetermined direction so as to detect appearance of a noncontinuous dot pattern in a direction substantially perpendicular to a direction of the scanning line, and store information representing, as a relative value with respect to an immediately preceding scanning line, the obtained change points and the discriminated start and end positions of the dot set, in advance in correspondence with identification information for identifying the dot pattern; and output the number of dot change points and dot change point positions of each line in a dot pattern corresponding to code information on the basis of the information read out from said storage step via said connection step in accordance with the code information which is externally input and specifies a dot pattern, wherein said storage step stores, as first information, a difference between the obtained number of dot change points of each scanning line and the number of change points on an immediately preceding scanning line.

196. A storage medium used in an information processing apparatus, said storage medium comprising means for storing a program comprising process steps to:

connect a storage means for obtaining dot change point positions and the number of change points in units of scanning lines by scanning a dot pattern in a predetermined direction, discriminate start and end positions of a dot set by scanning the dot pattern in the predetermined direction so as to detect appearance of a noncontinuous dot pattern in a direction substantially perpendicular to a direction of the scanning line, and store information representing, as a relative value with respect to an immediately preceding scanning line, the obtained change points and the discriminated start and end positions of the dot set, in advance in correspondence with identification information for identifying the dot pattern; and output the number of dot change points and dot change point positions of each line in a dot pattern corresponding to code information on the basis of the information read out from said storage step via said connection step in accordance with the code information which is externally input and specifies a dot pattern, wherein said storage step stores, as second information, relative positions between the obtained dot change point positions of each scanning line and the change point positions on an immediately preceding scanning line, and the discriminated start and end positions of the dot set.

197. A storage medium used in an information processing apparatus, said storage medium comprising means for storing a program comprising process steps to:

connect a storage means for obtaining dot change point positions and the number of change points in units of scanning lines by scanning a dot pattern in a predetermined direction, discriminate start and end positions of a dot set by scanning the dot pattern in the predetermined direction so as to detect appearance of a noncontinuous dot pattern in a direction substantially perpendicular to a direction of the scanning line, and store information representing, as a relative value with respect to an immediately preceding scanning line, the obtained change points and the discriminated start and end positions of the dot set, in advance in correspondence with identification information for identifying the dot pattern; and output the number of dot change points and dot change point positions of each line in a dot pattern corresponding to code information on the basis of the information read out from said storage step via said connection step in accordance with the code information which is externally input and specifies a dot pattern, wherein said output step outputs the number of dot change points of each line on the basis of the information stored in said storage step and representing a difference between the obtained number of dot change points of each scanning line and the number of change points on an immediately preceding scanning line.

198. A storage medium used in an information processing apparatus, said storage medium comprising means for storing a program comprising process steps to:

connect a storage means for obtaining dot change point positions and the number of change points in units of scanning lines by scanning a dot pattern in a predetermined direction, discriminate start and end positions of a dot set by scanning the dot pattern in the predetermined direction so as to detect appearance of a noncontinuous dot pattern in a direction substantially perpendicular to a direction of the scanning line, and store information representing, as a relative value with respect to an immediately preceding scanning line, the obtained change points and the discriminated start and end positions of the dot set, in advance in correspondence with identification information for identifying the dot pattern; and output the number of dot change points and dot change point positions of each line in a dot pattern corresponding to code information on the basis of the information read out from said storage step via said connection step in accordance with the code information which is externally input and specifies a dot pattern, wherein said output step outputs the dot change point positions of each line on the basis of the information stored in said storage step representing relative positions between the obtained dot change point positions of each scanning line and the change point positions on an immediately preceding scanning line, and the discriminated start and end positions of the dot set.

199. A storage medium used in an information processing apparatus, said storage medium comprising means for storing a program comprising process steps to:

obtain dot change point positions and the number of change points in units of scanning lines by scanning a dot pattern in a predetermined direction;

discriminate start and end positions of a dot set by detecting appearance of a noncontinuous dot pattern in a direction substantially perpendicular to a direction of the scanning line;

generate information representing, as a relative value with respect to an immediately preceding scanning line, the change point positions and the number of change points detected by said change point detecting step and the start and end positions of the dot set discriminated by said discriminating step;

store the information generated by said generator in correspondence with identification information for identifying the dot pattern; and output the number of dot change points and dot change point positions of each line in a dot pattern corresponding to code information on the basis of the information read out from said storage step, wherein said generating step generates, as first information, a difference between the number of dot change points of each scanning line and the number of change points on an immediately preceding scanning line detected by said change point detecting step.

200. A storage medium used in an information processing apparatus, said storage medium comprising means for storing a program comprising process steps to:

obtain dot change point positions and the number of change points in units of scanning lines by scanning a dot pattern in a predetermined direction;

discriminate start and end positions of a dot set by detecting appearance of a noncontinuous dot pattern in a direction substantially perpendicular to a direction of the scanning line;

generate information representing, as a relative value with respect to an immediately preceding scanning line, the change point positions and the number of change points detected by said change point detecting step and the start and end positions of the dot set discriminated by said discriminating step;

store the information generated by said generator in correspondence with identification information for identifying the dot pattern; and output the number of dot change points and dot change point positions of each line in a dot pattern corresponding to code information on the basis of the information read out from said storage step, wherein said generating step generates, as second information, relative positions between the dot change point positions of each scanning line and change point positions on an immediately preceding scanning line detected by said change point detecting step, and the start and end positions of the dot set discriminated by said discriminating step.

201. A storage medium used in an information processing apparatus, said storage medium comprising means for storing a program comprising process steps to:

obtain dot change point positions and the number of change points in units of scanning lines by scanning a dot pattern in a predetermined direction;

discriminate start and end positions of a dot set by detecting appearance of a noncontinuous dot pattern in a direction substantially perpendicular to a direction of the scanning line;

generate information representing, as a relative value with respect to an immediately preceding scanning line, the change point positions and the number of change points detected by said change point detecting step and the start and end positions of the dot set discriminated by said discriminating step;

store the information generated by said generating step in correspondence with identification information for identifying the dot pattern; and output the number of dot change points and dot change point positions of each line in a dot pattern corresponding to code information on the basis of the information read out from said storage step, wherein said output step outputs the number of dot change points of each line on the basis of the information stored in said storage step and representing a difference between the obtained number of dot change points of each scanning line and the number of change points on an immediately preceding scanning line detected by said change point detecting step.

202. A storage medium used in an information processing apparatus, said storage medium comprising means for storing a program comprising process steps to:

obtain dot change point positions and the number of change points in units of scanning lines by scanning a dot pattern in a predetermined direction;

discriminate start and end positions of a dot set by detecting appearance of a noncontinuous dot pattern in a direction substantially perpendicular to a direction of the scanning line;

generate information representing, as a relative value with respect to an immediately preceding scanning line, the change point positions and the number of change points detected by said change point detecting step and the start and end positions of the dot set discriminated by said discriminating step;

store the information generated by said generator in correspondence with identification information for identifying the dot pattern; and output the number of dot change points and dot change point positions of each line in a dot pattern corresponding to code information on the basis of the information read out from said storage step, wherein said output step outputs the dot change point positions of each line on the basis of the information stored in said storage step and representing relative positions between the obtained dot change point positions of each scanning line and the change point positions on an immediately preceding scanning line detected by said change point detecting step, and the start and end positions of the dot set discriminated by said discriminating step.

* * * * *

UNITED STATES PATENT AND TRADEMARK OFFICE
CERTIFICATE OF CORRECTION

PATENT NO. : 5,574,886

DATED : November 12, 1996

INVENTORS : Hisashi Koike, et al.

It is certified that error appears in the above-identified patent and that said Letters Patent is hereby corrected as shown below:

<u>In the Drawings</u>

Sheet 5, Fig. 5, "LIME" should read --LINE--.

<u>COLUMN 7</u>

Line 43, "3" should read --j--.

<u>COLUMN 8</u>

Line 53, "In FIG. 6, ..." should be ¶.

<u>COLUMN 9</u>

Line 29, "S2," should read --S2, and--.

<u>COLUMN 11</u>

Line 50, "dots" should read --dot--.

UNITED STATES PATENT AND TRADEMARK OFFICE
CERTIFICATE OF CORRECTION

PATENT NO. : 5,574,886

DATED : November 12, 1996

INVENTORS : Hisashi Koike, et al.

It is certified that error appears in the above-identified patent and that said Letters Patent is hereby corrected as shown below:

COLUMN 12

Line 61, "(line" should read --(line 8)--.

COLUMN 15

Line 10, "a-white" should read --a white--.

COLUMN 16

Line 45, "this" should read --to this--.

COLUMN 22

Line 45, "(=9-6)>" should read --(=9-6)>"--.

COLUMN 28

Line 28, "different" should read --difference--.

UNITED STATES PATENT AND TRADEMARK OFFICE
CERTIFICATE OF CORRECTION

PATENT NO. : 5,574,886

DATED : November 12, 1996

INVENTORS : Hisashi Koike, et al.

It is certified that error appears in the above-identified patent and that said Letters Patent is hereby corrected as shown below:

COLUMN 32

Line 52, "line, the information;" should read --line;--.

COLUMN 39

Line 21, "line, the information;" should read --line;--; and
Line 30, " An apparatus" should read --A method--.

COLUMN 40

Line 38, "device" should read --processor--;
Line 40, "device" should read --processor--;
Line 43, "device" should read --processor--;
Line 46, "device" should read --processor--;
Line 48, "device" should read --processor--;
Line 50, "device" should read --processor--;
Line 54, "device" should read --processor--; and
Line 57, "device" should read --processor--.

UNITED STATES PATENT AND TRADEMARK OFFICE
CERTIFICATE OF CORRECTION

PATENT NO. : 5,574,886

DATED : November 12, 1996

INVENTORS : Hisashi Koike, et al.

It is certified that error appears in the above-identified patent and that said Letters Patent is hereby corrected as shown below:

COLUMN 42

Line 20, "line, the" should read --line;--;
Line 21, "information;" should be deleted; and
Line 29, "An apparatus" should read --A device--.

COLUMN 45

Line 35, "An apparatus" should read --A storage medium--.

COLUMN 48

Line 39, "step" should read --steps--.

Signed and Sealed this

Twenty-fourth Day of June, 1997

Attest:

BRUCE LEHMAN

Attesting Officer

Commissioner of Patents and Trademarks